United States Patent
Kita et al.

(10) Patent No.: US 6,335,871 B1
(45) Date of Patent: Jan. 1, 2002

(54) MOTOR OPERATION CONTROLLER AND INSULATION TYPE BIDIRECTIONAL DC VOLTAGE CONVERTER

(75) Inventors: Hirofumi Kita; Toshiyuki Kaitani, both of Aichi; Masahiro Kimata; Yoshitaka Ohnishi, both of Hyogo, all of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/470,122

(22) Filed: Jun. 6, 1995

(30) Foreign Application Priority Data

Oct. 3, 1994 (JP) .................................................. 6-239070

(51) Int. Cl.[7] .............................. H02J 3/36; H02M 5/45
(52) U.S. Cl. ................................................. 363/35; 363/37
(58) Field of Search ..................... 363/35, 37, 36; 318/790, 798, 11, 14

(56) References Cited

U.S. PATENT DOCUMENTS

| | | | |
|---|---|---|---|
| 4,503,940 A | 3/1985 | Watanabe | 187/29 R |
| 4,692,671 A * | 9/1987 | Dishner et al. | 318/11 |
| 4,709,318 A * | 11/1987 | Gephart et al. | 363/37 |
| 4,742,535 A | 5/1988 | Hino et al. | 378/105 |
| 4,743,812 A * | 5/1988 | Dishner | 318/14 |
| 4,801,859 A * | 1/1989 | Dishner | 323/222 |
| 4,868,730 A | 9/1989 | Ward | 363/21 |
| 4,870,555 A | 9/1989 | White | 363/21 |
| 4,953,068 A | 8/1990 | Henze | 363/17 |
| 4,965,775 A * | 10/1990 | Dishner et al. | 318/14 |
| 5,027,264 A | 6/1991 | DeDoncker et al. | |
| 5,034,669 A | 7/1991 | Sako et al. | 318/376 |
| 5,048,033 A * | 9/1991 | Donahue et al. | 315/307 |
| 5,255,174 A | 10/1993 | Murugan | |
| 5,321,597 A | 6/1994 | Alacoque | 363/25 |

FOREIGN PATENT DOCUMENTS

| | | | |
|---|---|---|---|
| EP | 0 028 591 A1 | 5/1981 | |
| EP | 0 293 869 A2 | 12/1988 | |
| EP | 0 375 250 A2 | 6/1990 | |
| EP | 0434889 | 7/1991 | |
| EP | 0 434 889 A2 | 7/1991 | |
| GB | 1 217 641 | 12/1970 | |
| GB | 1 362 390 | 8/1974 | |
| GB | 1 435 726 | 5/1976 | |
| GB | 2167252 | 10/1985 | |
| GB | 2 214 731 A | 9/1989 | |
| GB | 2 265 771 A | 10/1993 | |
| GB | 2 271 679 A | 4/1994 | |
| JP | 1527277 | 10/1978 | |
| JP | 57-183267 | 11/1982 | H02M/3/10 |
| JP | 4-31892 | 2/1992 | H02P/7/63 |
| JP | 438192 | 2/1992 | |
| WO | WO 92/16043 | 9/1992 | |
| WO | WO 94/05076 | 3/1994 | |

* cited by examiner

Primary Examiner—Bao Q. Vu
(74) Attorney, Agent, or Firm—Sughrue, Mion, Zinn, Macpeak & Seas, PLLC

(57) ABSTRACT

A motor operation controller, which can accommodate different power supply voltages by changing a minimum circuit configuration using common motors, wiring, etc., has an insulation structure between input power supply and the motors for providing the capability of bidirectional operation in a power mode and a regeneration mode. The motor operation controller comprises a converter section and an inverter section for supplying power to a motor. In the converter section, there is an insulation type bidirectional DC voltage conversion function provided by an insulation type bidirectional DC voltage conversion section 32 having an insulation type bidirectional DC voltage converter 33, a controller 35, and a smoothing circuit 34.

6 Claims, 38 Drawing Sheets

MOTOR OPERATION COMMAND

V1 : PRIMARY VOLTAGE (DETECTION VALUE)
V2ref: SECONDARY VOLTAGE (COMMAND VALUE)

th : SWITCHING ELEMENT TEMPERATURE (DETECTION VALUE)
tho: SETUP TEMPERATURE

V1n : SETUP LOWER LIMITED VALUE
V1p : SETUP UPPER LIMITED VALUE

MOTOR OPERATION COMMAND

MOTOR OPERATION COMMAND a

MOTOR OPERATION COMMAND b

MOTOR OPERATION COMMAND c

PRIOR ART

V2 : SECONDARY VOLTAGE (DETECTION VALUE)
V2*: SECONDARY VOLTAGE (TARGET VALUE)
ph : PHASE DIFFERENCE

MOTOR OPERATION CONTROLLER AND INSULATION TYPE BIDIRECTIONAL DC VOLTAGE CONVERTER

BACKGROUND OF THE INVENTION

1. Field of the Invention

This invention relates to a motor operation controller and an insulation type bidirectional DC voltage converter for accommodating different power supply voltages.

2. Description of Prior Art

Power supply voltages to a motor operation controller vary substantially depending on the application of a motor and the country or region where the motor is used. For example, in Japan, generally the home power supply voltage is 100 VAC, while the industrial power supply voltage is 200 VAC. In overseas countries, the industrial power supply voltages are 200–230 VAC, 380 VAC, 400 VAC, and 415 VAC (Europe) and 240 VAC and 460–480 VAC (USA). Generally, the industrial power supply voltages are roughly classified into 200 VAC, 240 VAC, 380 VAC, 415 VAC, and 480 VAC.

The motor is used in any operation state of acceleration, normal output, and deceleration. Thus, the motor operation controller requires two functions of feeding energy to the motor from an input power supply, which will be hereinafter referred to as a "power mode," and of returning rotation energy of the motor and a rotor secured to the motor to the input power supply by operating the motor as a generator, which will be hereinafter referred to as a "regeneration mode."

FIG. 28 is a block diagram showing the main circuit part of a conventional motor operation controller, wherein numeral 1 is an input power supply, numeral 2 is a motor operation controller, and numeral 3 is a motor. The motor operation controller 2 is roughly divided into a converter section 4 for converting an AC input section and a DC section bidirectionally and an inverter section 5 for converting DC into AC. In the converter section 4, numeral 6 is a rectifier made up of a diode bridge, etc., numeral 7 is a power supply inverter made up of a transistor bridge, etc., for outputting a power supply frequency, numeral 8 is a power supply inverter controller for controlling the operation of the power supply inverter 7, and numeral 9 is a smoothing circuit made up of an electrolytic capacitor, etc. In the inverter section 5, numeral 10 is an inverter for outputting a voltage, current, and frequency in response to the operation state of the motor 3, numeral 11 is an inverter controller for controlling the operation of the inverter 10, and numeral 12 is an interface circuit for receiving operation commands of the motor 3, such as acceleration, deceleration, and rotation speed, given from the outside.

FIG. 29 is a conventional example for accommodating power supply voltages incompatible with the voltage specifications of the motor operation controller 2 and the motor 3, wherein numeral 1a is an input power supply incompatible with the voltage specifications and numeral 13 is a transformer for converting a power supply voltage incompatible with the voltage specifications into a voltage conforming to the specifications.

FIG. 30 is a connection example involving a plurality of motor operation controllers 2a, 2b, and 2c and a plurality of motors 3a, 3b, and 3c. In the example, batch voltage conversion is made through the transformer 13 for supply to the motor operation controllers 2a, 2b, and 2c. The motor operation controllers 2a, 2b, and 2c receive motor operation commands a, b, and c, respectively, from the outside.

FIG. 31 is a circuit diagram shown in Japanese Patent Laid-Open 4-38192, wherein a DC voltage converter 20 is provided between a rectifier 6 in a converter section and an inverter section 5 for accommodating power supply voltages incompatible with the voltage specifications of the motor 3. In FIG. 31, numeral 21 is a primary smoothing circuit, numeral 22 is a secondary smoothing circuit, numeral 23 is a discharge resistor, numeral 24 is a discharge switch, and numeral 25 is a controller for controlling the DC voltage converter 20 and the inverter section 5.

Next, the operation will be discussed. First, the operation of the motor operation controller 2 in FIG. 28 will be described. In the power mode, the motor operation controller 2 converts an input AC voltage 1 into a DC voltage through the rectifier 6 and smooths the DC voltage by the smoothing circuit 9. Then, it again converts the smoothed DC voltage into an AC power supply of a voltage, current, and frequency required for operating the motor 3 by the inverter 10. When receiving an output of the inverter section 5, the motor is operated at a predetermined rotation speed. Next, in the regeneration mode, the inverter 10 operates so as to run the motor 3 as a generator. As a result, rotation energy of the motor 3 is fed back through the smoothing circuit 9 via the power supply inverter 7 to the input power supply 1, applying an electric brake. The inverter controller 11 controls the inverter 10 so as to drive the motor 3 in response to an external motor operation command received on the interface circuit 12. The power supply inverter 7 inputs the supply voltage magnitude, frequency, and phase, and voltage of the smoothing circuit 9. When the smoothing circuit voltage becomes greater than the power supply voltage as in the regeneration mode, the power supply inverter 7 is driven at the same frequency and phase as the input power supply, thereby feeding back the energy to the input power supply 1. Thus, the converter section 4 has a number of components, but a simple function, while the inverter section 5 has functions such as controlling the motor speed and rotation position and interfacing with an external controller and serves as the central function and fundamental operation of the motor operation controller 2.

Next, the conventional examples for accommodating supply voltages incompatible with the voltage specifications of the motor 3 will be discussed. The following three methods can be used for accommodating supply voltages incompatible with the voltage specifications:

Method 1: The withstand voltage, allowable voltage, and current of the motor operation controller 2 and the motor 3 are considered for selecting components and designing the structure in response to input voltages.

Method 2: As shown in FIG. 29, the transformer 13 is inserted between the input power supply 1a and the motor operation controller 2 for making voltage conversion.

Method 3: As shown in FIG. 31, the internal DC voltage converter 20 is provided.

According to Method 1, 200VAC motor operation controllers and 200-VAC motors cannot be used at 400 VAC when considering the withstand voltage, and cannot be used at 100 VAC when considering the current capacity of main circuit parts because a double current is required, although the voltage becomes a half as compared with 200 VAC. As a result, the motor operation controllers 2 and the motors 3 of different types must be provided for various power supply voltages.

According to Method 2, different types of transformers must be provided for various voltages.

According to Method 3, the motor 3 having specifications different from the power supply voltage la can be used, but a transformer as in Method 2 is required in order to provide insulation. Although a single internal inverter section can be used for various supply voltages, different types of motor operation controllers need to be provided.

FIG. 32 is a circuit diagram of an insulation type bidirectional DC voltage converter disclosed in U.S. Pat. No. 5,027,264, wherein numeral 21 is a primary smoothing circuit, numeral 22 is a secondary smoothing circuit, numeral 100 is an insulation type bidirectional DC voltage converter, numeral 110 is a switching element controller of the insulation type bidirectional DC voltage converter 100, and numeral 120 is a voltage loop controller of the insulation type bidirectional DC voltage converter 100. The insulation type bidirectional DC voltage converter 100 comprises primary switching elements 101a–101d, an internal transformer 102, and secondary switching elements 103a–103d. Numerals i1, iL1, iL2, and i2 denote currents flowing in the arrow directions in FIG. 32 and V1 and V2 denote primary and secondary voltages respectively.

FIG. 33 is a block diagram showing an internal configuration example of the switching element controller 110 in, FIG. 32, wherein numeral 111 is a pulse generator, numeral 112 is a phase shift circuit for inputting phase difference ph and shifting the phase of an output pulse of the pulse generator 111 by phase difference ph, and numerals 113 and 114 are NOT circuits for inverting pulse signals. Assuming that a pulse generated by the pulse generator 111 is pls, the switching element controller 110 causes pls to be input to the primary switching elements 111a and 110d and inverted pls to be input to the primary switching elements 101b and 110c. Also, it causes pls whose phase is shifted by phase difference ph to be input to the secondary switching elements 103a and 103d and inverted pls whose phase is shifted by phase difference ph to be input to the secondary switching elements 103b and 103c.

FIG. 34(a) is a block diagram showing an internal configuration example of the voltage loop controller 120 in FIG. 32, wherein numeral 121 is a subtractor for finding a difference between secondary voltage detection value V2 and secondary voltage target value V2* in the insulation type bidirectional DC voltage converter 100 and numeral 122 is a voltage loop gain circuit made up of, for example, a proportional element and an integrating element.

FIG. 34(b) is a flowchart representing the operation of the voltage loop controller 120 in FIG. 34(a). Secondary voltage V2 is input at step S101, voltage deviation V2er is calculated at step S102, phase difference ph, a controlled variable, is found at step S103, and the phase difference ph is output at step S104.

FIGS. 35 and 36 are timing charts and current waveform charts showing the operation state of primary and secondary drive circuits; FIG. 35 shows the power mode and FIG. 36 shows the regeneration mode. In the figures, signals 101a to 101d and 103a to 103d indicate the operation of the switching elements assigned the same reference numerals; the low pulse denotes the switch OFF state and the high pulse denotes the switch ON state.

Next, the operation will be discussed with reference to FIGS. 35 and 36. The insulation type bidirectional DC voltage converter 100 bidirectionally converts the primary DC voltage V1 into the secondary DC voltage V2 while insulating them from each other.

Since the primary switching elements 101a and 101d and the secondary switching elements 103b and 103c are ON in section a in FIG. 35, the primary current flows from the primary smoothing capacitor 21→switching element 101a internal transformer 102→switching element 101d- primary smoothing capacitor 21, applying voltage V1 to the primary winding of the internal transformer 102. Assuming that the turn ratio of the internal transformer 102 is n:1, voltage of about V1/n occurs on the secondary winding of the internal transformer 102 and a current flows from the internal transformer 102→switching element 103b secondary smoothing capacitor 22→switching element 103c→internal transformer 102. Assuming that the primary and secondary currents of the internal transformer 102 are iL1 and iL2 respectively, the current value iL2 is $$iL2 = n \cdot iL1 \qquad (1)$$

Now, if the leakage inductance of the internal transformer 102 is Lh and a sufficiently small value as compared with mutual inductance is set, iL1 is found with respect to ON time t according to the following expression:

$$iL1 = (V1 + n \cdot V2) \cdot t/Lh \qquad (2)$$

Now, assume that the phase overlap time is ph and that the current at the time is IL1x. As seen from Expression (2), the current increases in proportion to V1+n·V2 and thus increases in short time.

Next, in section b, the switching elements 103b and 103c are turned OFF and the primary current path is the same as described above; the secondary current flows from the internal transformer 102→switching element 103a (diode provided in conjunction with the element) secondary smoothing capacitor 22→switching element 103d (diode provided in conjunction with the element)→internal transformer 102. The direction of i2 is reversed. Therefore, $$iL132\ IL1x + (V1 - n \cdot V2) \cdot t/Lh \qquad (3)$$

Assume that the current value at the time is IL1y.

Next, since the switching elements 101a and 101d are turned OFF in section c, the direction of the primary current is switched and the current flows from the internal transformer 102→switching element 101c (diode provided in conjunction with the element)→primary smoothing capacitor 21→switching element 101b (diode provided in conjunction with the element)→internal transformer 102. The secondary current is the same as described above. The current value decreases as in $$iL1 = -IL1y + (V1 + n \cdot V2) \cdot t/Lh \qquad (4)$$

and continues to decrease until iL1=0.

Since the primary switching elements 101b and 101c and the secondary switching elements 103a and 103d are ON in section d, the primary current flows from the primary smoothing capacitor 21→switching element 101c→internal transformer 102→switching element 101b→primary smoothing capacitor 21. The secondary current flows from the internal transformer 102→switching element 103d secondary smoothing capacitor 22→switching element 103a→internal transformer 102. The current value is the same as in Expression (2). Therefore, the current becomes IL1x at the same phase overlap time ph.

Next, in section e, the switching elements 103a and 103d are turned OFF and the primary current path is the same as described above; the secondary current flows from the internal transformer 102→switching element 103c (diode provided in conjunction with the element) secondary smoothing capacitor 22→switching element 103b (diode provided in conjunction with the element)→internal transformer 102. The direction of i2 is reversed. Therefore, the current value is the same as in (3).

Next, since the switching elements 101*b* and 101*c* are turned OFF in section f, the direction of the primary current is switched and the current flows from the internal transformer 102→switching element 101*a* (diode provided in conjunction with the element)→primary smoothing capacitor 21→switching element 101*d* (diode provided in conjunction with the element)→internal transformer 102. The secondary current is the same as described above. The current value is the same as in Expression (4) and continues to decrease until iL1=0.

Next, the operation in the regeneration mode will be described. Since the motor operates as a generator in the regeneration mode, the secondary voltage V2 increases and power flows reversely from the secondary winding to the primary winding. First, the primary switching elements 101*b* and 101*c* and the secondary switching elements 103*a* and 103*d* are ON in section g in FIG. 36, thus the secondary current flows from the secondary smoothing capacitor 22 switching element 103*a*→internal transformer 102 switching element 103*d*→secondary smoothing capacitor 22, applying voltage V2 to the secondary winding of the internal transformer 102. Voltage of about n·V2 occurs on the primary winding of the internal transformer 102 and a current flows from the internal transformer 102 switching element 101*b*→primary smoothing capacitor 21 switching element 101*c*→internal transformer 102. The current value is found according to the following expression:

$$iL1=(V1+n\cdot V2)\cdot t/Lh \quad (5)$$

Now, assume that the phase overlap time is Tx and that the current at the time is IL1x. As seen from Expression (5), the current increases in proportion to V1+n·V2 and thus increases in short time.

Next, in section h, the switching elements 101*b* and 101*c* are turned OFF and the secondary current path is the same as described above; the primary current flows from the internal transformer 102→switching element 101*a* (diode provided in conjunction with the element)→primary smoothing capacitor 21→switching element 101*d* (diode provided in conjunction with the element)→internal transformer 102. The direction of i1 is reversed. Therefore, $$iL1=-IL1x+(n\cdot V231\ V1)\cdot t/Lh \quad (6)$$

Assume that the current value at the time is IL1y.

Next, since the switching elements 103*a* and 103*d* are turned OFF in section i, the direction of the secondary current is switched and the current flows from the internal transformer 102→switching element 103*c* (diode provided in conjunction with the element)→secondary smoothing capacitor 22→switching element 103*b* (diode provided in conjunction with the element)→internal transformer 102. The primary current is the same as described above. The current value decreases as in $$iL1=-IL1y+(V1+n\cdot V2)\cdot t/Lh \quad (7)$$

and continues to decrease until iL1=0.

Since the primary switching elements 101*a* and 101*d* and the secondary switching elements 103*b* and 103*c* are ON in section j, the secondary current flows from the secondary smoothing capacitor 22→switching element 103*c*→internal transformer 102→switching element 103*b*→secondary smoothing capacitor 22. The primary current flows from the internal transformer 102→switching element 101*d*→primary smoothing capacitor 21→switching element 101*a*→internal transformer 102. The current value is the same as in Expression (5). Therefore, the current becomes IL1x at the same phase overlap time ph.

Next, in section k, the switching elements 101*a* and 101*d* are turned OFF and the secondary current path is the same as described above; the primary current flows from the internal transformer 102→switching element 101*c* (diode provided in conjunction with the element)→primary smoothing capacitor 21→switching element 101*b* (diode provided in conjunction with the element)→internal transformer 102. The direction of i1 is reversed. Therefore, the current value is the same as in (6).

Next, since the switching elements 103*b* and 103*c* are turned OFF in section 1, the direction of the secondary current is switched and the current flows from the internal transformer 102→switching element 103*a* (diode provided in conjunction with the element)→secondary smoothing capacitor 22→switching element 103*d* (diode provided in conjunction with the element) internal transformer 102. The primary current is the same as described above. The current value is the same as in Expression (7) and continues to decrease until iL1=0.

Therefore, the currents i1, iL1, and i2 become trapezoidal waveforms as shown in FIGS. 35 and 36, and their transfer power P becomes approximately as follows:

$$P=(\text{average current of i2})\times V2=n\cdot IL1\cdot V2 \quad (8)$$

Thus, DC voltages can be converted bidirectionally in an insulated manner.

Next, the characteristics of the converter in FIG. 32 will be discussed. FIG. 37 is a graph showing the secondary voltage V2 when load resistor R0=3Ω is connected to the secondary winding and the phase difference ph is changed on switching period Ts=50 μs when the leakage inductance of the internal transformer 102, Lh, is 40 μH, the turn ratio n is 2, and the primary voltage V1 is 600 V. As seen in FIG. 37, the secondary voltage V2 can be controlled by changing the phase difference ph.

Next, FIG. 38(*a*) shows the observation results of the secondary current iL2 of the internal transformer 102 when the primary voltages V1 are 150 V and 125 V by controlling the secondary voltage V2 fixed to 75 V with the turn ratio of the internal transformer 102, n, set to 2. The results indicate that when V1=n·V2, iL2 becomes a trapezoidal waveform, but when V1=/n·V2, iL2 does not becomes a trapezoidal waveform and the peak current of iL2 increases. FIG. 38(*b*) shows how the peak value of iL2 changes when the primary voltage V1 is changed under the same conditions as in FIG. 38(*a*). Thus, by performing phase difference control of the insulation type bidirectional DC voltage converter in FIG. 32, the peak current increases except when the relationship of V1=n·V2 holds.

We have discussed the insulation type bidirectional DC voltage converter using a single-phase transformer shown in FIG. 32. In U.S. Pat. No. 5,027,264, a three-phase insulation type bidirectional DC voltage converter shown in FIG. 39 and a multi-phase insulation type bidirectional DC voltage converter are also described; they have characteristics similar to those described above.

Since the conventional motor operation controllers are thus configured, the following must be provided to accommodate various power supply voltages:

1. Different types of motor operation controllers and motors conforming to the supply voltages;
2. different types of transformers conforming to the voltage specifications and output capacity of motor operation controller and motor for each supply voltage; or 3. different types of motor operation controllers containing a DC voltage converter for a common motor. However, of machine development, productivity, inventory management, maintenance management, etc., arise.

Main power supply voltages for motor control are 300–600 VDC and are supplied to machines often coming in contact with human bodies, such as motors, thus a complete insulation mechanism is required between the input power supply and machine. For this purpose, additional transformers need to be provided in options 1 and 2 described above.

Since circuit parts, (based on withstand voltage and current capacity) are selected for motor operation controllers, motors, and transformers in response to the power supply voltage specifications, the outer dimensions, outside structure, and weight vary greatly depending on the power supply voltage. It is remarkably difficult to standardize the motor operation controllers, motors, and transformers.

Motor operation controllers, motors, and transformers need to be mounted on machines using a motor, such as plant machines and tool machines, conforming to their respective voltage specifications. Not only replacement of the motor operation controllers, motors, and transformers and wiring construction, but also changing of structures, outlines, and installation places of the machines is incident to changing of the voltage specifications.

The motor operation controllers and motors are electrically connected directly, and there is a high possibility that insulation deterioration will cause an electric shock accident to occur.

The insulation type bidirectional DC voltage converter disclosed in U.S. Pat. No. 5,027,264 is prone to become overcurrent and requires switching elements and an internal transformer with a large current capacity.

SUMMARY OF THE INVENTION

It is therefore an object of the invention to provide a motor operation controller which can accommodate different power supply voltages by changing a minimum circuit configuration using common motors, wiring, etc., and has an insulation structure between input power supply and the motors for providing the capability of bidirectional operation in power mode and regeneration mode.

It is another object of the invention to suppress overcurrent of the insulation type bidirectional DC voltage converter disclosed in U.S. Pat. No. 5,027,264.

According to the invention, there is provided a motor operation controller comprising a converter section having a rectifier for converting an AC power supply voltage into a DC voltage, a power supply inverter circuit for converting a DC voltage into an AC power supply voltage, and an insulation type bidirectional DC voltage converter and an inverter section for supplying power to a motor.

According to the invention, there is provided a motor operation controller comprising a converter section having a rectifier for converting an AC power supply voltage into a DC voltage, a power supply inverter circuit for converting a DC voltage into an AC power supply voltage, and a bidirectional DC voltage converter and an inverter section for supplying power to a motor, wherein the motor operation controller is divided into two blocks of the converter section and the inverter section, which are built in separate cases.

According to the invention, there is provided an insulation type bidirectional DC voltage converter comprising a first converter having switching elements for converting a first DC voltage into an AC voltage, a transformer having a primary winding connected to an AC voltage output of the first converter, and a second converter having switching elements for converting an AC voltage connected to a secondary winding of the transformer into a second DC voltage, wherein transfer power is controlled by performing drive phase difference control of all power transmission switching elements and some of power reception switching elements.

The insulation type bidirectional DC voltage converter according to the invention further includes a voltage control loop circuit for holding a ratio between primary and secondary voltages constant.

The insulation type bidirectional DC voltage converter according to the invention further includes a voltage control loop circuit for holding a difference between secondary voltage into which primary voltage is converted and secondary voltage constant.

The insulation type bidirectional DC voltage converter according to the invention further includes a voltage control loop circuit for achieving a desired control by selecting constant secondary voltage control, constant difference control between secondary voltage into which primary voltage is converted and secondary voltage, or constant primary-secondary voltage ratio control in response to operation state.

The insulation type bidirectional DC voltage converter according to the invention, wherein the operation state used to determine the control mode of the insulation type bidirectional DC voltage converter is transfer power, further includes a voltage control loop circuit for performing the constant secondary voltage control if the transfer power is small or performing the constant difference control between secondary voltage into which primary voltage is converted and secondary voltage or the constant primary-secondary voltage ratio control if the transfer power is large.

The insulation type bidirectional DC voltage converter according to the invention, wherein the operation state used to determine the control mode of the insulation type bidirectional DC voltage converter is primary voltage, further includes a voltage control loop circuit for performing the constant secondary voltage control if the primary voltage is higher than a setup value or performing the constant difference control between secondary voltage into which primary voltage is converted and secondary voltage or the constant primary-secondary voltage ratio control if the primary voltage is lower than the setup value.

The insulation type bidirectional DC voltage converter according to the invention further includes a voltage control loop circuit for controlling by changing a control system gain depending on the selected control method when one of constant primary-secondary voltage ratio control, constant difference control between the secondary voltage into which the primary voltage is converted and the secondary voltage, and constant secondary voltage control is selected for use.

The insulation type bidirectional DC voltage converter according to the invention further includes a voltage control loop circuit for defining a maximum value of a command change slope so that a command value of secondary voltage does not rapidly change when the control methods are changed when one of constant primary-secondary voltage ratio control, constant difference control between the secondary voltage into which the primary voltage is converted and the secondary voltage, and constant secondary voltage control is selected for use.

The insulation type bidirectional DC voltage converter according to the invention further includes a filter capable of attenuating a detected primary voltage ripple.

According to the invention, there is provided an insulation type bidirectional DC voltage converter comprising a first converter having switching elements for converting a first DC voltage into an AC voltage, a transformer having a primary winding connected to an AC voltage output of the first converter, a second converter having switching elements for converting an AC voltage connected to a secondary winding of the transformer into a second DC voltage, and a voltage control loop circuit for controlling primary and secondary voltages, wherein a pulse width is changed in response to a difference between the primary voltage and the primary voltage into which the secondary voltage is converted.

According to the invention, there is provided a motor operation controller comprising a converter having a rectifier for converting an AC power supply voltage into a DC voltage, a power supply inverter circuit for converting a DC voltage into an AC power supply voltage, and an insulation type bidirectional DC voltage converter and an inverter section for supplying power to a motor, wherein when the power is turned on, the rectifier and the insulation type bidirectional DC voltage converter are operated at the same time.

The motor operation controller in the invention, which comprises an insulation type bidirectional DC voltage converter, can convert a converter section output voltage into a DC voltage in a given range for different power supply voltages and can make bidirectional voltage conversion.

The motor operation controller in the invention is divided into two blocks of a converter section for making bidirectional voltage conversion to a DC voltage in a given range for different power supply voltages and an inverter section, which are contained in separate cases. Thus, different power supply voltages can be accommodated by changing only the converter section without changing the motor, inverter, wiring, etc.

The insulation type bidirectional DC voltage converter in the invention controls transfer power by performing drive phase control of the power transmission switching elements and power reception single-side arm switching elements of the internal transformer. Thus, the current waveform slope can be reduced by half for improving controllability.

Since the secondary voltage is controlled in proportion to a change in the primary voltage, the maximum current can be suppressed even if the primary voltage changes.

Since control is performed so as to hold constant the difference between the secondary voltage into which the primary voltage is converted and the secondary voltage, the maximum current can be suppressed for a change in the primary voltage or an inverter section output change.

Since control is performed by selecting the constant secondary voltage control, constant difference control between secondary voltage into which primary voltage is converted and secondary voltage, or constant primary secondary voltage ratio control in response to the operation state, the maximum current can be suppressed in response to a condition such as a power supply voltage change or motor output change.

Since control is performed by selecting the constant secondary voltage control for light output or the constant difference control between secondary voltage into which primary voltage is converted and secondary voltage or constant primary-secondary voltage ratio control for heavy output, the maximum current can be suppressed for a power supply voltage change or motor output change.

Since control is performed by selecting the constant secondary voltage control when the primary voltage is higher than a setup value or the constant difference control between secondary voltage into which primary voltage is converted and secondary voltage or constant primary-secondary voltage ratio control when the primary voltage is lower than the setup value, the maximum current can be suppressed when the power is turned on or is abnormal.

When the constant secondary voltage control is performed, the gain is raised properly and when the constant difference control between secondary voltage into which primary voltage is converted and secondary voltage or constant primary-secondary voltage ratio control is performed, the gain is suppressed. Thus, when the constant secondary voltage control is performed, a fast voltage loop response can be made and when the constant difference control between secondary voltage into which primary voltage is converted and secondary voltage or constant primary-secondary voltage ratio control is performed, a ripple of the primary voltage can be prevented from causing the current to vibrate.

When one of the constant secondary voltage control, constant difference control between the secondary voltage into which the primary voltage is converted and the secondary voltage, and constant primary-secondary voltage ratio control is selected for use, the maximum value of the command change slope of the command value of the secondary voltage is defined at the time. Thus, excessive current occurring due to a rapid change in the secondary voltage command can be suppressed.

When the constant primary-secondary voltage ratio control or the constant difference control between the secondary voltage into which the primary voltage is converted and the secondary voltage is performed, a detected primary voltage ripple is attenuated by means of the filter. Thus, the primary voltage ripple can be prevented from causing the current to vibrate.

The maximum pulse width required for the current to become the setup maximum peak current is calculated from the difference between the primary and secondary voltages of the insulation type bidirectional DC voltage converter, and the upper limit of the pulse width is restricted. Thus, the maximum current can be suppressed when the power is turned on or voltage drops.

In the motor operation controller in the invention comprising a converter having a rectifier for converting an AC power supply voltage into a DC voltage, a power supply inverter circuit for converting a DC voltage into an AC power supply voltage, and an insulation type bidirectional DC voltage converter and an inverter section for supplying power to a motor, when the power is turned on, the rectifier and the insulation type bidirectional DC voltage converter are operated at the same time for making primary and secondary voltage changes at the same time. Thus, excessive current can be suppressed.

DESCRIPTION OF THE PREFERRED EMBODIMENTS

Referring now to the accompanying drawings, there are shown preferred embodiments of the invention.

Embodiment 1:

One embodiment of the invention will be discussed with reference to FIG. 1.

Figure 1:
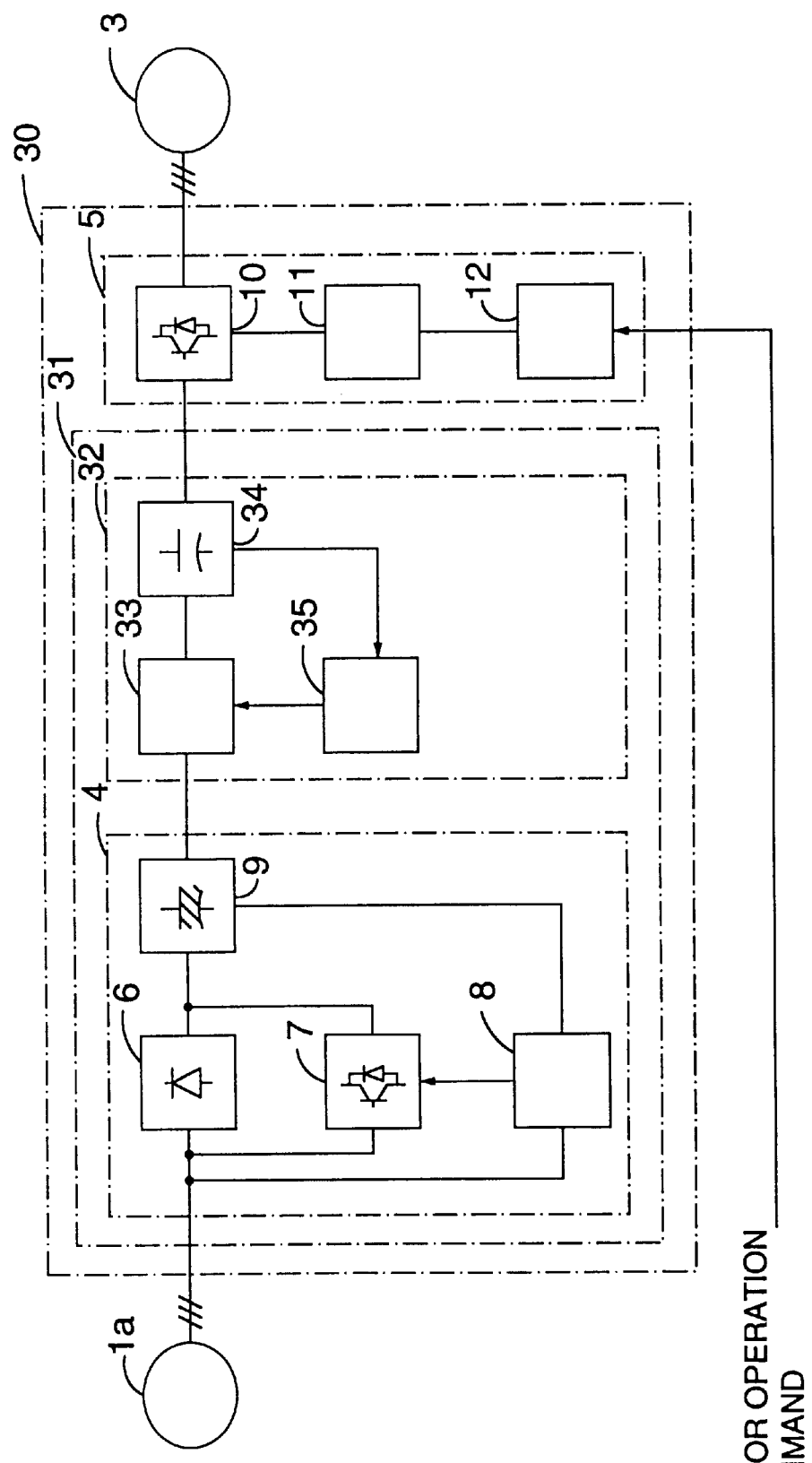
FIG. 1 is a block diagram of a motor operation controller of the invention.
Figure 28:
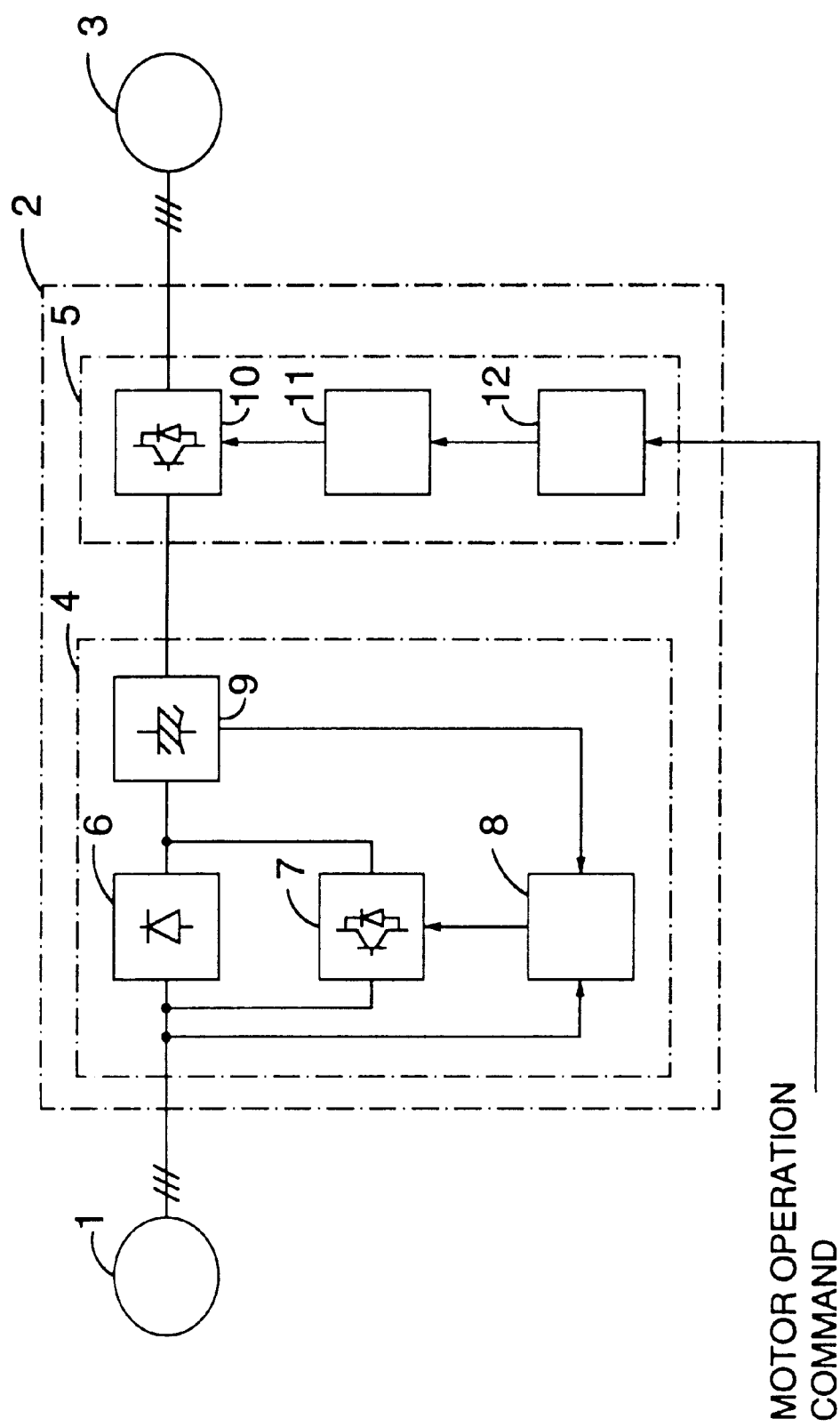
FIG. 28 is a block diagram of the main circuit part of a conventional motor operation controller.
Figure 29:
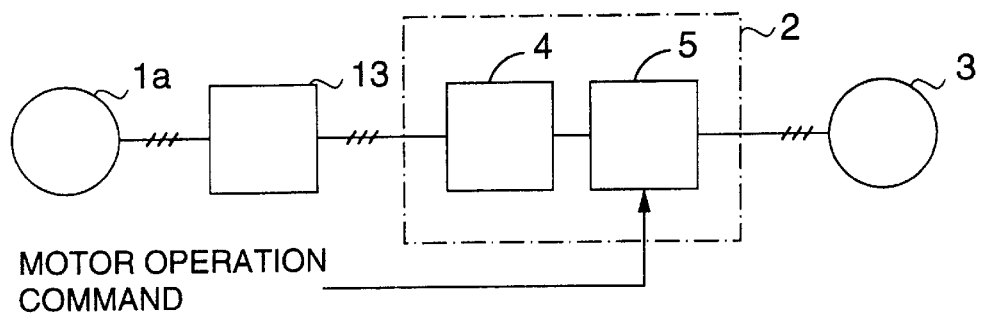
FIG. 29 is a conventional example for accommodating power supply voltages incompatible with the specifications.
Figure 30:
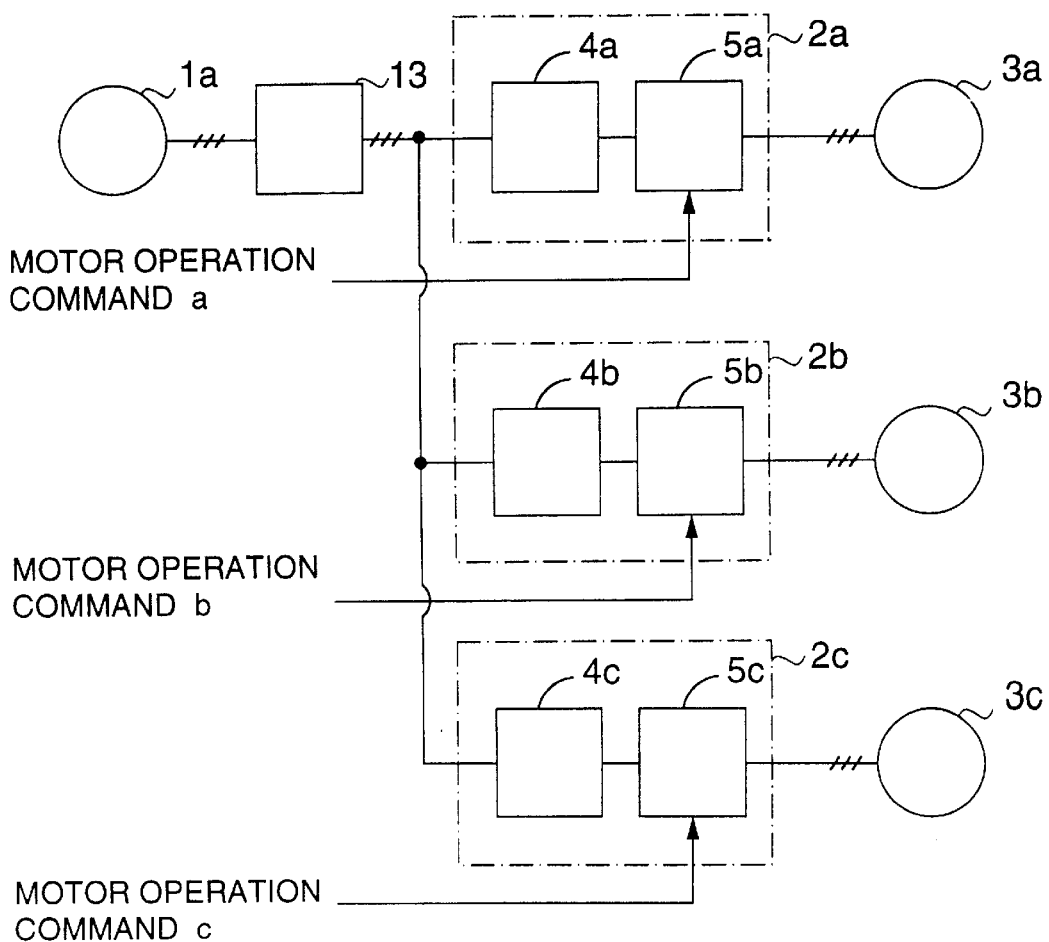
FIG. 30 is a conventional connection example for connecting motor operation controllers and motors.
Figure 31:
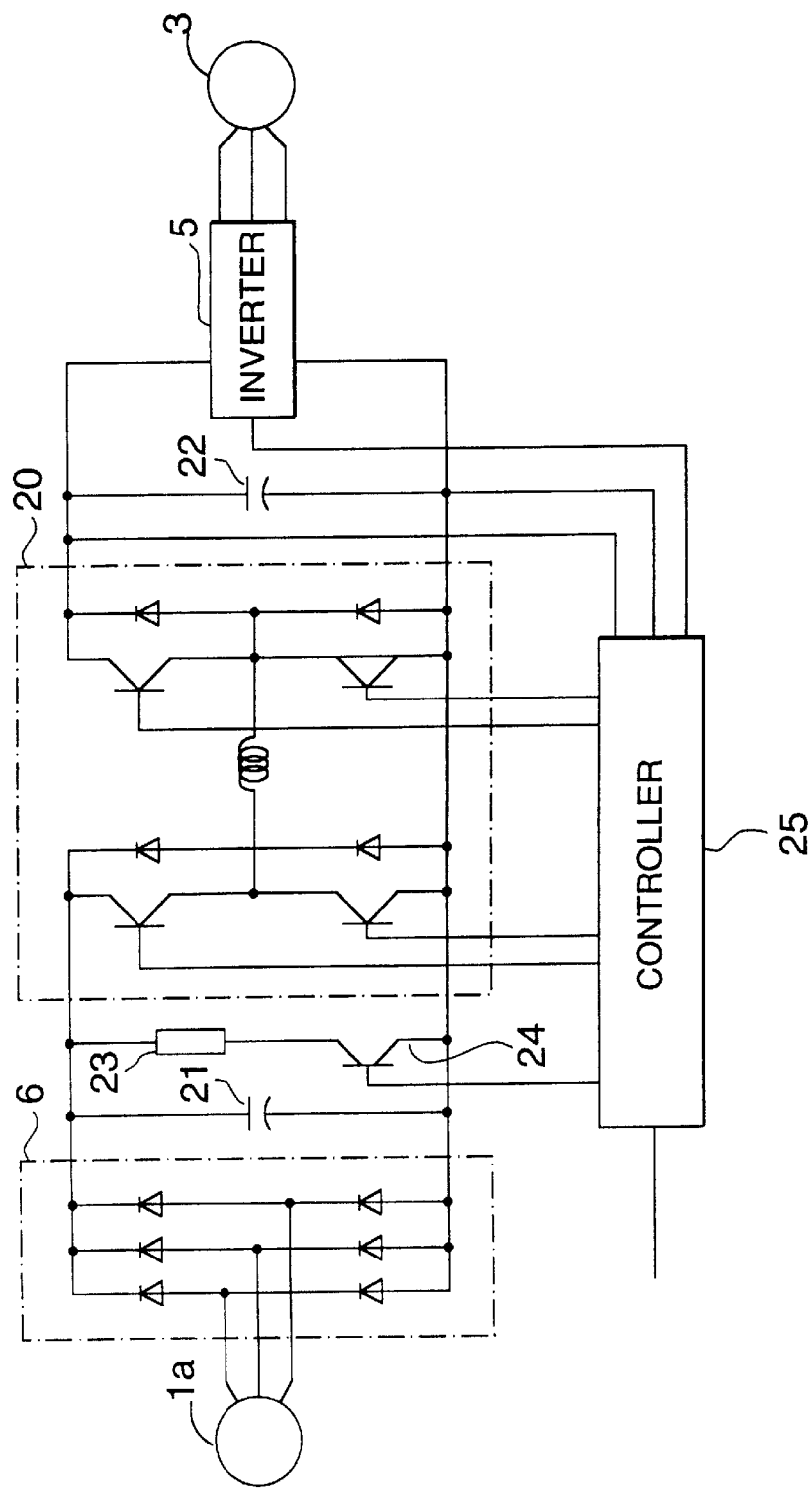
FIG. 31 is a block diagram of the main circuit of a conventional motor operation controller containing a DC voltage converter.

FIG. 1 is a block diagram of a motor operation controller comprising an insulation type bidirectional DC voltage converter of one embodiment of the invention. Circuit parts identical with or similar to those previously described with reference to FIG. 28 are denoted by the same reference numerals in FIG. 1 and will not be discussed again. Numeral 30 is a motor operation controller comprising an insulation type bidirectional DC voltage converter, numeral 31 is a converter section with an insulation type bidirectional DC voltage conversion function, numeral 32 is an insulation type bidirectional DC voltage conversion section, numeral 33 is an insulation type bidirectional DC voltage converter, numeral 34 is a smoothing circuit, and numeral 35 is a controller of the insulation type bidirectional DC voltage converter 33.

In operation, the insulation type bidirectional DC voltage conversion section 32 bidirectionally converts the primary DC voltage V1 changing according to the magnitude of input voltage 1a into the secondary voltage V2 while insulating them from each other. Thus, the input power supply and machine are completely insulated from each other without providing an external transformer, and even machines often coming in contact with human bodies are safe without danger of an electric shock.

Figure 2:
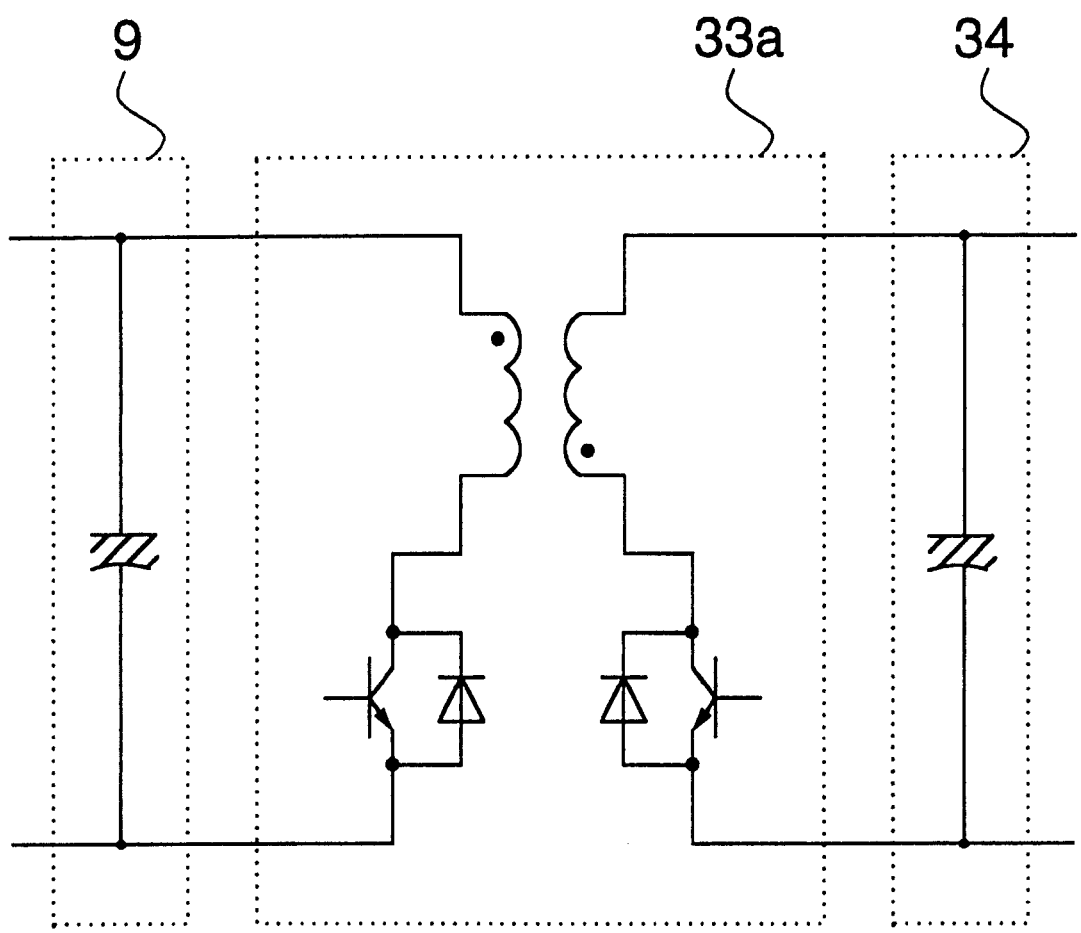
FIG. 2 is a diagram showing one configuration example of an insulation type bidirectional DC voltage converter.
Figure 32:
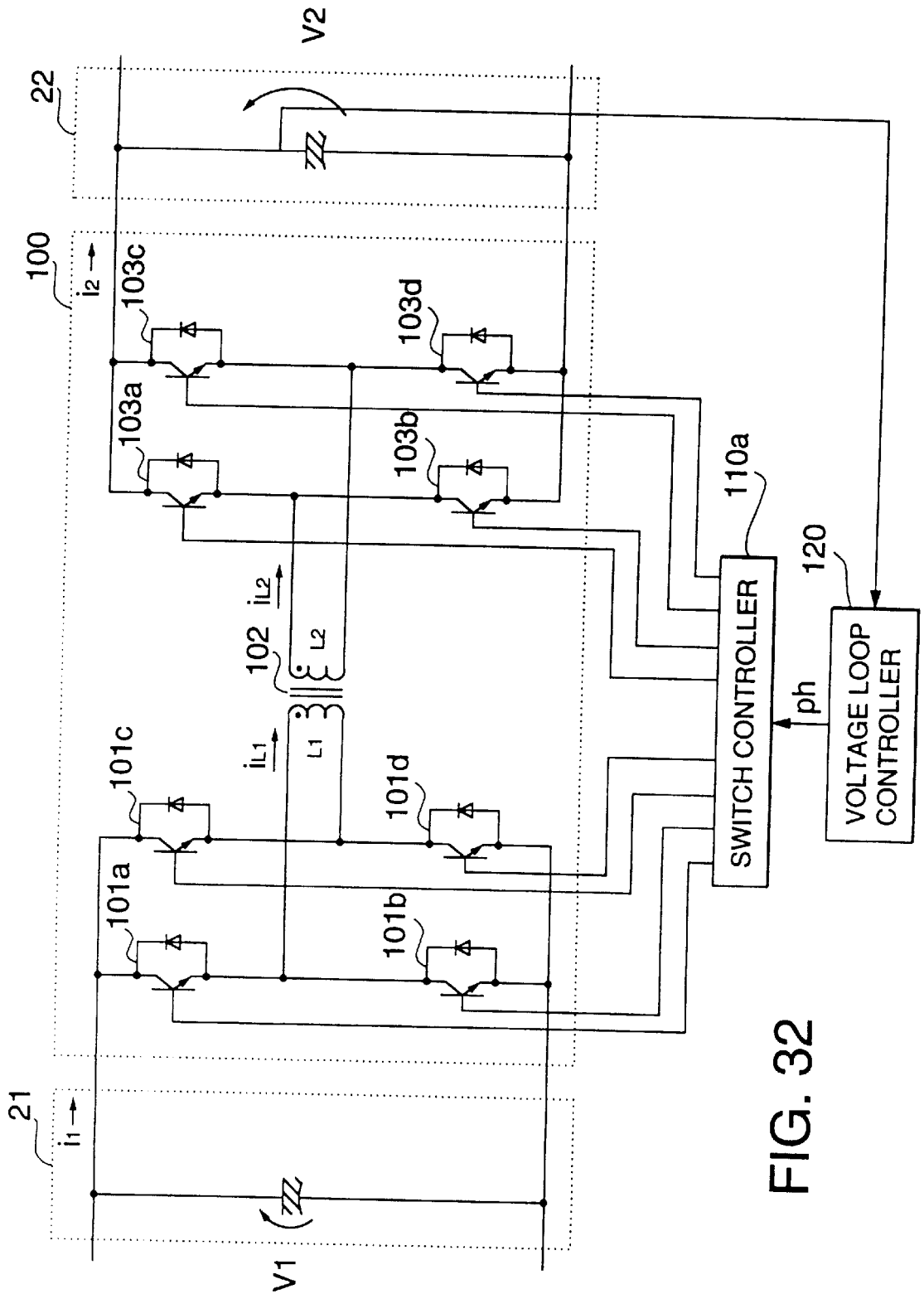
FIG. 32 is a block diagram showing a conventional insulation type bidirectional DC voltage converter.
Figure 39:
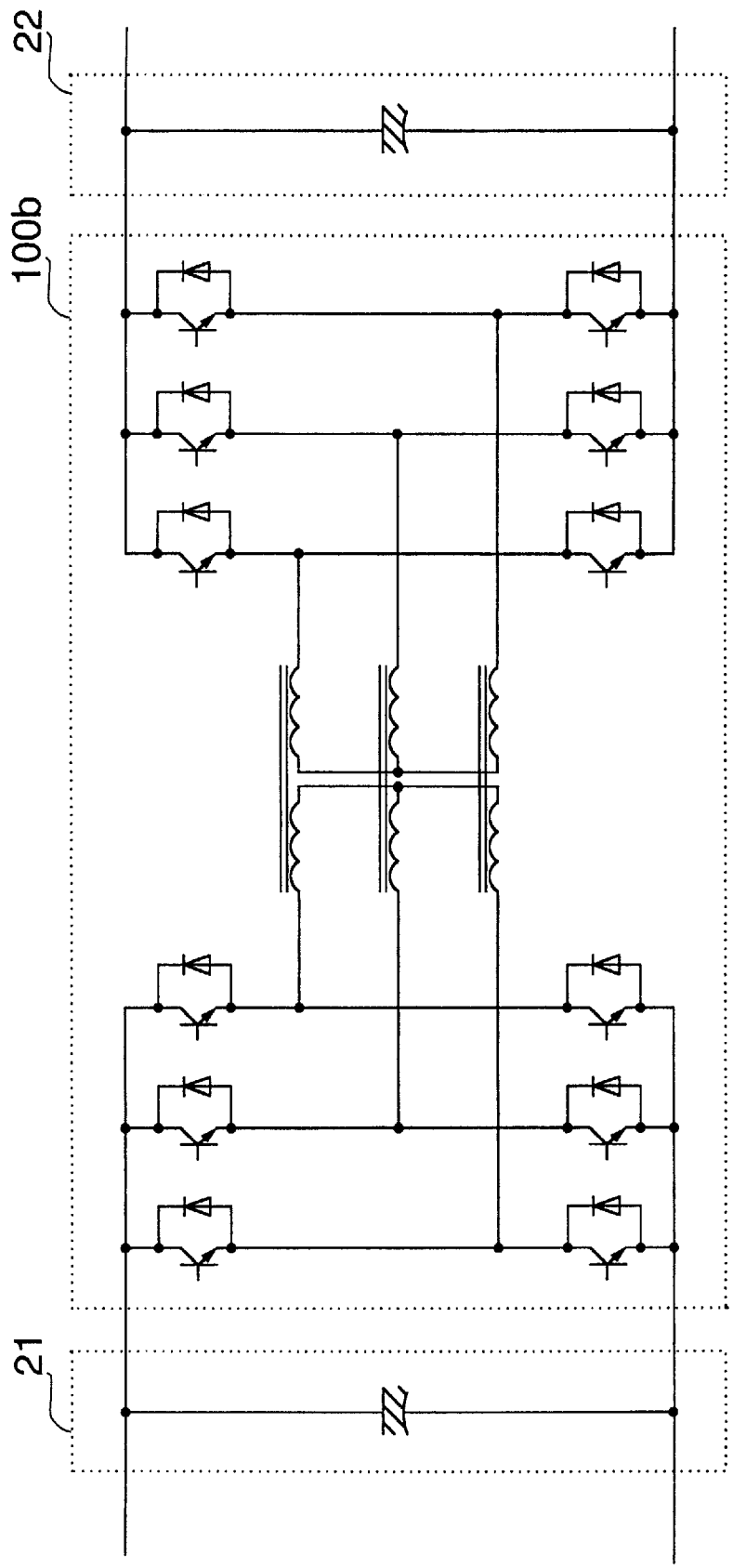
FIG. 39 is a main circuit diagram of another conventional insulation type bidirectional DC voltage converter.

In addition to the conventional insulation type bidirectional DC voltage converters shown in FIGS. 32 and 39, various circuits such as that shown in FIG. 2 are designed as the insulation type bidirectional DC voltage converter 33. FIG. 2 is a circuit diagram proposed on the national conference of Electricity Society in 1993, wherein numeral 33a is an insulation type bidirectional DC voltage converter.

Figure 3:
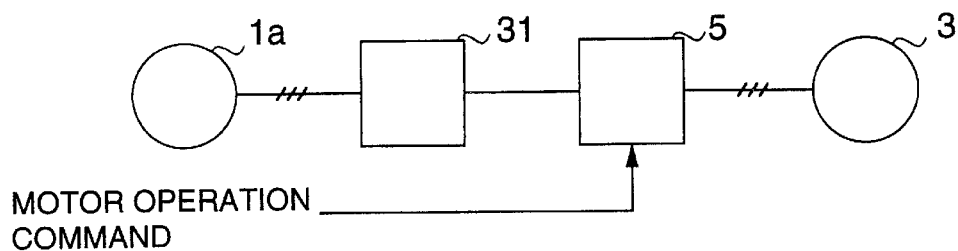
FIGS. 3(a)–3(c) are block diagrams of motor operation controllers of the invention.
Figure 3:
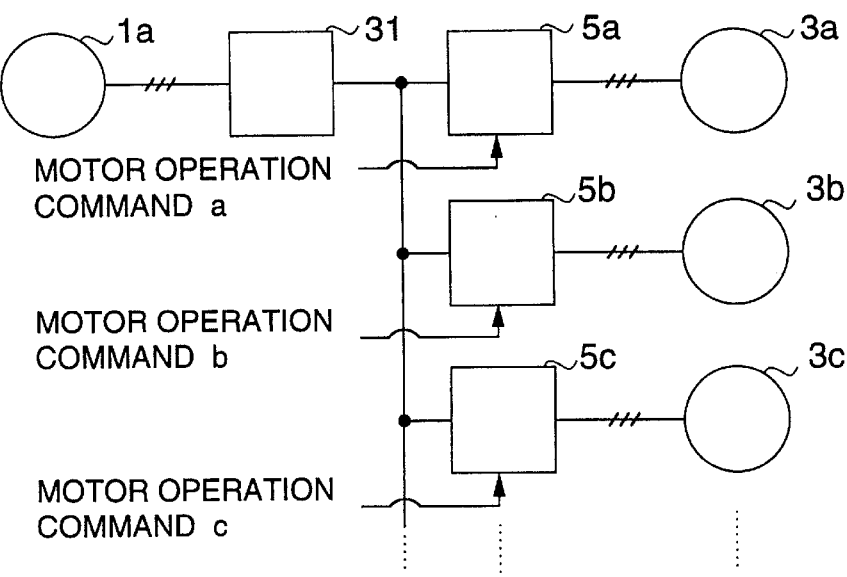
Figure 3:
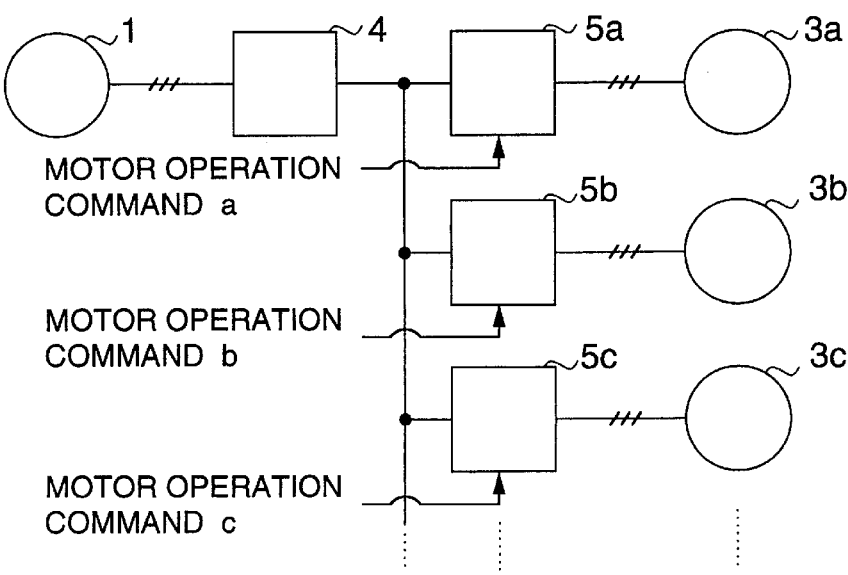

Embodiment 2:

FIG. 3(a) is a block diagram of the configuration in which a motor operation controller is divided into two modules of a converter section 31 with a bidirectional DC voltage conversion function and an inverter section 5 and the modules are built in separate cases.

FIG. 3(b) shows the circuit configuration for driving a plurality of motors 3a, 3b, and 3c. The converter section 31 with a bidirectional DC voltage conversion function is in common use and inverter sections 5a, 5b, and 5c are connected to the motors 3a, 3b, and 3c respectively.

FIG. 3(c) shows an example in which the voltage specifications of the inverter sections and the motors match those of input voltage 1. In this example, the converter section 31 with a bidirectional DC voltage conversion section 32 in FIG. 1 is not required and the converter section 4 of the conventional motor operation controller shown in FIG. 27 can be built in a case as one module for connection to the inverter sections.

Thus, the converter section 31 with a bidirectional DC voltage conversion function or the converter section 4 and the inverter section 5 divided into modules are used in combination, thereby easily accommodating different input voltages. The inverter section to which a large number of external cables are connected in a complicated manner and the motors whose replacement requires precision and a skill can be used as they are, thus the structures, wiring of machines using a motor can be made common independently of the power supply voltage. The types of motor operation controllers and motors can also be minimized. For example, if the converter section 4, the inverter section 5, and the motors are for 200 VAC and the converter section 31 with a bidirectional DC voltage conversion function is for 400 VAC, the converter section 4 and the inverter section 5 can be used in combination for domestic 200-VAC power supply and the converter section 31 with a bidirectional DC voltage conversion function and the inverter section 5 can be used in combination for overseas 400-VAC power supply. As a result, machines manufactured for domestic purpose can be made overseas machines simply by replacing the converter section 31 with a 200-VAC voltage conversion function with that with a 400-VAC voltage conversion function, and the inverter section 5 and the motor 3 and wiring thereto and the cable types, such as withstand voltage and size, can also be made common regardless of the power supply voltage.

Figure 4:
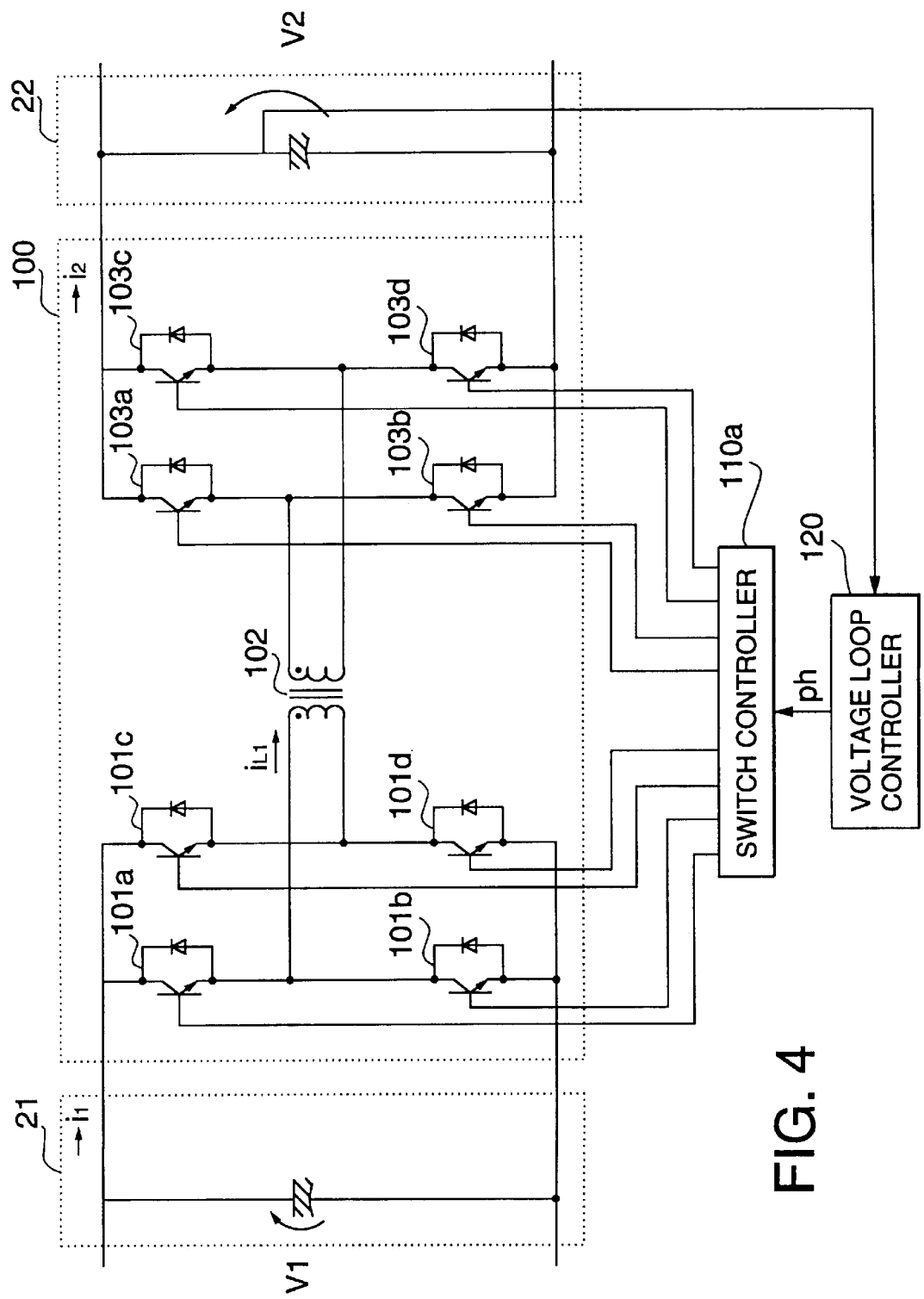
FIG. 4 is a block diagram showing an insulation type bidirectional DC voltage converter of the invention.
Figure 5:
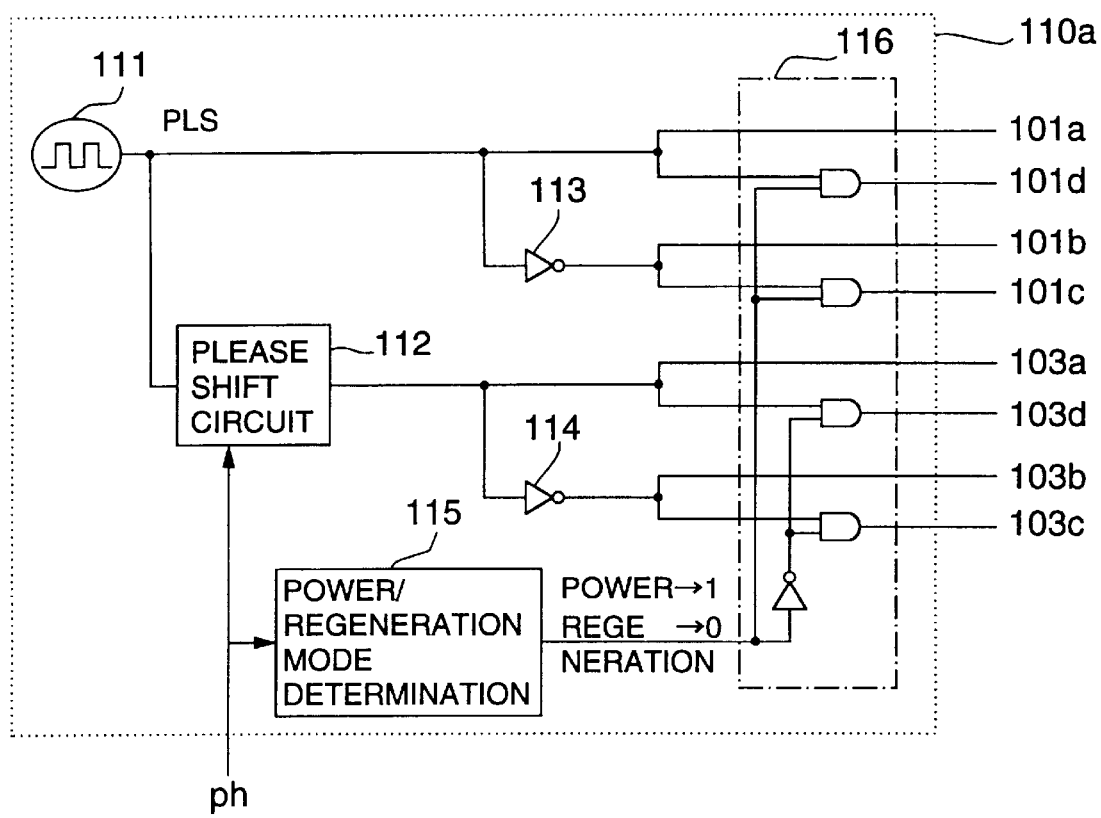
FIG. 5 is an internal block diagram of a switching element controller in FIG. 4.
Figure 6:
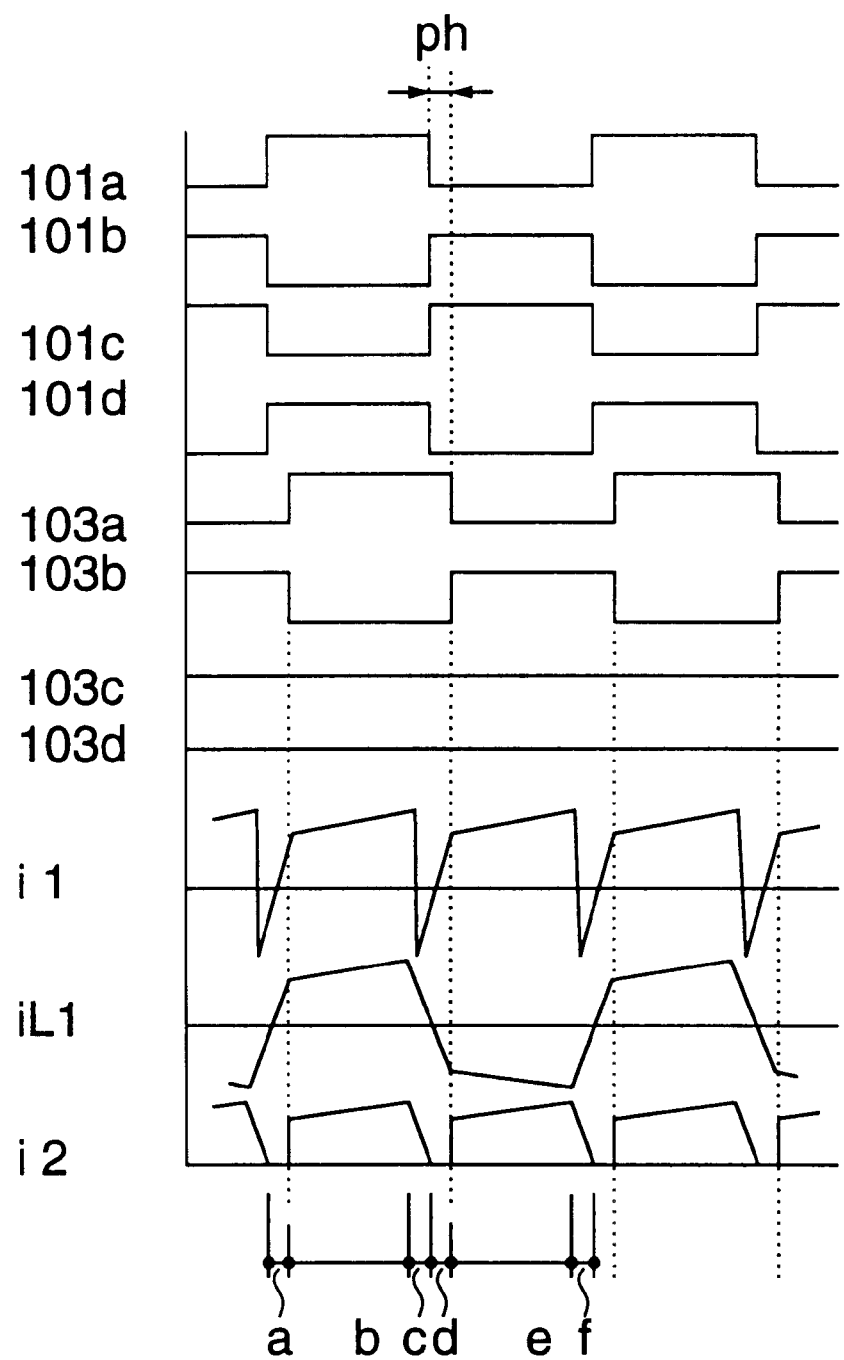
FIG. 6 is a timing chart and a current waveform chart in power mode of the insulation type bidirectional DC voltage converter of the invention.
Figure 7:
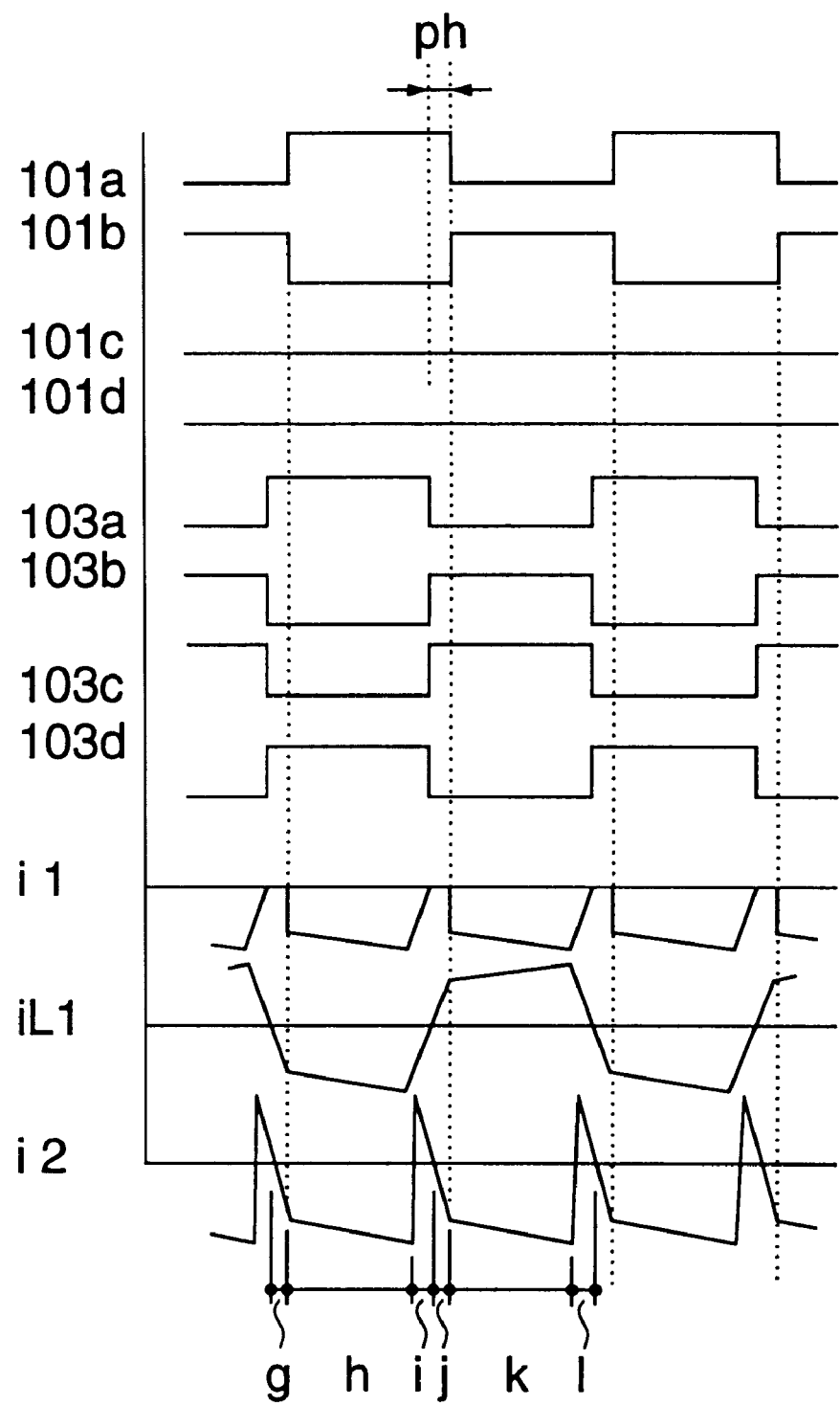
FIG. 7 is a timing chart and a current waveform chart in regeneration mode of the insulation type bidirectional DC voltage converter of the invention.
Figure 33:
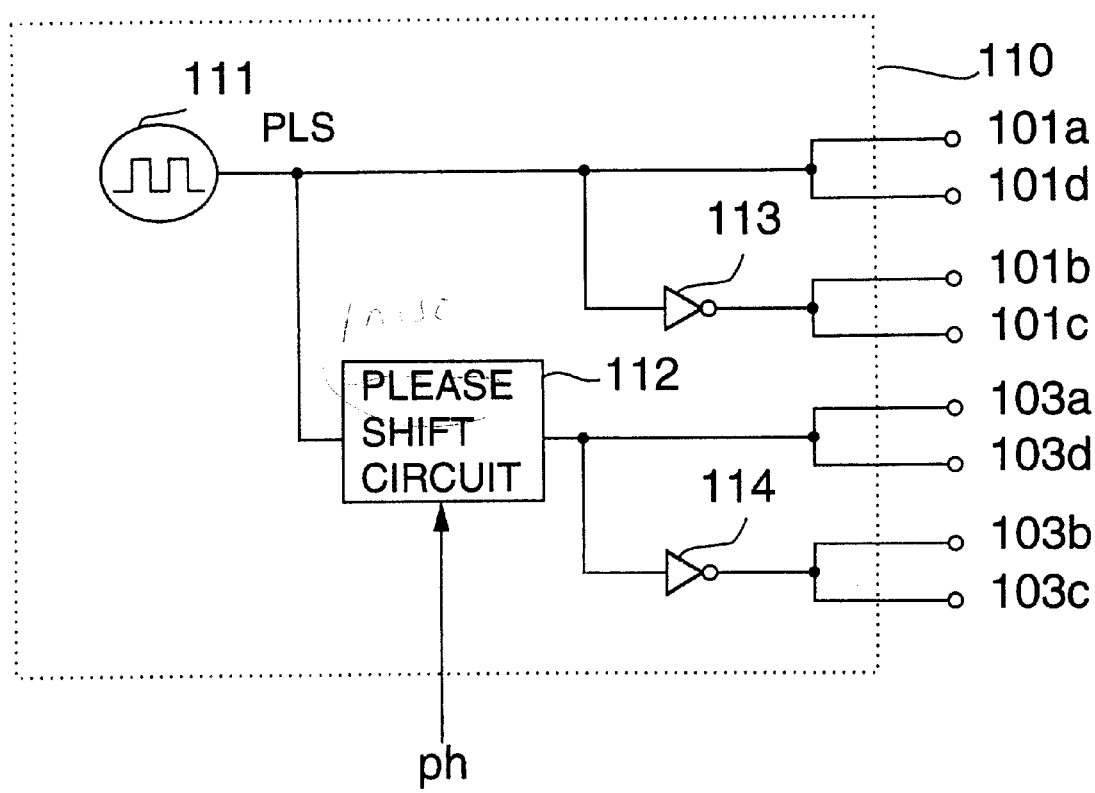
FIG. 33 is an internal block diagram of a switching element controller in FIG. 32.

Embodiment 3:

FIG. 4 is a block diagram of an insulation type bidirectional DC voltage converter of one embodiment of the invention. That is, the insulation type bidirectional DC voltage converter in FIG. 4 differs from the conventional DC voltage converter shown in FIG. 32 with regard to the switching element controller 110a. FIG. 5 is a block diagram showing an internal configuration example of the switching element controller 110a. This switching element controller 110a differs from the conventional switching element controller shown in FIG. 33 with regard to power/regeneration mode determination circuit 115 for determining the power or regeneration mode according to phase difference ph and a drive switch change circuit 116. For example, if the phase difference ph is positive, the power/regeneration mode determination circuit 115 outputs 1 for the power mode; if ph is negative, it outputs 0 for the regeneration mode. When receiving the output, which is 1 (power mode), the drive switch change circuit 116 shuts off secondary switching elements 103c and 103d for performing phase difference control with all primary switching elements and some of the secondary switching elements. If the received output is 0 (regeneration mode), the drive switch change circuit 116 shuts off primary switching elements 101c and 101d for performing phase difference control with some of the primary switching elements and all secondary switching elements. FIGS. 6 and 7 are timing charts and current waveform charts showing the operation state of primary and secondary drive circuits of an internal transformer 102; FIG. 6 shows the power mode and FIG. 7 shows the regeneration mode.

Figure 35:
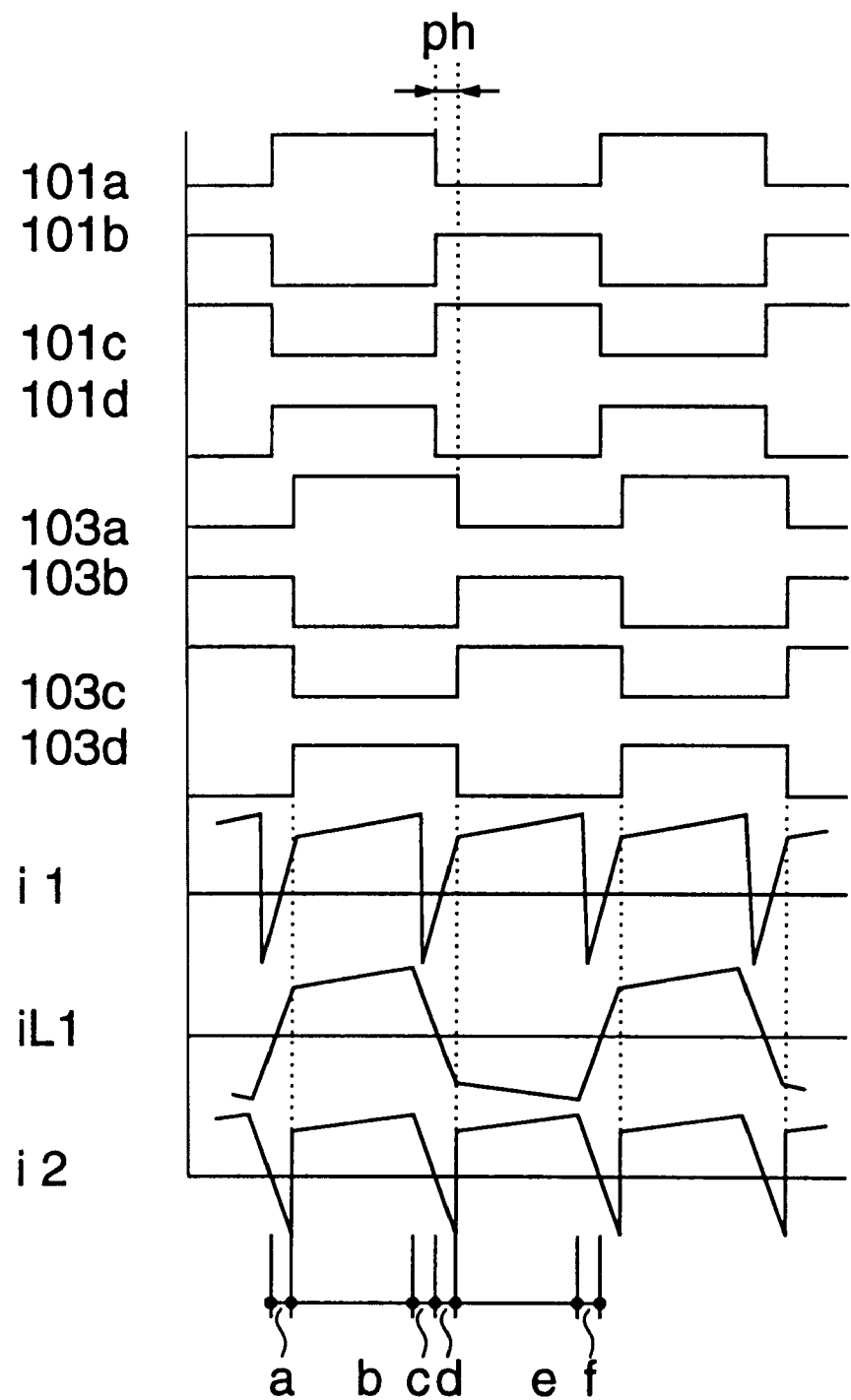
FIG. 35 is a timing chart and a current waveform chart in power mode of a conventional insulation type bidirectional DC voltage converter.
Figure 36:
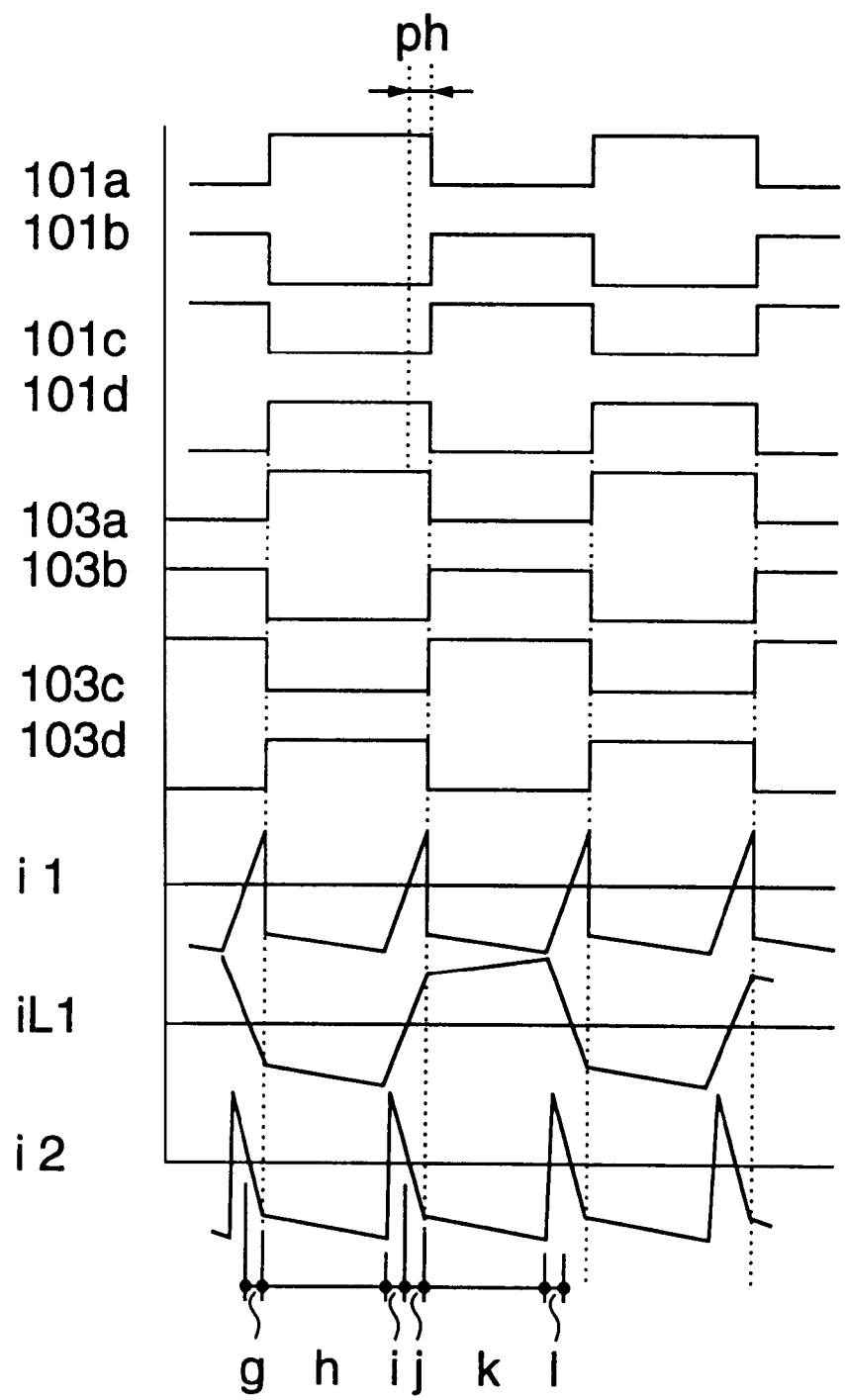
FIG. 36 is a timing chart and a current waveform chart in regeneration mode of a conventional insulation type bidirectional DC voltage converter.
Figure 37:
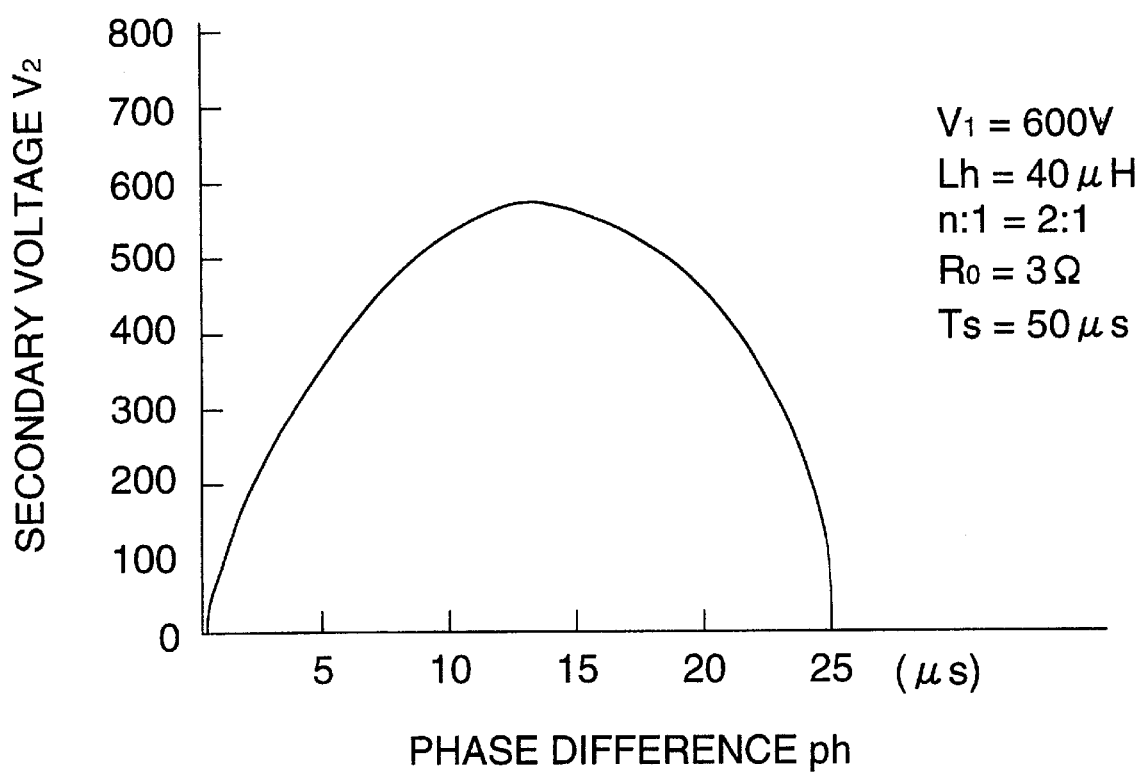
FIG. 37 is a graph showing the characteristics of the conventional insulation type bidirectional DC voltage converter.

The operation of the embodiment will be discussed. The embodiment drives the primary and secondary switching elements at the same time and controlling the phase difference, thereby controlling transfer power and prolonging the time of the phase overlap time ph (phase difference) for improving the controllability. Only sections a, d, g, and j in FIGS. 6 and 7 differ from those shown in FIG. 35 and therefore will be discussed. First, since the primary switching elements 101a and 101d and the secondary switching element 103b are ON in section a in FIG. 6, the primary current flows from primary smoothing capacitor 21→switching element 101a→internal transformer 102→switching element 101d→primary smoothing capacitor 21, applying voltage V1 to the primary winding of the internal transformer 102. Voltage of about V1/n occurs on the secondary winding of the internal transformer 102 and a current flows from the internal transformer 102→switching element 103b→switching element 103d (diode provided in conjunction with the element)→internal transformer 102. The current value is found according to the following expression:

$$iL1 = V1 \cdot t / Lh \qquad (9)$$

In Expression (9), iL1 increases at about a half speed as compared with Expression (2), thus ph can be doubled to make IL1x the same degree and control can be facilitated, as compared with the conventional example.

Since the primary switching elements 101b and 101c and the secondary switching element 103a are ON in section d, the primary current flows from the primary smoothing capacitor 21→switching element 101c internal transformer 102 switching element 10lb primary smoothing capacitor 21. The secondary current flows from the internal transformer 102→switching element 103c (diode provided in conjunction with the element) switching element 103a→internal transformer 102. The current value is the same as in Expression (9).

In the regeneration mode, the primary switching element 101b and the secondary switching elements 103a and 103d are ON in section g in FIG. 7, thus the secondary current flows from the secondary smoothing capacitor 22 switching element 103a→internal transformer 102 switching element 103d→secondary smoothing capacitor 22. The primary current flows from the internal transformer 102→switching element 101b→switching element 101d (diode provided in conjunction with the element)→internal transformer 102. The current value is found according to Expression (9).

Since the primary switching element 101a and the secondary switching elements 103b and 103c are on in section j, the secondary current flows from the secondary smoothing capacitor 22→switching element 103c→internal transformer 102→switching element 103b→secondary smoothing capacitor 22. The primary current flows from the internal transformer 102→switching element 101c (diode provided in conjunction with the element)→switching element 111a→internal transformer 102. The current value is the same as in Expression (9).

As seen in FIGS. 6 and 7, in the power mode, no current returns to the secondary smoothing circuit 22 in sections a and d; in the regeneration mode, no current returns to the primary smoothing circuit 21 in sections g and j. Therefore, the ripple current of the smoothing electrolytic capacitor reduces for small capacity and long life of the electrolytic capacitor.

Figure 8:
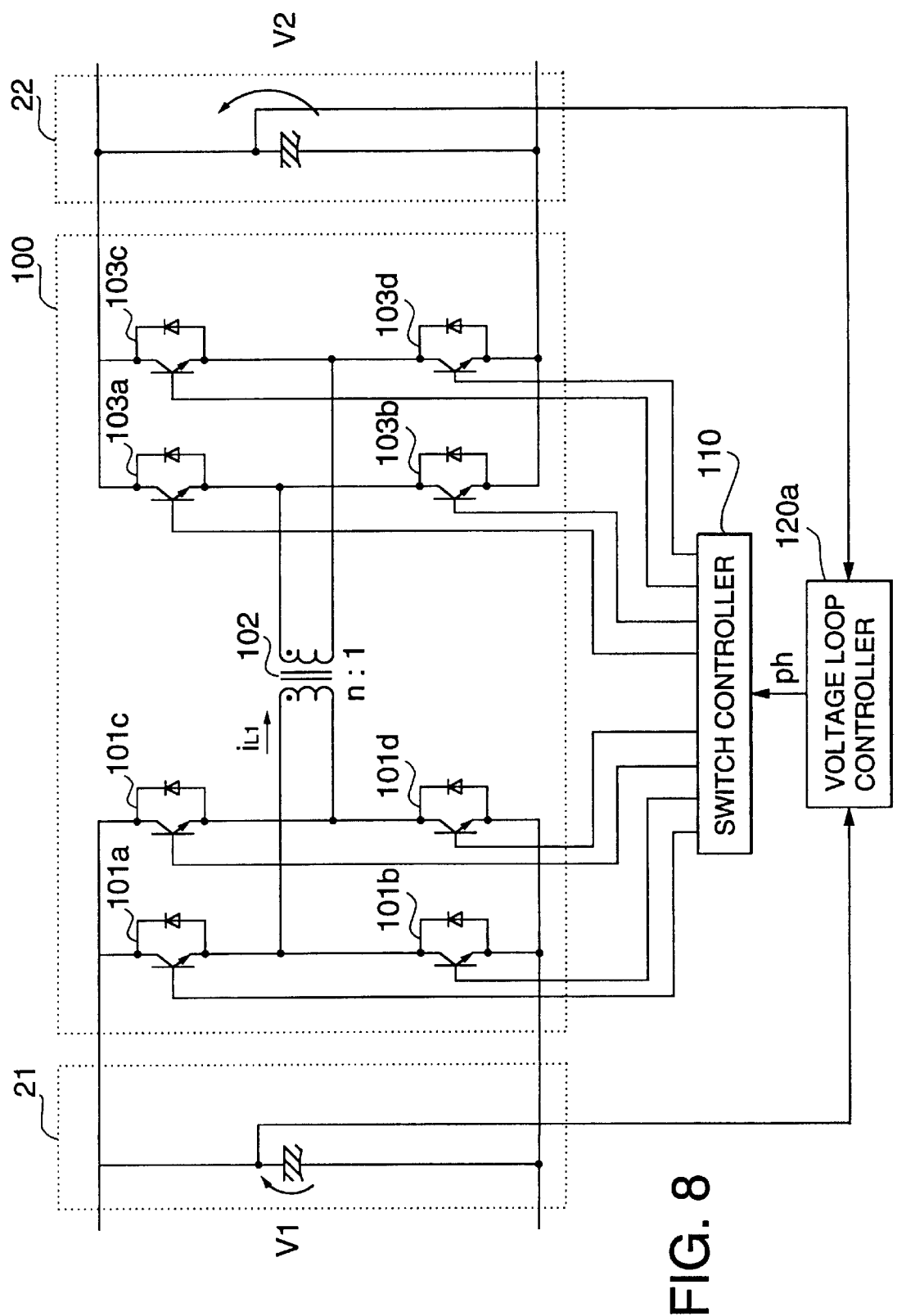
FIG. 8 is a block diagram showing an insulation type bidirectional DC voltage converter of the invention.

Embodiment 4:

FIG. 8 is a block diagram of an insulation type bidirectional DC voltage converter of one embodiment of the invention. That is, the insulation type bidirectional DC voltage converter in FIG. 8 differs from the conventional DC voltage converter shown in FIG. 32 with respect to voltage loop controller 120*a*. In embodiment 4, the voltage loop controller 120*a* controls so as to hold a ratio between V1 and V2 constant as an improvement with respect to the conventional voltage loop controller for controlling so as to hold V2 constant.

Figure 9:
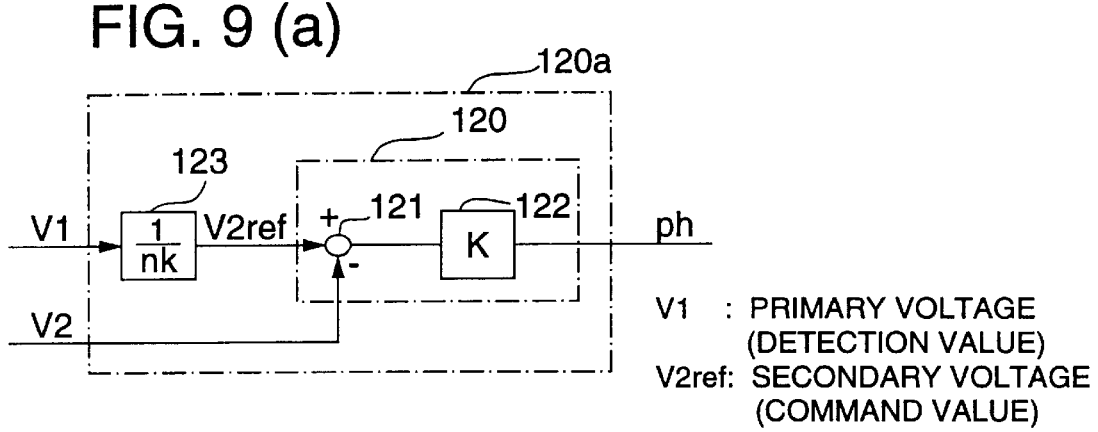
FIG. 9(a) is an internal block diagram and FIG. 9(b) is a flowchart of a voltage loop controller in FIG. 8.
Figure 9:
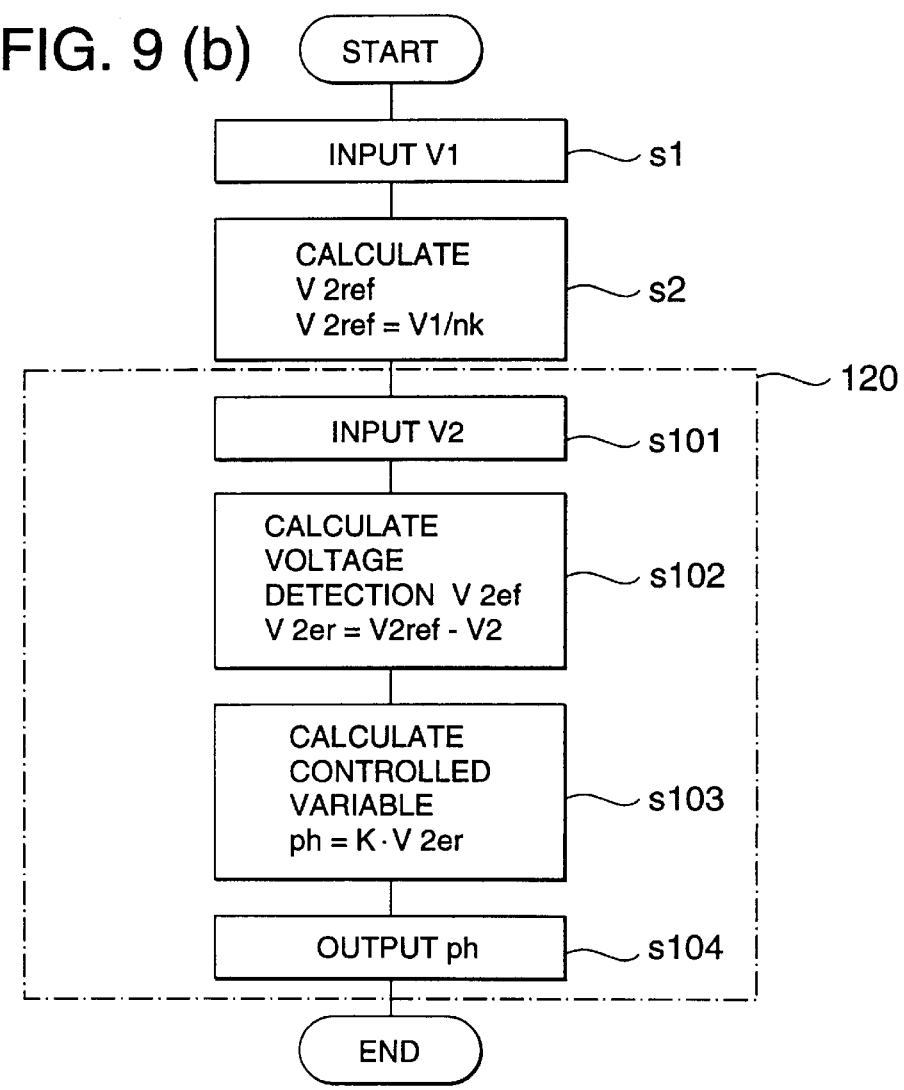
Figure 34:
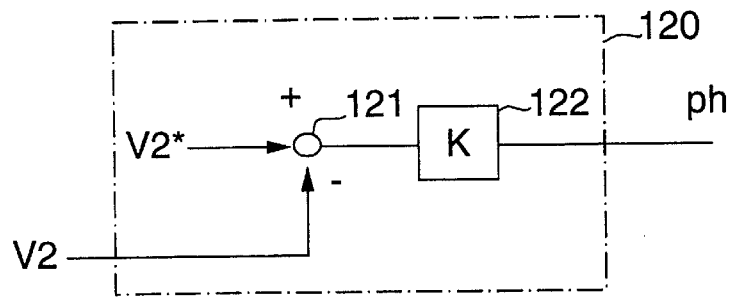
FIG. 34(a) is an internal block diagram and FIG. 34(b) is a flowchart of a voltage loop controller in FIG. 32.
Figure 34:
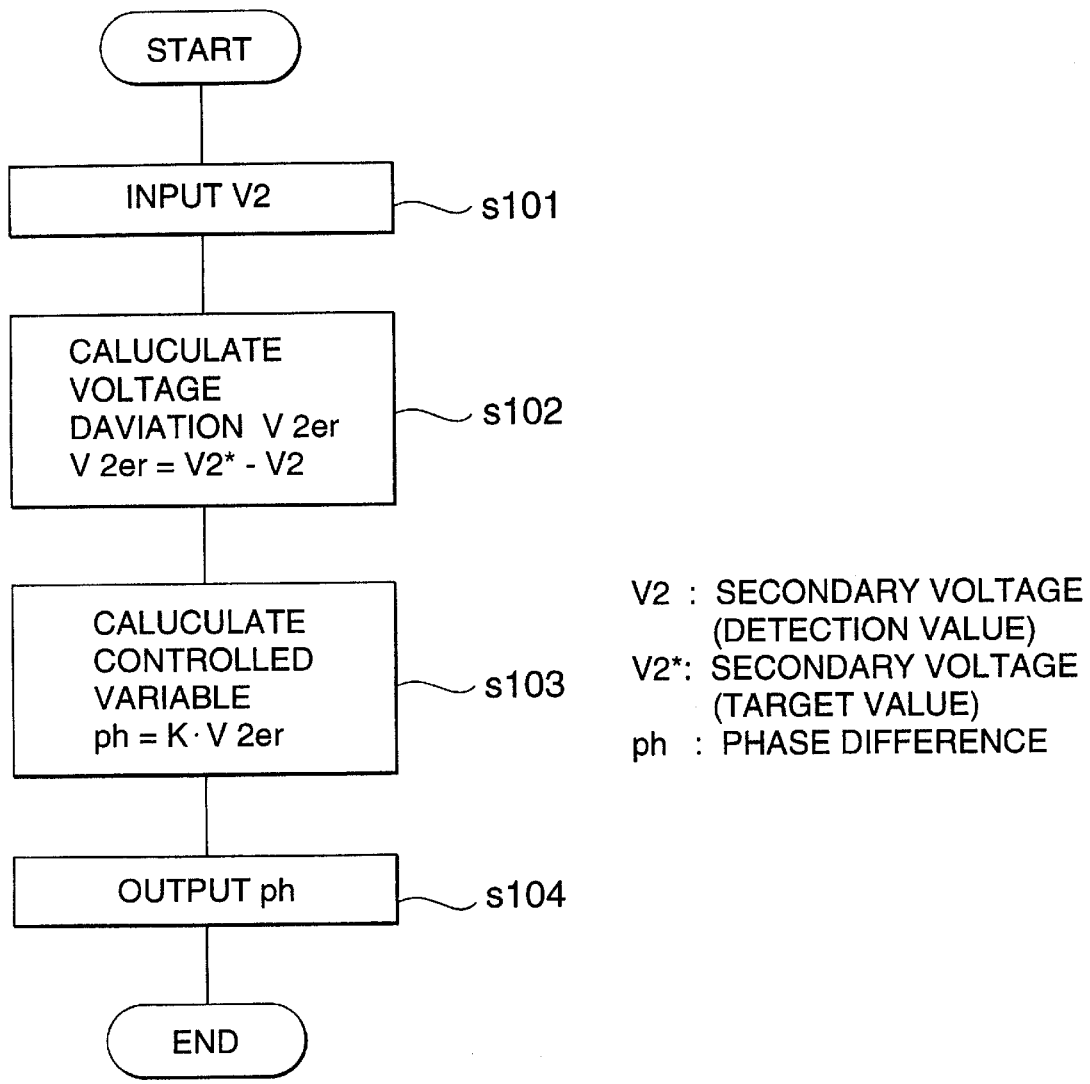

FIG. 9(*a*) is a block diagram showing an internal configuration example of the voltage loop controller 120*a*. This voltage loop controller 120*a* differs from the conventional voltage loop controller shown in FIG. 34(*a*) in that it has a voltage ratio multiplier 123 for finding a secondary voltage command value V2 ref from the primary voltage V1. Here, the ratio between the primary and secondary voltages is set to nk, thereby providing control so as to hold the ratio between the primary and secondary voltages constant.

FIG. 9(*b*) is a flowchart representing the operation of the voltage loop controller 120*a* in FIG. 9(*a*). Primary voltage V1 is input at step Si and is divided by nk to find secondary voltage command value V2 ref at step S2. Next, V2 ref is used to execute steps S101 to S104 which are similar to those in the conventional voltage loop controller 120 shown in FIG. 34(*b*).

The operation will be described.

Figure 38:
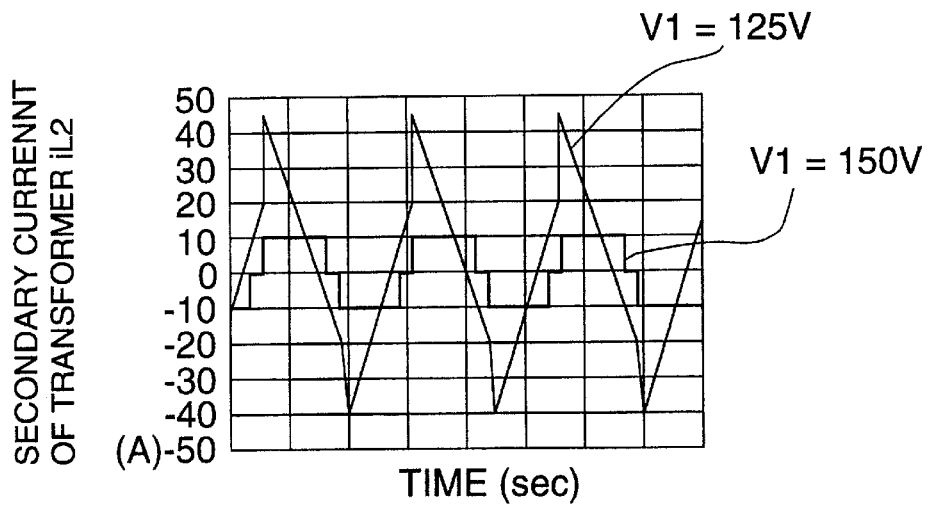
FIGS. 38(a) and 38(b) are graphs showing the electrical characteristics of the conventional insulation type bidirectional DC voltage converter.
Figure 38:
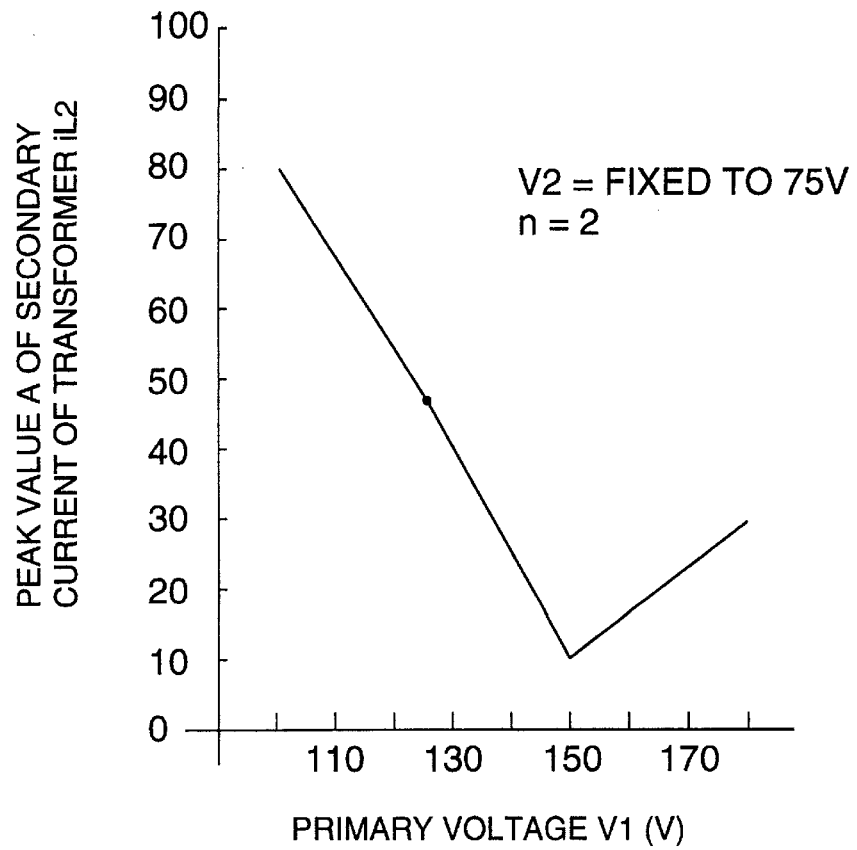

As shown in FIG. 38(*b*) which shows the characteristics of the conventional insulation type bidirectional DC voltage converter, the transformer current iL2 has a peak value varying greatly depending on the ratio between the primary voltage V1 and secondary voltage V2. The peak value becomes the minimum when V1=n·V2. In contrast, if control is performed as V1/n=V2 ref (in other words, V1/n:V2 ref=1:1), the peak current can be made the lowest at V1 at a point in time. This means that control can be performed in a peak current suppression condition by setting the ratio between the primary and secondary voltages, nk, to the turn ratio of the transformer 102, n. For example, even if control is performed as nk=n·0.9 (in other words, V1/n:V2ref= 0.9:1), the peak current can be prevented from increasing excessively as compared with controlling so as to hold the secondary voltage constant.

Figure 10:
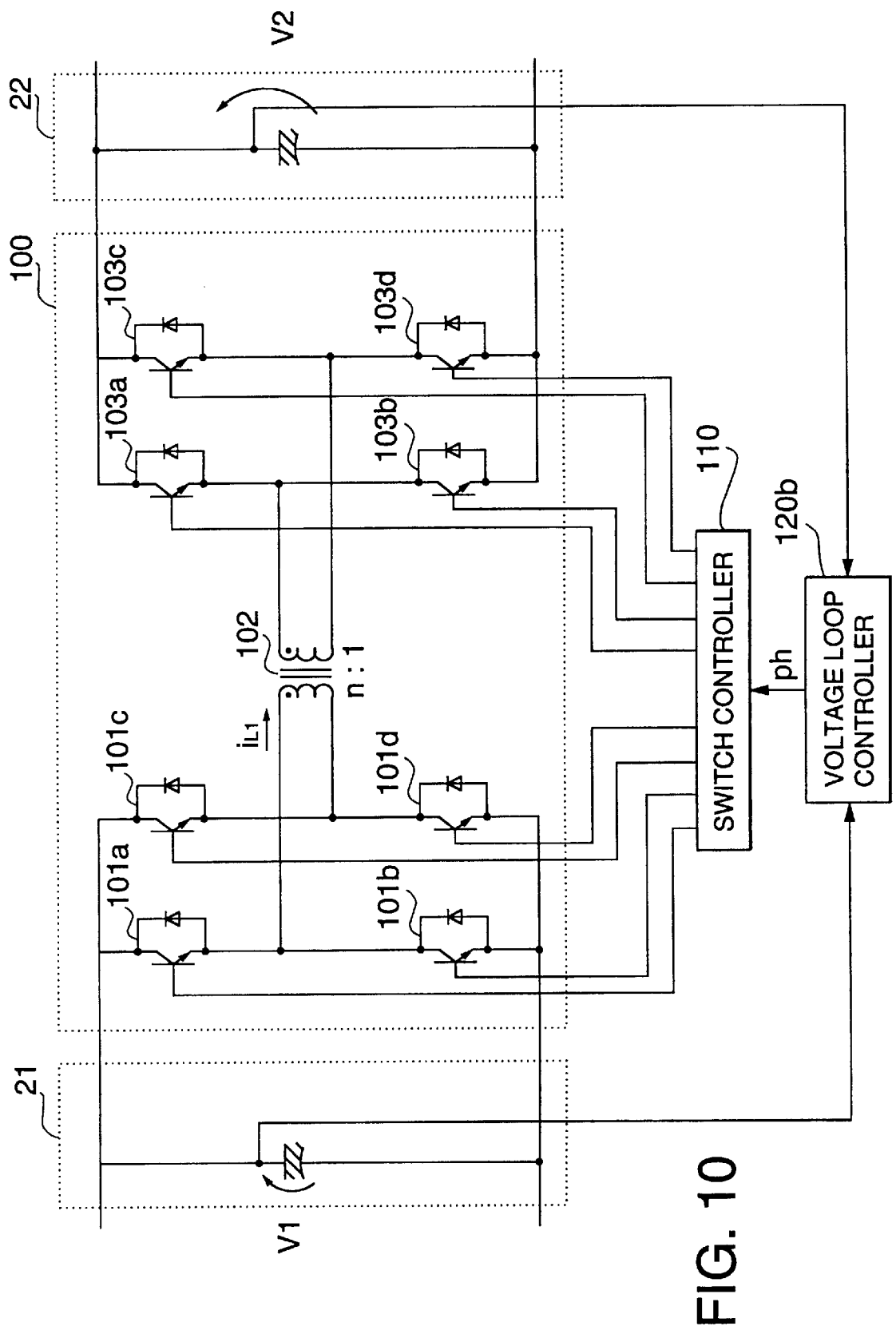
FIG. 10 is a block diagram showing an insulation type bidirectional DC voltage converter of the invention.

Embodiment 5:

FIG. 10 is a block diagram of an insulation type bidirectional DC voltage converter of one embodiment of the invention. That is, the insulation type bidirectional DC voltage converter in FIG. 10 differs from the conventional DC voltage converter shown in FIG. 32 in a voltage loop controller 120*b*. In embodiment 5, the voltage loop controller 120*b* controls so as to hold the difference between V1/n and V2 constant as an improvement with respect to the conventional voltage loop controller in order to achieve a control which will hold V2 constant.

Figure 11:
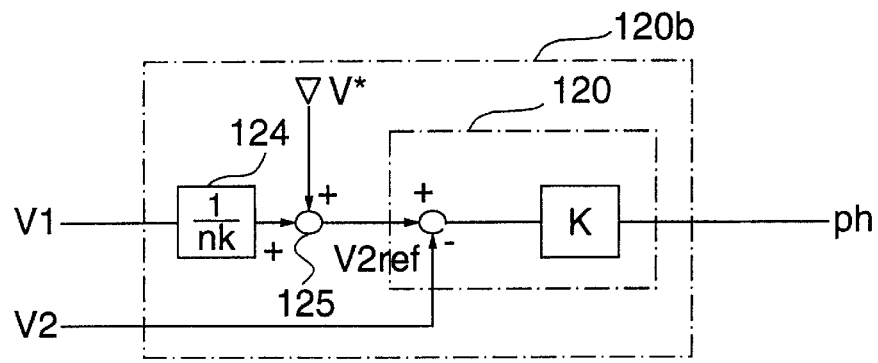
FIG. 11(a) is an internal block diagram and FIG. 11(b) is a flowchart of a voltage loop controller in FIG. 10.
Figure 11:
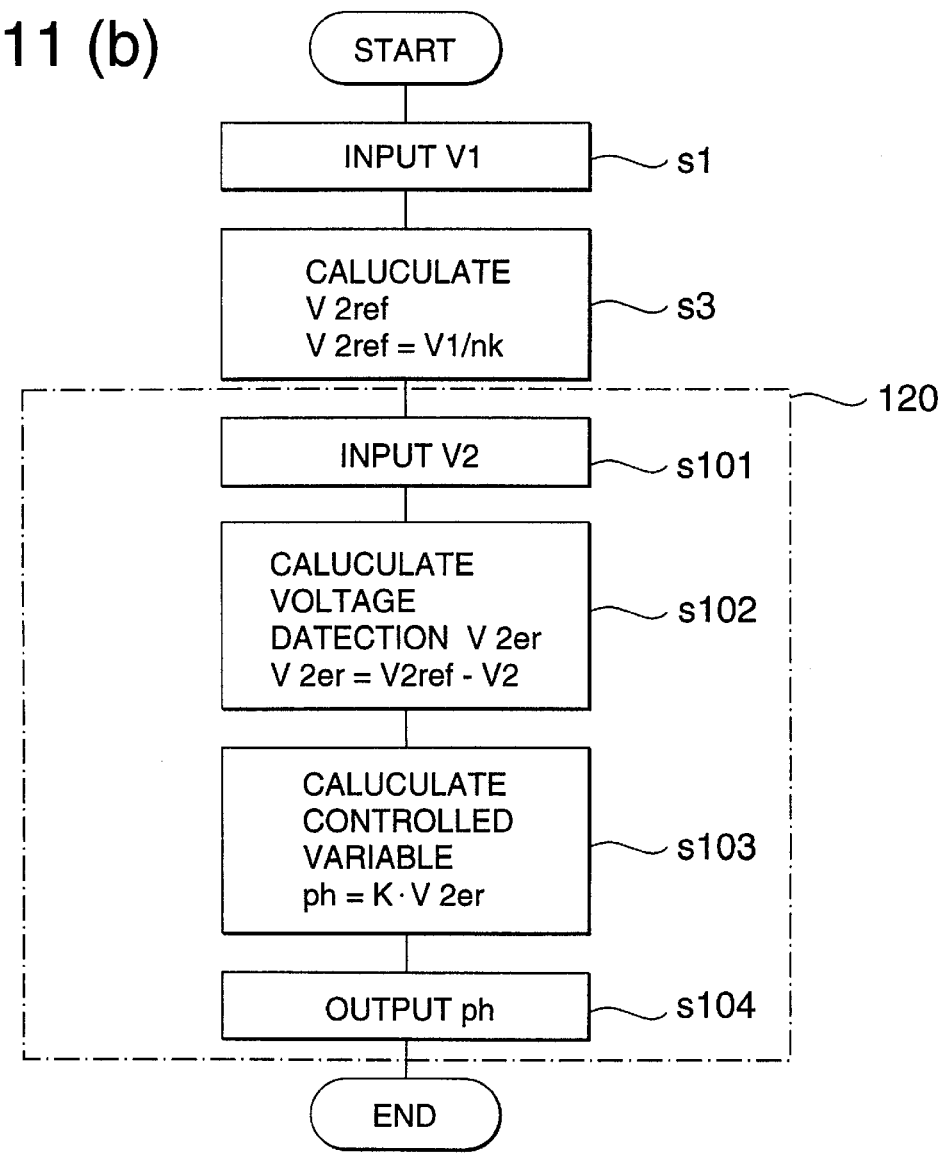

FIG. 11(*a*) is a block diagram showing an internal configuration example of the voltage loop controller 120*b*. This voltage loop controller 120*b* differs from the conventional voltage loop controller shown in FIG. 34(*a*) in that it has a conversion-to-secondary-voltage circuit 124 for converting primary voltage V1 into secondary voltage, wherein voltage difference command $\Delta V^*$ is added to the primary voltage converted into the secondary voltage, V1/n, by an adder 125 for finding secondary voltage command V2 ref, thereby controlling so as to hold constant the difference between the primary voltage converted into the secondary voltage and the secondary voltage.

FIG. 11(*b*) is a flowchart representing the operation of the voltage loop controller 120*b* in FIG. 11(*a*). Primary voltage V1 is input at step Si and the primary voltage converted into the secondary voltage, V1/n, and $\Delta V^*$ are added for finding the secondary voltage command V2 ref at step S3. Next, V2 ref is used to execute steps S101 to S104 which are similar to those in the conventional voltage loop controller 120 shown in FIG. 34(*b*).

The operation will be described.

As described in embodiment 4, the transformer current iL2 has a peak value varying greatly depending on the ratio between the primary voltage V1 and secondary voltage V2. The peak value becomes the minimum when V1=n −V2. In contrast, if control is performed as V1/n=V2 ref, the peak current can be made the lowest at V1 at a point in time. This can be accomplished in a similar manner by setting $\Delta V^*=0$ V in embodiment 5.

For example, even if $\Delta V^*=33.3$ V is set, the peak current can be prevented from increasing excessively as compared with controlling so as to hold the secondary voltage constant.

The differences between embodiments 4 and 5 are as follows:

For example, when control is performed as nk=n·0.9 and n=2 in embodiment 4,
 if V1=600, V2 ref=333.3 V,
 if V1=700, V2 ref=388.9 V,
 if V1=500, V2 ref=277.8 V.

On the other hand, according to the constant difference control in embodiment 5, when $\Delta V^*=33.3$ V is set, if V1=600, V2 ref=333.3 V, if V1=700, V2 ref=383.3 V, if V1=500, V2 ref=283.3 V. The V2 ref change range narrows slightly with respect to the V1change as compared with the constant ratio control in embodiment 4.

However, V1ln:V2 ref=0.88:1 at V1=500 V; the peak current increases as compared with 0.9:1 in embodiment 4.

To suppress the peak current partially and suppress the secondary voltage change even a little, the method of controlling so as to hold constant the difference between the primary voltage converted into the secondary voltage and the secondary voltage in embodiment 5 is adopted. To suppress the peak current reliably, the method of controlling so as to hold the ratio between the primary and secondary voltages constant in embodiment 4 is adopted.

Embodiment 6:

Control is performed so as to hold V2 constant in the conventional example, in order to hold the ratio between V1and V2 constant in embodiment 4, and to hold the difference between V1/n and V2 constant in embodiment 5. Embodiment 6 of the invention provides an improved voltage loop controller.

In an application where it is necessary to hold a secondary voltage constant as in an insulation type bidirectional DC voltage converter, control may be performed so as to hold the secondary voltage constant as in the conventional example. In this case, the primary voltage causes the peak current to increase as shown in FIG. 38(*b*). Then, the peak current can be suppressed by the constant voltage ratio control in embodiment 4 or the constant voltage difference control in embodiment 5. However, in embodiments 4 and 5, a change in the primary voltage directly affects the secondary voltage, and a problem arises in an application where it is necessary to control so as to hold the secondary voltage constant. Then, in embodiment 6, one of constant secondary voltage control, constant primary-secondary voltage ratio control, and constant difference control between the primary voltage converted into the secondary voltage and the secondary voltage is selected for use depending on the operation state. As a result, whereby control is performed so as to hold the secondary voltage constant in the actual operation state and the constant primary-secondary voltage ratio control or the constant difference control between the primary voltage is converted into the secondary voltage and the secondary voltage is performed when it is desired to suppress the peak current.

Next, the operation of the embodiment will be discussed. Here, an example is given in which the constant secondary voltage control and constant primary-secondary voltage ratio control are changed according to a switching element temperature of an insulation type bidirectional DC voltage converter.

Figure 12:
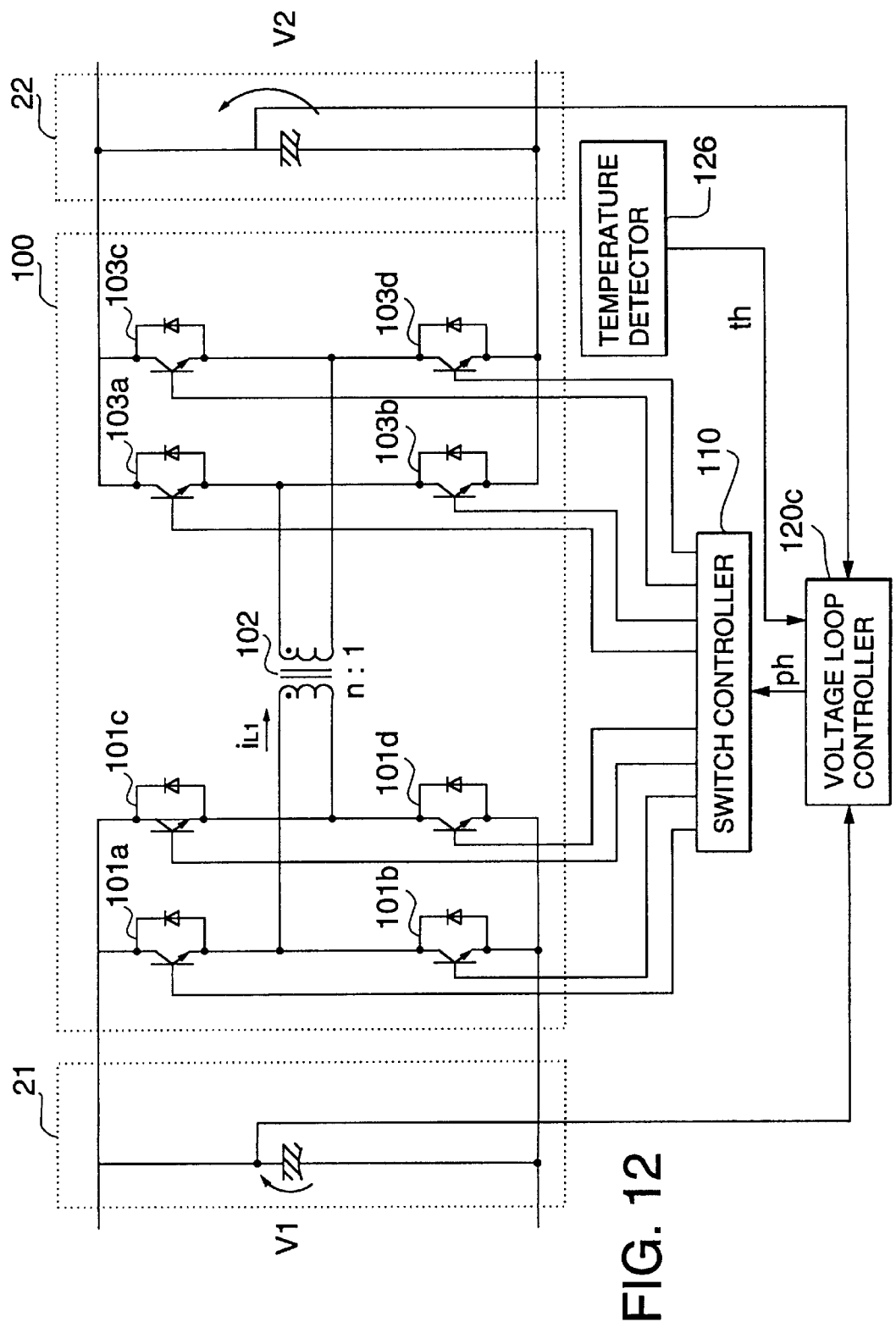
FIG. 12 is a block diagram showing an insulation type bidirectional DC voltage converter of the invention.
Figure 13:
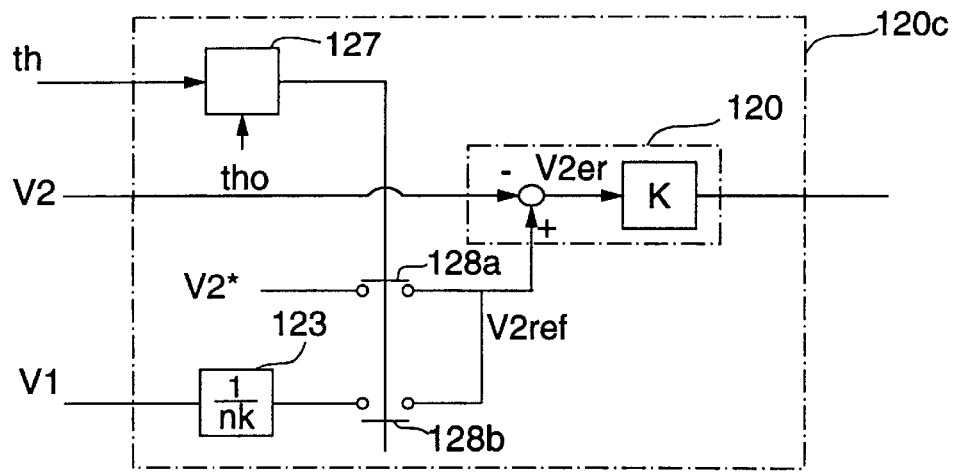
FIG. 13(a) is an internal block diagram and FIG. 13(b) is a flowchart of a voltage loop controller in FIG. 12.
Figure 13:
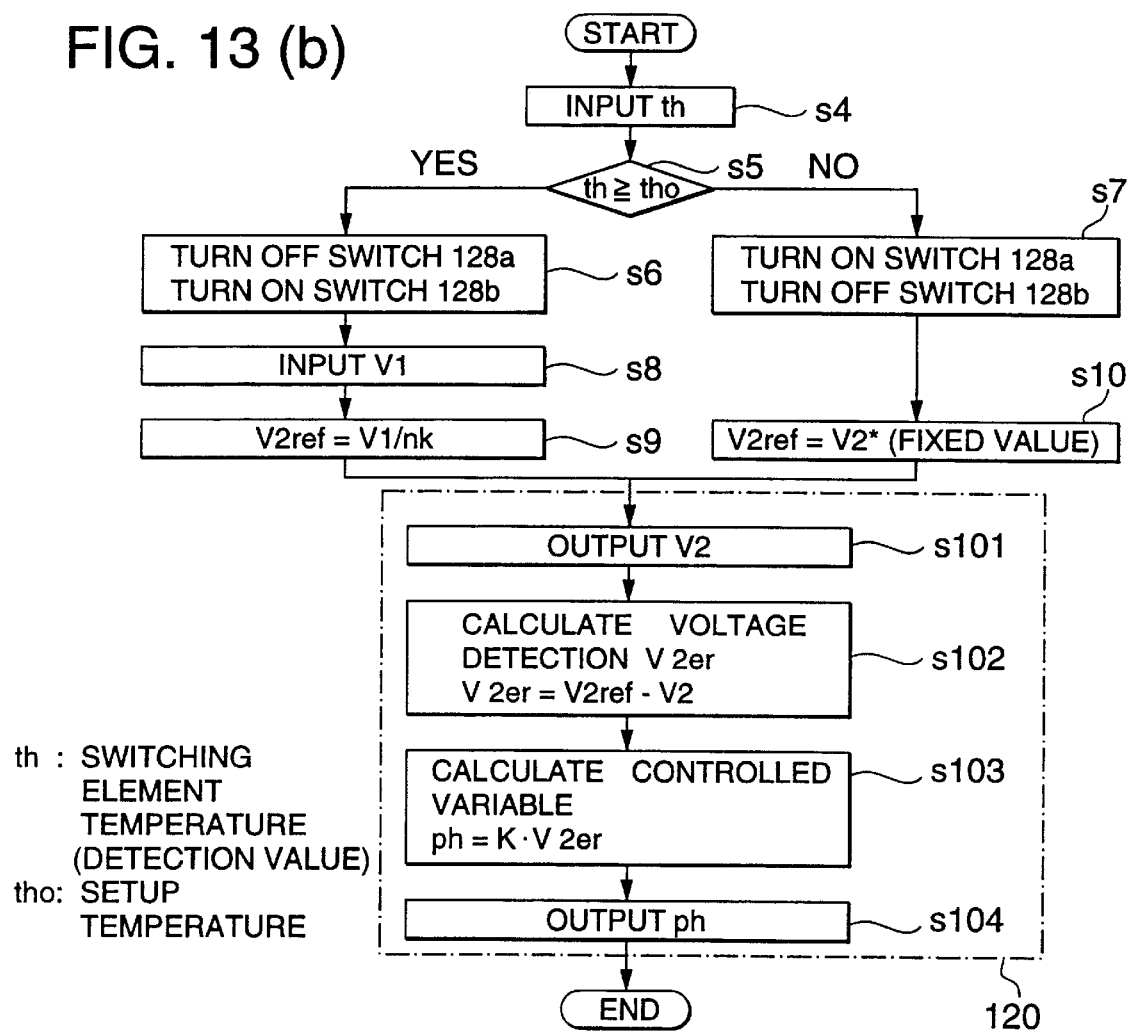

FIG. 12 is a block diagram of an insulation type bidirectional DC voltage converter of one embodiment of the invention. That is, the insulation type bidirectional DC voltage converter in FIG. 12 differs from the conventional DC voltage converter shown in FIG. 32 in its use of a temperature detector 126 and a voltage loop controller 120c. FIG. 13(a) is a block diagram showing an internal configuration example of the voltage loop controller 120c. This voltage loop controller 120c differs from the conventional voltage loop controller shown in FIG. 34(a) in that it has a voltage ratio multiplier 123 for finding a secondary voltage command value V2 ref from primary voltage V1, a temperature determination circuit 127 for comparing switching element temperature th input from the temperature detector 126 in FIG. 12 with setup temperature th0 for determining the greater-than, equal-to, or less-than relation between the temperatures th and th0, and switches 128a and 128b for switching the control in response to an output of the temperature determination circuit 127, whereby the constant secondary voltage control and the constant primary-secondary voltage ratio control can be changed in response to the switching element temperature th.

FIG. 13(b) is a flowchart representing the operation the voltage loop controller 120c in FIG. 13(a). The switching element temperature th is input at step S4 and is compared with th0 at step S5. If the switching element temperature th is greater than the setup temperature th0, the switch 128a is turned off and the switch 128b is turned on at step S6. On the other hand, if the switching element temperature th is less than the setup temperature th0, the switch 128a is turned on and the switch 128b is turned off at step S7. If control goes to step S6, the constant primary-secondary voltage ratio control is performed. Then, the primary voltage V1 is input at step S8 and is divided by target voltage ratio nk to find secondary voltage command V2 ref at step S9. If control goes to step S7, the constant secondary voltage control is performed. Then, secondary voltage target value V2 ·(fixed value) is assigned as secondary voltage command V2 ref aft. step S10. Thus, the secondary command voltage varies depending on the switching element temperature th. Next, V2 ref is used to execute steps S101 to S104 which are similar to those in the conventional voltage loop controller 120 shown in FIG. 34(b).

Thus, when the switching element temperature in the insulation type bidirectional DC voltage converter is high, the current is suppressed as much as possible for suppressing a temperature rise, thereby preventing the switching elements in the bidirectional DC voltage converter from being broken due to heating. When the switching element temperature in the insulation type bidirectional DC voltage converter is low, the secondary voltage can be held constant although the peak current becomes slightly large.

Embodiment 7:

In embodiment 6, one of the constant secondary voltage control, constant primary-secondary voltage ratio control, and constant difference control between the primary voltage converted into the secondary voltage and the secondary voltage is selected for use depending on the operation state. Embodiment 7 of the invention provides an improved voltage loop controller, characterized by the fact that transfer power is used for the operation state for switching the control.

In embodiment 6, the switching element temperature is used as an example of the control switch determination criterion, but often the switching element junction temperature cannot accurately be detected and a case temperature or the like is used instead. Thus, when a rapid load change or the like causes the temperature to abruptly rise, the junction temperature is assumed to be low, leading to thermal destruction. Then, embodiment 7 is adapted to perform the constant secondary voltage control under light load or the constant primary-secondary voltage ratio control or the constant difference control between the primary voltage converted into the secondary voltage and the secondary voltage under heavy load according to transfer power.

Next, the operation will be discussed. Here, an example is given in which the constant secondary voltage control and the constant primary-secondary voltage ratio control are changed depending on the secondary transfer power of an insulation type bidirectional DC voltage converter.

Figure 14:
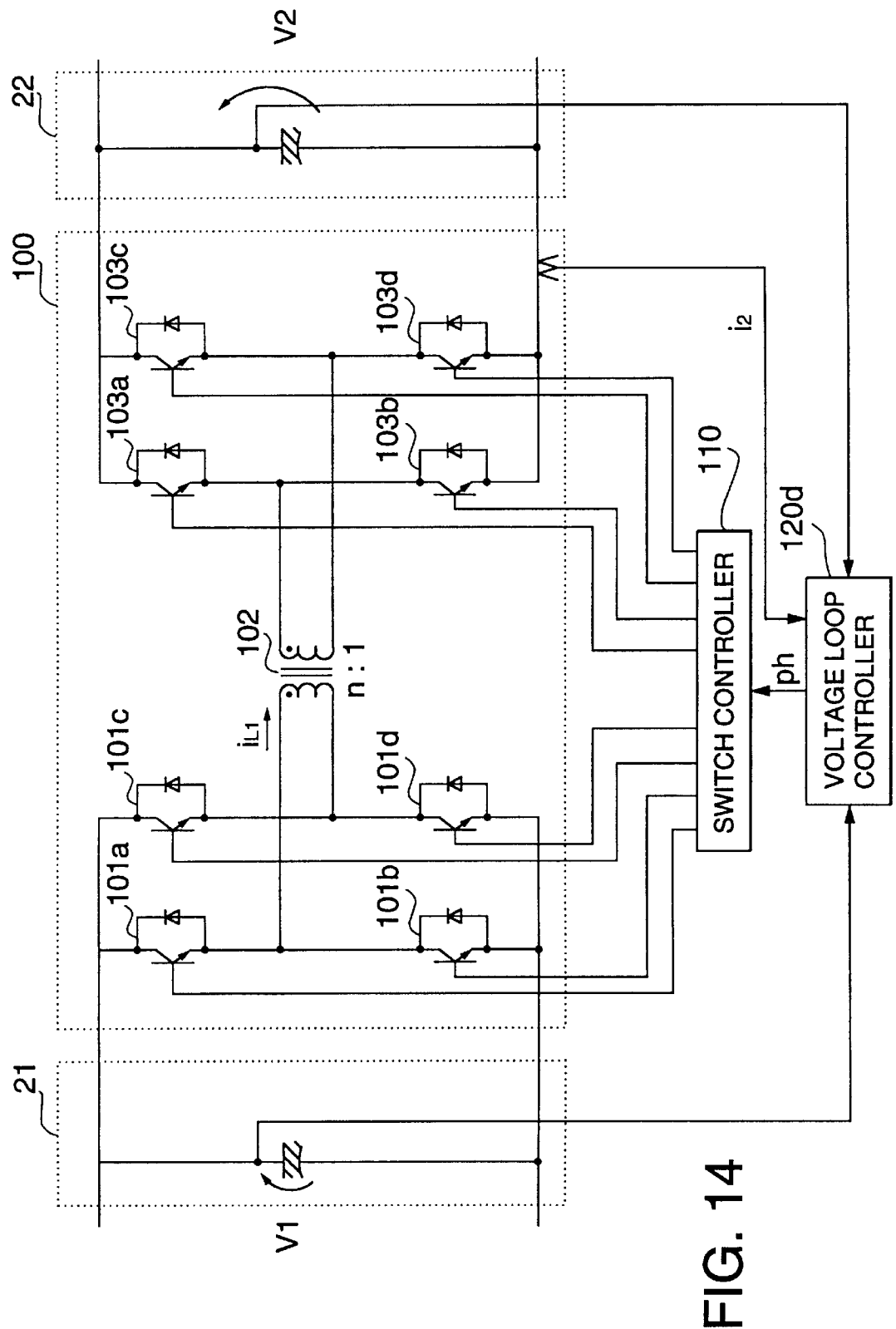
FIG. 14 is a block diagram showing an insulation type bidirectional DC voltage converter of the invention.
Figure 15:
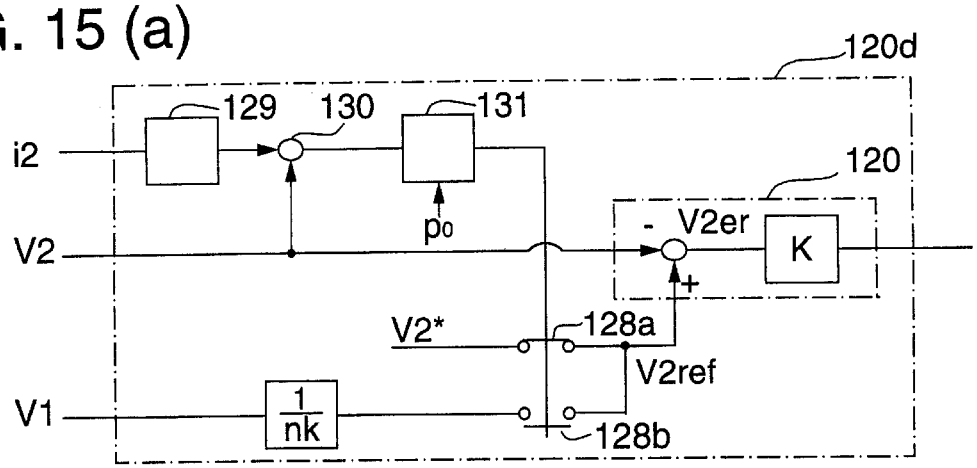
FIG. 15(a) is an internal block diagram and FIG. 15(b) is a flowchart of a voltage loop controller in FIG. 14.
Figure 15:
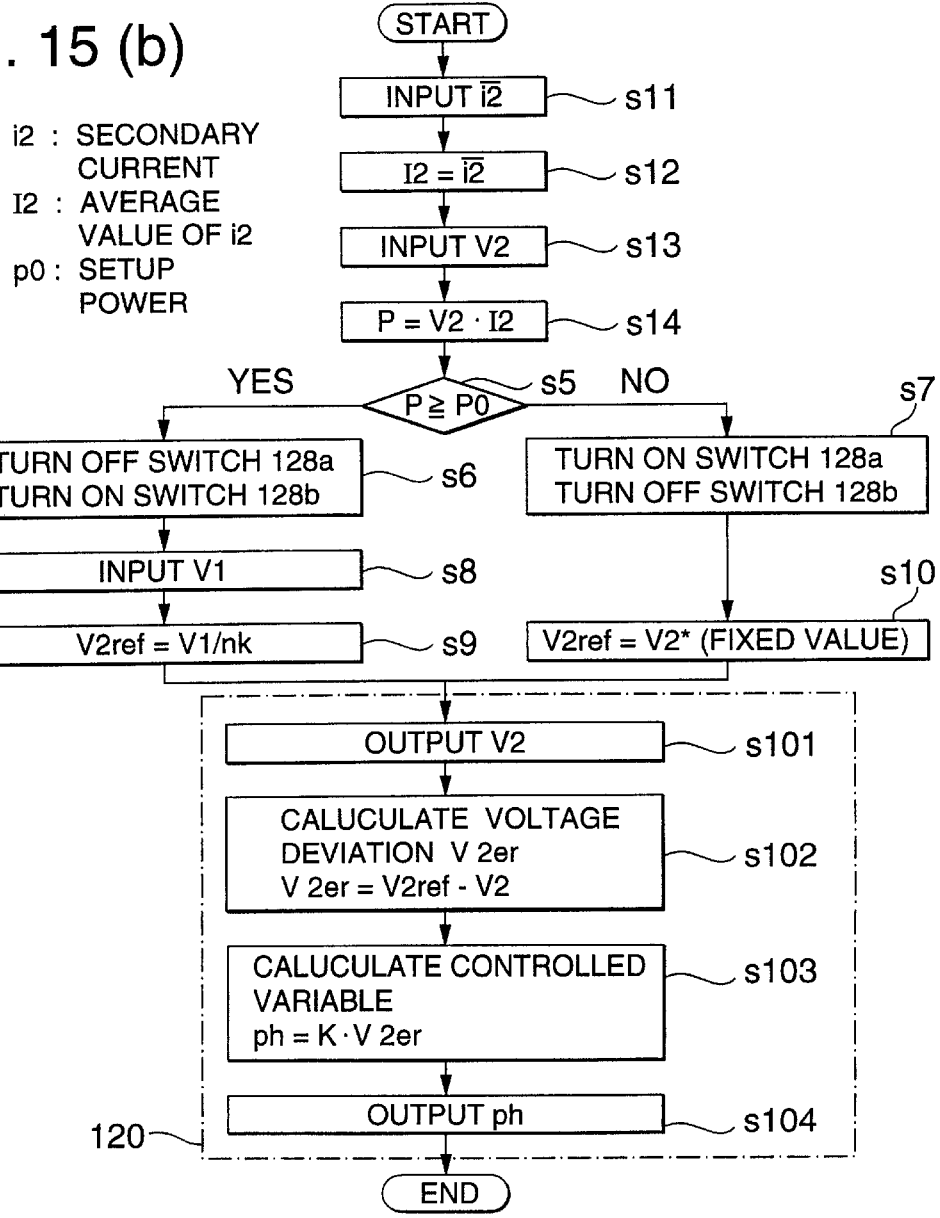

FIG. 14 is a block diagram of an insulation type bidirectional DC voltage converter of one embodiment of the invention. That is, the insulation type bidirectional DC voltage converter in FIG. 14 differs from the convectional DC voltage converter shown in FIG. 32 in a voltage loop controller 120d. FIG. 15(a) is a block diagram showing an internal configuration example of the voltage loop controller 120d. This voltage loop controller 120d differs from the voltage loop controller of embodiment 6 shown in FIG. 13(a) in that it has a secondary current averaging circuit 129, a power detector 130, and a power determination circuit 131 for changing switches 128a and 128b for switching the control in response to the secondary power, whereby the constant secondary voltage control and the constant primary-secondary voltage ratio control can be changed in response to the secondary transfer power.

FIG. 15(b) is a flowchart representing the operation of the voltage loop controller 120d in FIG. 15(a). Secondary current i2 is input at step S11, an average value I2 of the secondary current i2 is found at step S12, secondary voltage V2 is input at step S13, and secondary transfer power P is found at step S14 . Next, the transfer power P is compared with setup power P0 at step S15. If the transfer power P is greater than the setup power P0, the switch 128a is turned off and the switch 128b is turned on at step S6. On the other hand, if the transfer power P is less than the setup power P0, the switch 128a is turned on and the switch 128b is turned off at step S7. If control goes to step S6, the constant primary-secondary voltage ratio control is performed. Then, the primary voltage V1 is input at step S8 and is divided by target voltage ratio nk to find secondary voltage command V2 ref at step S9. If control goes to step S7, the constant secondary voltage control is performed. Then, secondary voltage target value V2 ·(fixed value) is assigned as secondary voltage command V2 ref at step S10. Thus, the secondary command voltage varies depending on the transfer power P. Next, V2 ref is used to execute steps S101 to S104 which are similar to those in the conventional voltage loop controller 120 shown in FIG. 34(b).

Thus, when a rapid load change causes the transfer power to increase, the constant primary-secondary voltage ratio control is performed for suppressing the current peak in order to promptly prevent the temperature from rising, thereby preventing thermal destruction. When the transfer power in the bidirectional DC voltage converter is low, the secondary voltage can be held constant although the peak current becomes slightly large.

Embodiment 8:

In embodiment 6, one of the constant secondary voltage control, constant primary-secondary voltage ratio control, and constant difference control between the primary voltage converted into the secondary voltage and the secondary voltage is selected for use depending on the operation state. Embodiment 8 of the invention provides an improved voltage loop controller, characterized by the fact that primary voltage is used for the operation state for switching the control.

When power supply voltage largely changes, for example, when the power is turned on or is abnormal, if the constant secondary voltage control is performed, the current peak will rise according to FIG. 38($b$) discussed in the conventional example. Then, in embodiment 8, when the primary voltage V1 is less than setup lower limit value V1n or greater than setup upper limit value V1p, the constant primary-secondary voltage ratio control or the constant difference control between the primary voltage converted into the secondary voltage and the secondary voltage is performed; normally, the constant secondary voltage control is performed.

Next, the operation will be discussed. Here, an example is given in which the constant secondary voltage control and the constant primary-secondary voltage ratio control are changed depending on the primary voltage of an insulation type bidirectional DC voltage converter.

Figure 16:
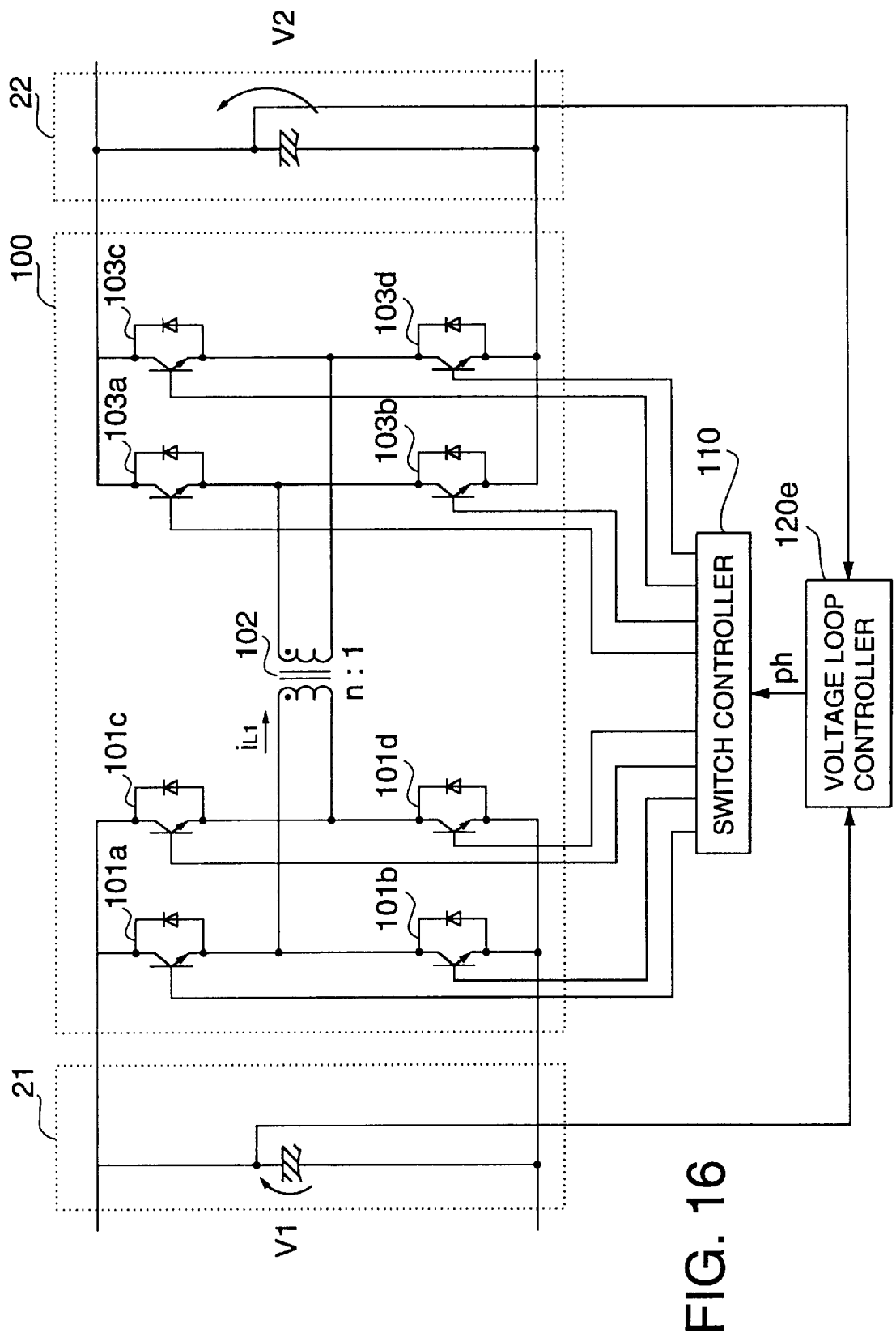
FIG. 16 is a block diagram showing an insulation type bidirectional DC voltage converter of the invention.
Figure 17:
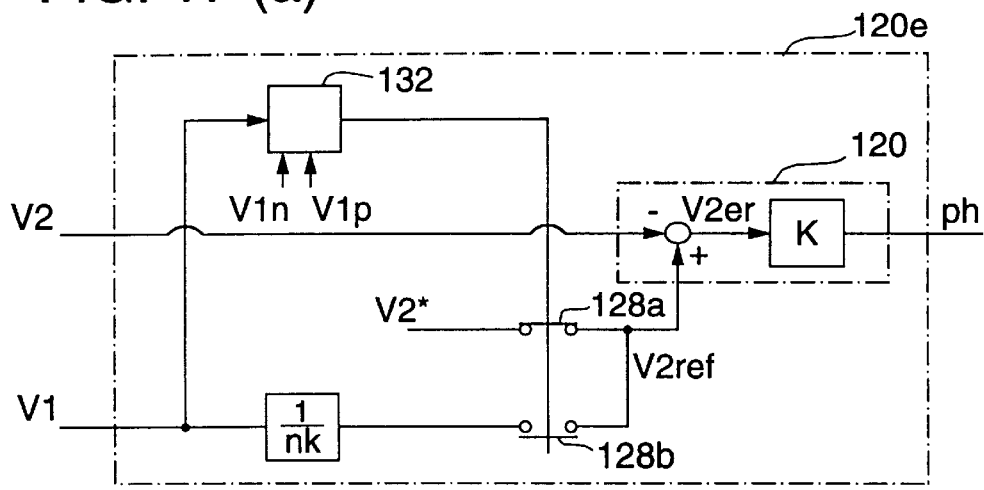
FIG. 17(a) is an internal block diagram and FIG. 17(b) is a flowchart of a voltage loop controller in FIG. 16.
Figure 17:
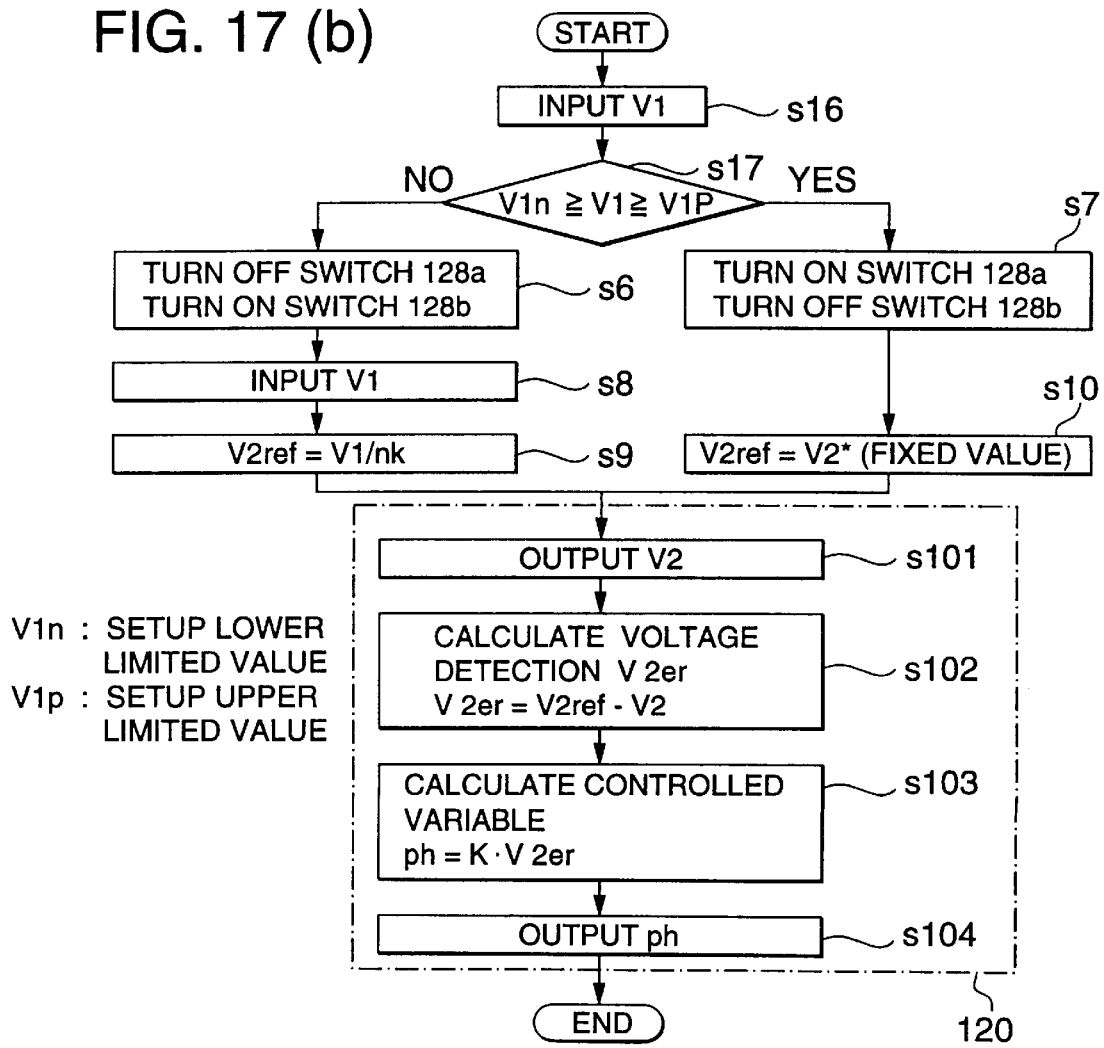

FIG. 16 is a block diagram of an insulation type bidirectional DC voltage converter of one embodiment of the invention. That is, the insulation type bidirectional DC voltage converter in FIG. 16 differs from the convectional DC voltage converter shown in FIG. 32 in a voltage loop controller 120$e$. FIG. 17($a$) is a block diagram showing an internal configuration example of the voltage loop controller 120$e$. This voltage loop controller 120$e$ differs from the voltage loop controller of embodiment 6 shown in FIG. 13($a$) in that it has a power determination circuit 132 for changing switches 128$a$ and 128$b$ for switching the control in response to the primary voltage, whereby the constant secondary voltage control and the constant primary-secondary voltage ratio control can be changed in response to the primary voltage.

FIG. 17($b$) is a flowchart representing the operation of the voltage loop controller 120$e$ in FIG. 17($a$). Primary voltage V1 is input at step S16 and is compared with the setup lower limit voltage V1n and setup upper limit voltage V1p at step S17. If V1 is less than V1n or greater than V1p, the switch 128$a$ is turned off and the switch 128$b$ is turned on at step S6. On the other hand, if V1is greater than V1n and less than V1p, the switch 128$a$ is turned on and the switch 128$b$ is turned off at step S7. If control goes to step S6, the constant primary-secondary voltage ratio control is performed. Then, the primary voltage V1 is input at step S8 and is divided by target voltage ratio nk to find secondary voltage command V2 ref at step S9. If control goes to step S7, the constant secondary voltage control is performed. Then, secondary voltage target value V2 ·(fixed value) is assigned as secondary voltage command V2 ref at step S10. Thus, the secondary command voltage varies depending on the primary voltage V1. Next, V2 ref is used to execute steps S101 to S104 which are similar to those in the conventional voltage loop controller 120 shown in FIG. 34($b$).

Thus, when the power is turned on or is abnormal, even if the primary voltage V1 largely changes, the transformer current peak value does not excessively increase, and normally the secondary voltage can be held constant.

Embodiment 9:

In embodiment 6, when one of the constant secondary voltage control, constant primary-secondary voltage ratio control, and constant difference control between the primary voltage converted into the secondary voltage and the secondary voltage is selected for use depending on the operation state, the same gain K is used regardless of the selected control method. Embodiment 9 of the invention provides an improved voltage loop controller, characterized by the fact that the gain is changed in response to the selected control method.

When the constant primary-secondary voltage ratio control or the constant difference control between the primary voltage converted into the secondary voltage and the secondary voltage is performed, if the primary voltage contains a ripple, the secondary voltage will also contain a ripple. The ripple may or may not introduce a problem depending on the load. However, even if no problem occurs for the load, when the gain is raised, the ripple contained in the command may cause the transformer current of the insulation type bidirectional DC voltage converter to vibrate, thereby increasing the peak current and destroying the switching elements of the insulation type bidirectional DC voltage converter.

Thus, the gain must be suppressed so as not to respond to the primary voltage ripple. On the other hand, in the constant secondary voltage control, the primary voltage ripple does not affect the command, and the gain can be increased for making a fast voltage loop response as compared with the constant primary-secondary voltage ratio control or the constant difference control between the primary voltage converted into the secondary voltage and the secondary voltage.

Then, if the constant primary-secondary voltage ratio control or the constant difference control between the primary voltage converted into the secondary voltage and the secondary voltage is performed only when the power is turned on or is abnormal as described in embodiment 8, low gain K1 is used only at the time. High gain K2 for making a fast voltage loop response as required is used when the constant secondary voltage control is performed during normal operation.

Next, the operation will be discussed. Here, an example is given in which the constant secondary voltage control and the constant primary-secondary voltage ratio control are changed depending on the primary voltage of an insulation type bidirectional DC voltage converter and loss gain K1 is used for the constant primary-secondary voltage ratio control and high gain K2 is used for the constant secondary voltage control.

Figure 18:
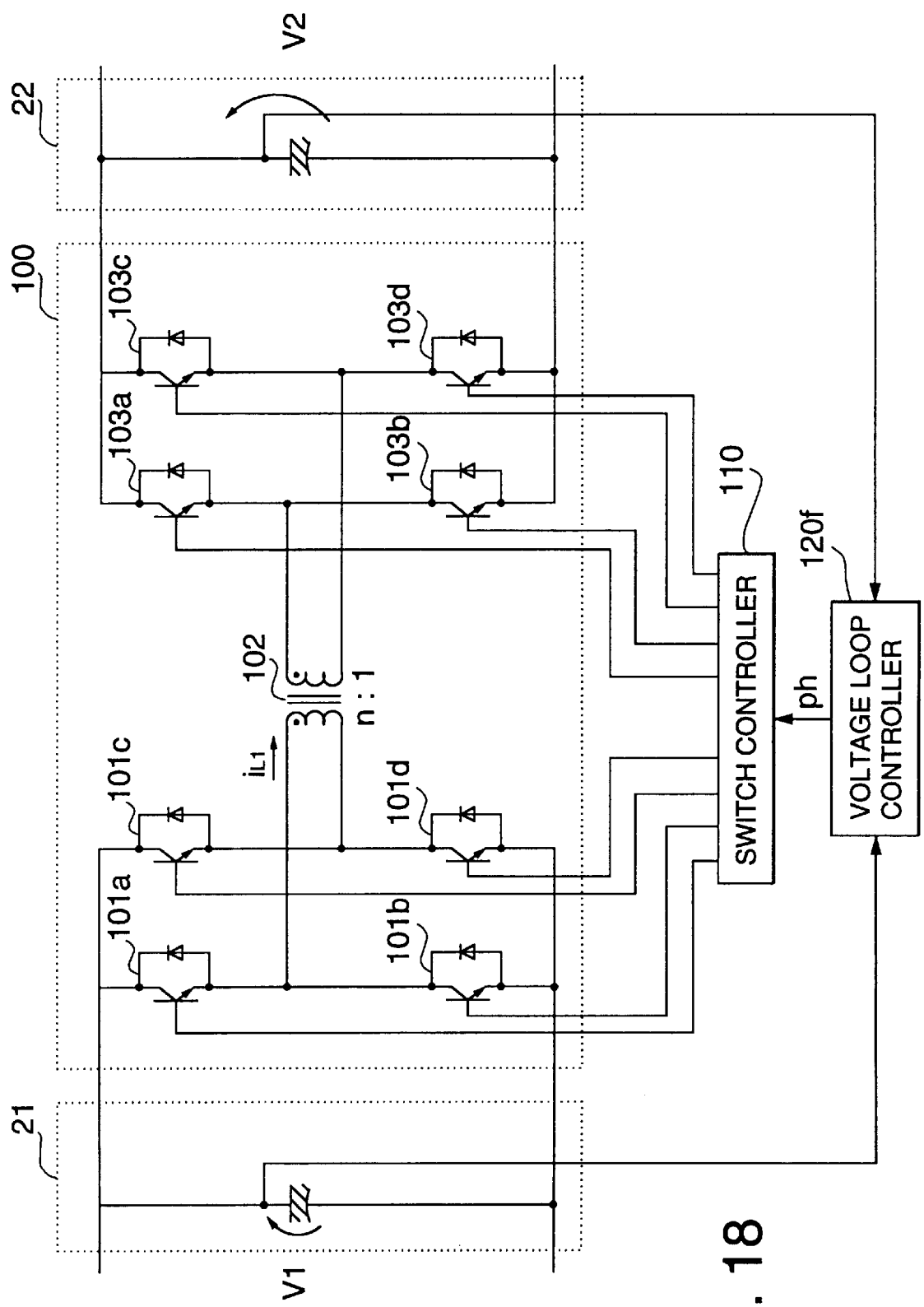
FIG. 18 is a block diagram showing an insulation type bidirectional DC voltage converter of the invention.
Figure 19:
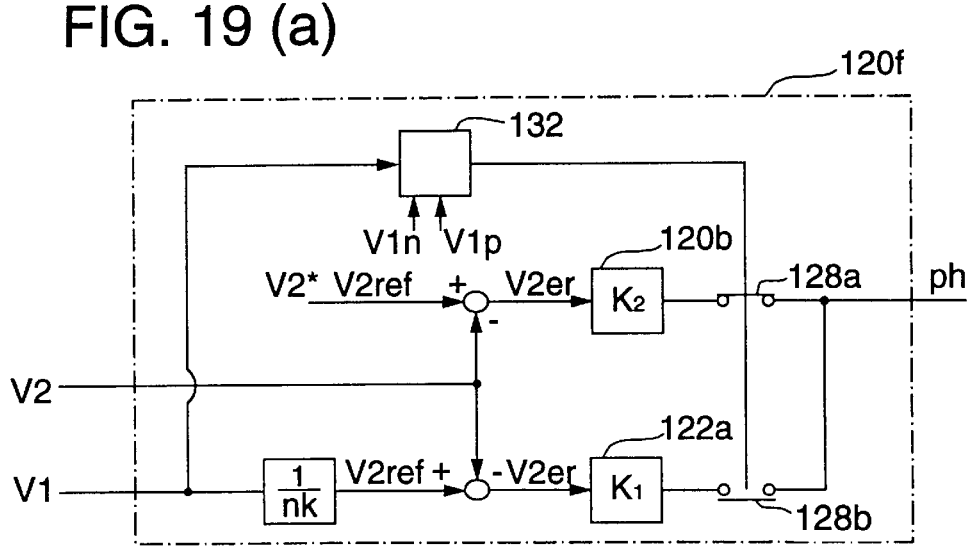
FIG. 19(a) is an internal block diagram and FIG. 19(b) is a flowchart of a voltage loop controller in FIG. 18.
Figure 19:
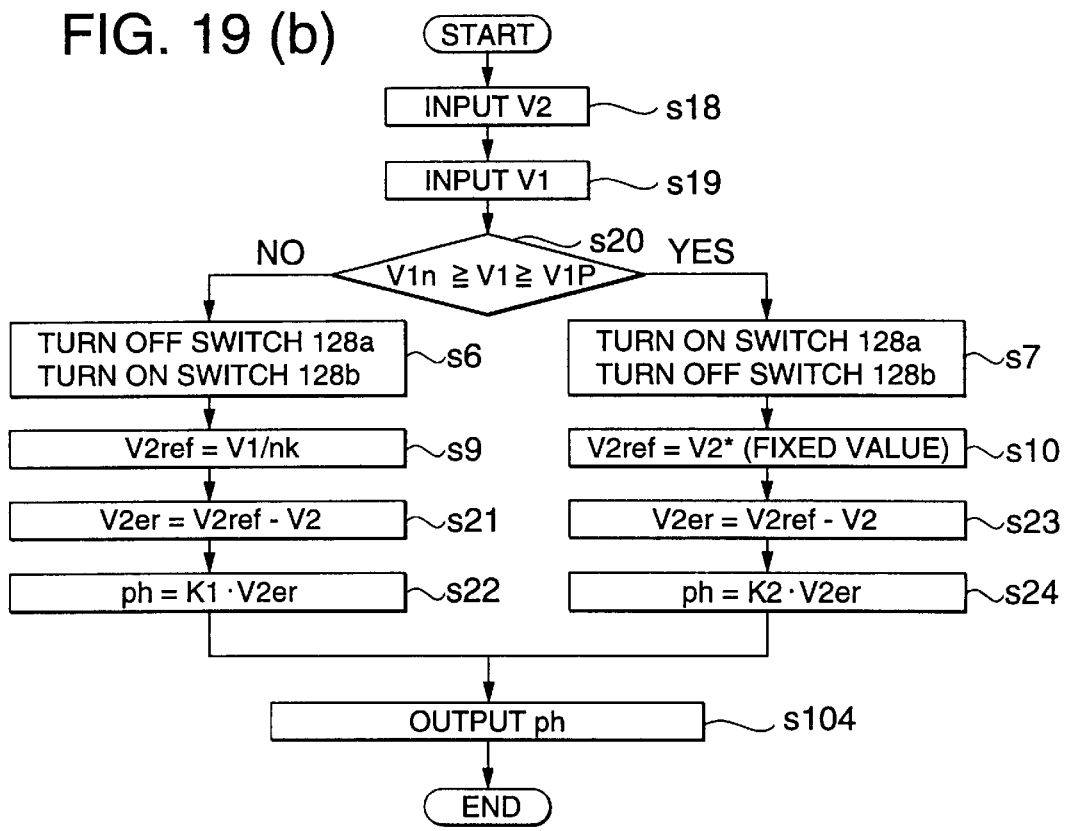

FIG. 18 is a block diagram of an insulation type bidirectional DC voltage converter of one embodiment of the invention. That is, the insulation type bidirectional DC voltage converter in FIG. 18 differs from the conventional DC voltage converter shown in FIG. 32 in a voltage loop controller 120$f$. FIG. 19($a$) is a block diagram showing an internal configuration example of the voltage loop controller 120$f$. This voltage loop controller 120$f$ differs from the voltage loop controller of embodiment 8 shown in FIG. 17($a$) in that it has a voltage loop gain circuit 122$a$ used for the constant primary-secondary voltage ratio control and a voltage loop gain circuit 122$b$ used for the constant secondary voltage control, followed by switches 128$a$ and 128$b$ for switching the control, whereby the constant secondary voltage control and the constant primary-secondary voltage ratio control can be changed in response to the primary voltage and further the gain can be changed depending on the selected control method.

FIG. 19($b$) is a flowchart representing the operation of the voltage loop controller 120$f$ in FIG. 19($a$). Secondary voltage V2 is input at step S18 and primary voltage V1 is input at step S19 and is compared with the setup lower limit voltage V1n and setup upper limit voltage V1p at step S20. If V1 is less than V1n or greater than V1p, the switch 128a is turned off and the switch 128b is turned on at step S6. On the other hand, if V1 is greater than V1n and less than V1p, the switch 128a is turned on and the switch 128b is turned off at step S7. If control goes to step S6, the constant primary-secondary voltage ratio control is performed. Then, the primary voltage V1 is divided by target voltage ratio nk to find secondary voltage command V2 ref at step S9, the secondary voltage V2 is subtracted from the secondary voltage command V2 ref to find voltage deviation V2er at step S21, and the voltage deviation V2er is multiplied by the low gain Ki to find a phase difference ph at step S22. If control goes to step S7, the constant secondary voltage control is performed. Then, secondary voltage target value V2 ·(fixed value) is assigned as secondary voltage command V2 ref at step S10 and the voltage deviation V2er is multiplied by the high gain K2 to find a phase difference ph at step S24. Thus, the phase difference varies depending on the primary voltage V1. Next, the phase difference ph is output at step S104.

Thus, when the constant primary-secondary voltage ratio control or the constant difference control between the primary voltage converted into the secondary voltage and the secondary voltage is performed, the primary voltage ripple can be prevented from causing the transformer current of the insulation type bidirectional DC voltage converter to vibrate. When the constant secondary voltage control is performed, the gain can be raised for making a fast response.

Embodiment 10:

In embodiment 6, when one of the constant secondary voltage control, constant primary-secondary voltage ratio control, and constant difference control between the primary voltage converted into the secondary voltage and the secondary voltage is selected for use depending on the operation state, the secondary voltage command may change abruptly. Embodiment 10 of the invention provides an improved voltage loop controller, characterized by the fact that the secondary voltage command changes smoothly when the control method is selected.

An experiment shows that when the secondary voltage command rapidly rises, the transformer current transiently increases and that when the secondary voltage command rapidly falls, the transformer peak current does not increase. When the primary voltage is low, if the constant primary-secondary voltage ratio control is performed and is changed to the constant secondary voltage control or when the primary voltage is high, if the constant secondary voltage control is performed and changed to the constant primary-secondary voltage ratio control, the rapid rise in the secondary voltage command can occur. To avoid such an event, the maximum value of a command change slope is defined.

Next, the operation will be discussed. Here, an example is given in which the constant secondary voltage control and the constant primary-secondary voltage ratio control are changed depending on the primary voltage of an insulation type bidirectional DC voltage converter. For simplicity, in the example, a rapid change in the secondary voltage command is suppressed when the constant primary-secondary voltage ratio control is changed to the constant secondary voltage control when the primary voltage is low.

Figure 20:
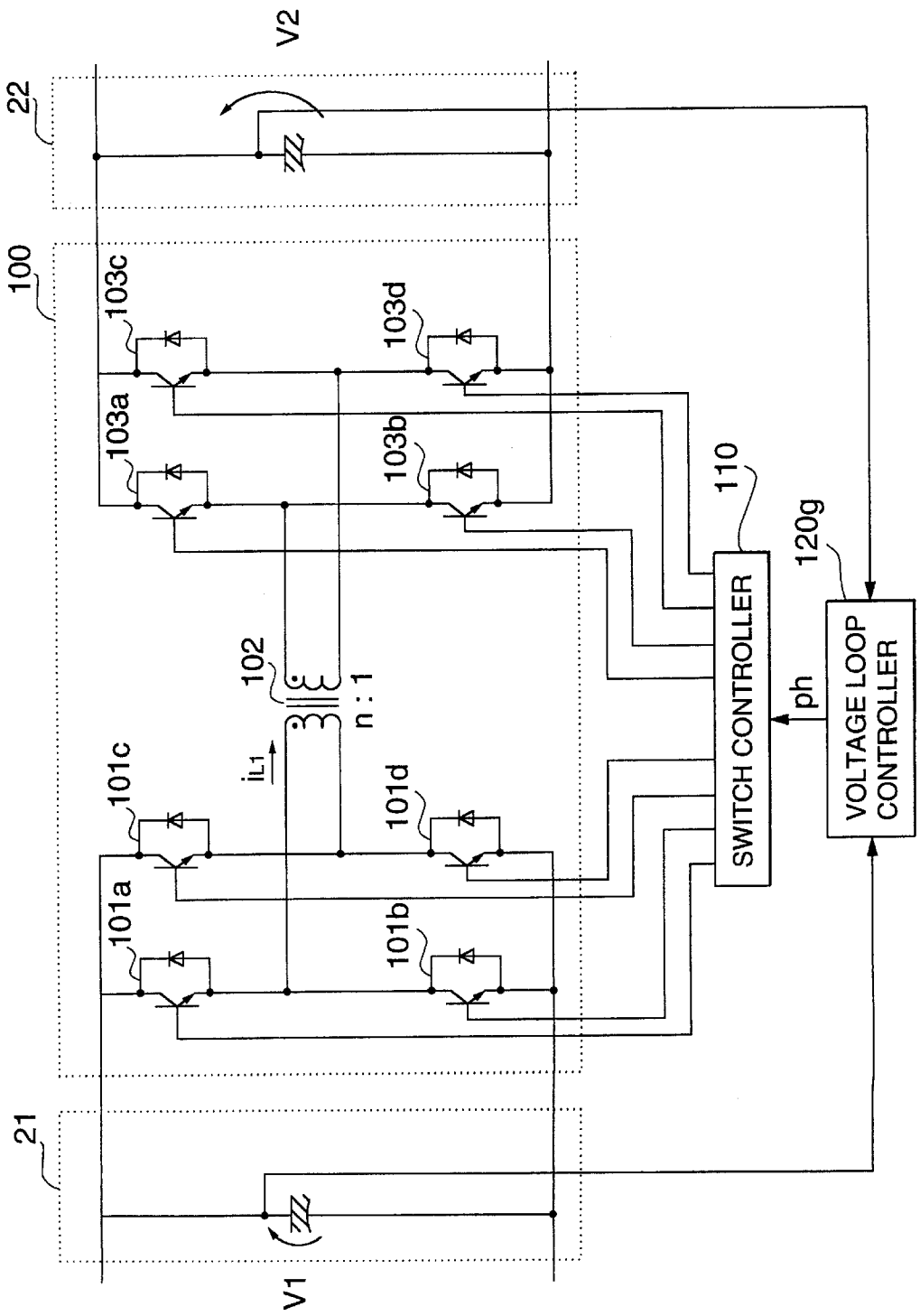
FIG. 20 is a block diagram showing an insulation type bidirectional DC voltage converter of the invention.

FIG. 20 is a block diagram of an insulation type bidirectional DC voltage converter of one embodiment of the invention. That is, the insulation type bidirectional DC voltage converter in FIG. 20 differs from the conventional DC voltage converter shown in FIG. 32 in a voltage loop controller 120g.

Figure 21:
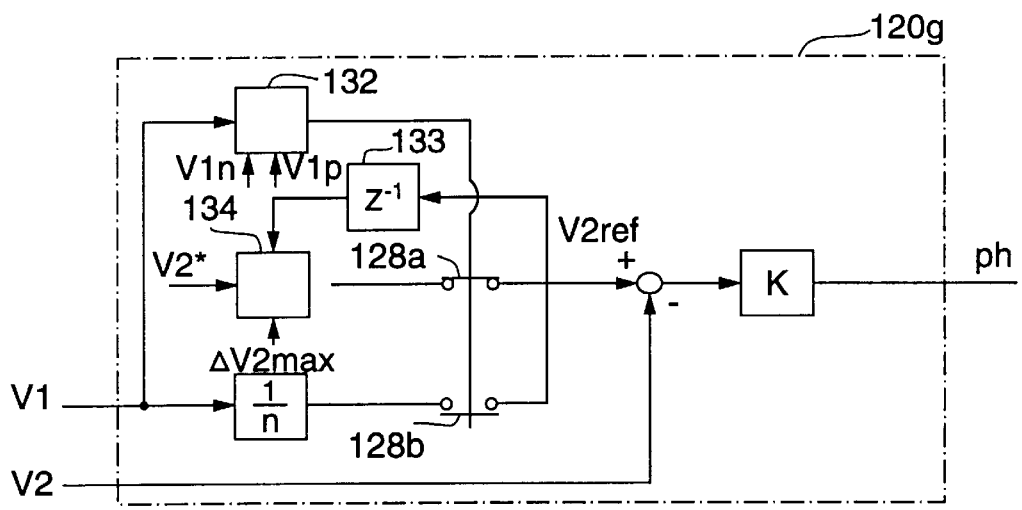
FIG. 21(a) is an internal block diagram and FIG. 21(b) is a flowchart of a voltage loop controller in FIG. 20.
Figure 21:
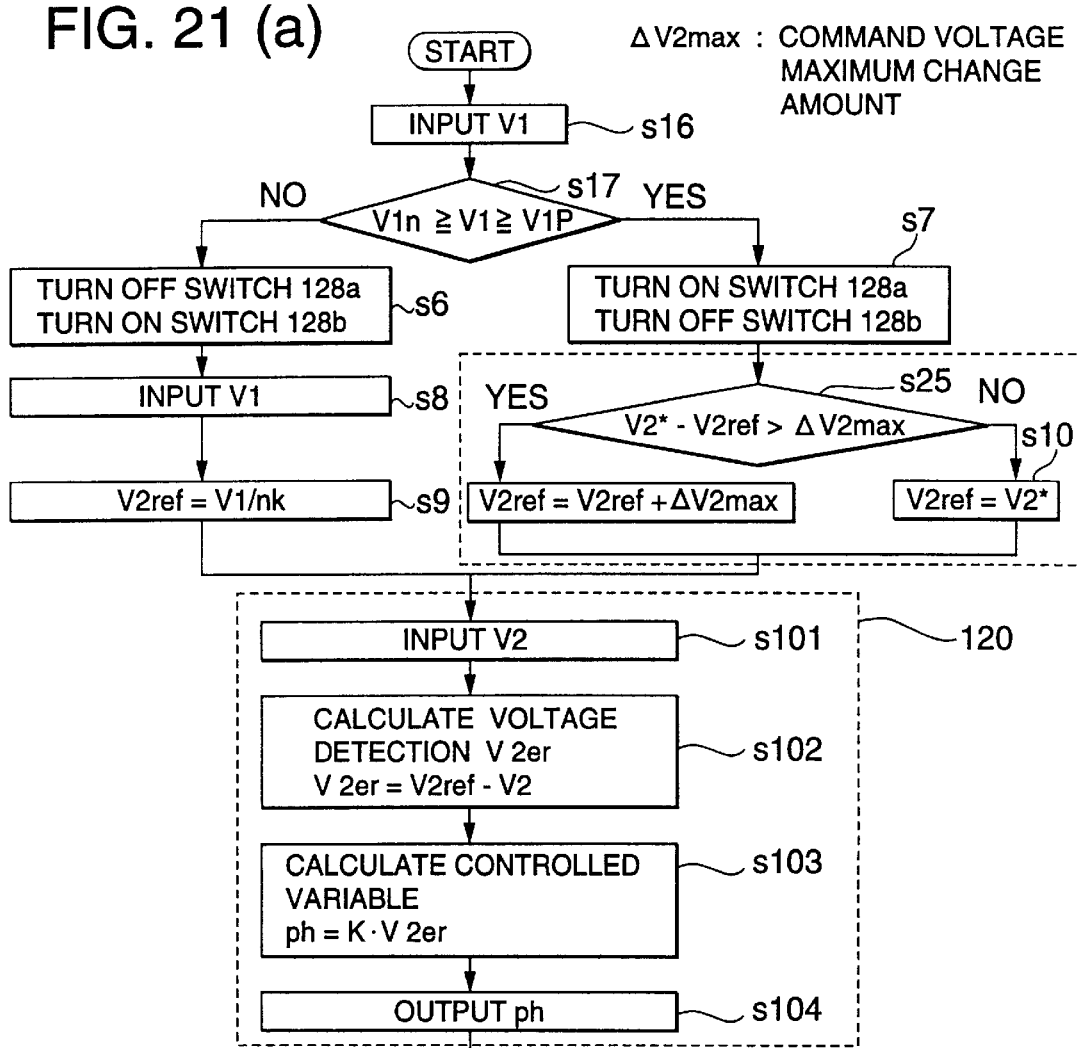

FIG. 21(a) is a block diagram showing an internal configuration example of the voltage loop controller 120g; a part of it is provided by software. The voltage loop controller 120g differs from the voltage loop controller of embodiment 8 shown in FIG. 17(a) in that it has a 1-sampling delay circuit 133 for outputting the immediately preceding sample value of secondary voltage command V2 ref and a circuit 134 for limiting command change slope for softening rapid change of the command when the command changes upon reception of an output of the 1-sampling delay circuit 133, whereby the rapid change in the secondary voltage command can be suppressed when the constant:

primary-secondary voltage ratio control is changed to the constant secondary voltage control when the primary voltage is low.

FIG. 21(b) is a flowchart representing the operation of the voltage loop controller 120g in FIG. 21(a). It is the same as the flowchart of FIG. 17(b) in embodiment 8 except for step S25 or S26 which will be discussed. When the primary voltage V1 which is slightly lower than setup lower limit value V1n becomes slight higher than V1n, the secondary voltage command V2 ref, which is determined as V1/nk in embodiment 8, becomes V2 * and rapidly rises. Steps S25 and S26 shown in FIG. 21(b) are executed for preventing it. When V2 ref changes from V1/nk to V2 *, the difference between V2 * and V2 ref obtained one sampling before is compared with maximum change amount of command voltage, ΔV2 max at step S25. If the former is greater than the latter, step S26 is executed; if the former is equal to or less than the latter, step S10 is executed. At. step S26, ΔV2 max is added to V2 ref obtained one sampling before to provide new V2 ref.

Thus, when the constant primary-secondary voltage ratio control and the constant secondary voltage control are changed, the secondary voltage command can be prevented from rapidly changing to suppress an increase in the transformer current peak value of the insulation type bidirectional DC voltage converter.

In embodiment 10, for simplicity, we have discussed only the example in which the constant primary-secondary voltage ratio control is changed to the constant secondary voltage control when the primary voltage is low. However, when the constant secondary voltage control is changed to the constant primary-secondary voltage ratio control when the primary voltage is high or in the constant difference control between the primary voltage converted into the secondary voltage and the secondary voltage rather than the constant primary-secondary voltage ratio control, the secondary voltage command can also be prevented from rapidly changing to suppress the peak value by a similar method.

Embodiment 11:

We have discussed the constant primary-secondary voltage ratio control in embodiment 4 and the constant difference control between the primary voltage converted into the secondary voltage and the secondary voltage in embodiment 5, but when the primary voltage contains a ripple, raising the gain causes the transformer current of the insulation type bidirectional DC voltage converter to vibrate, as described in embodiment 9. Then, embodiment 11 provides an improved voltage loop controller, characterized by the fact that it has a filter capable of attenuating the primary voltage detection value ripple in the constant. primary-secondary voltage ratio control or the constant difference control between the primary voltage converted into the secondary voltage and the secondary voltage, whereby the transformer current of the insulation type bidirectional DC voltage converter does not vibrate even if the gain is raised.

To suppress vibration of the transformer current of the insulation type bidirectional DC voltage converter, a low gain may be used or the gain needs only to be decreased, as described in embodiment 9. However, it would cause the voltage loop response to become slow, causing a load change, etc., to lead to a large change in the secondary voltage. In embodiment 9, the constant secondary voltage control is performed at the normal operation, thereby raising the gain for making a fast voltage loop response. However, it would make a large peak current to some degree when the primary voltage changes. Embodiment 11 of the invention is appropriate for raising the gain for making a fast voltage loop response while the peak current is suppressed as much as possible as compared with the constant secondary voltage control.

Next, the operation will be discussed. Here, an example is given in which only the constant primary-secondary voltage ratio control is performed.

Figure 22:
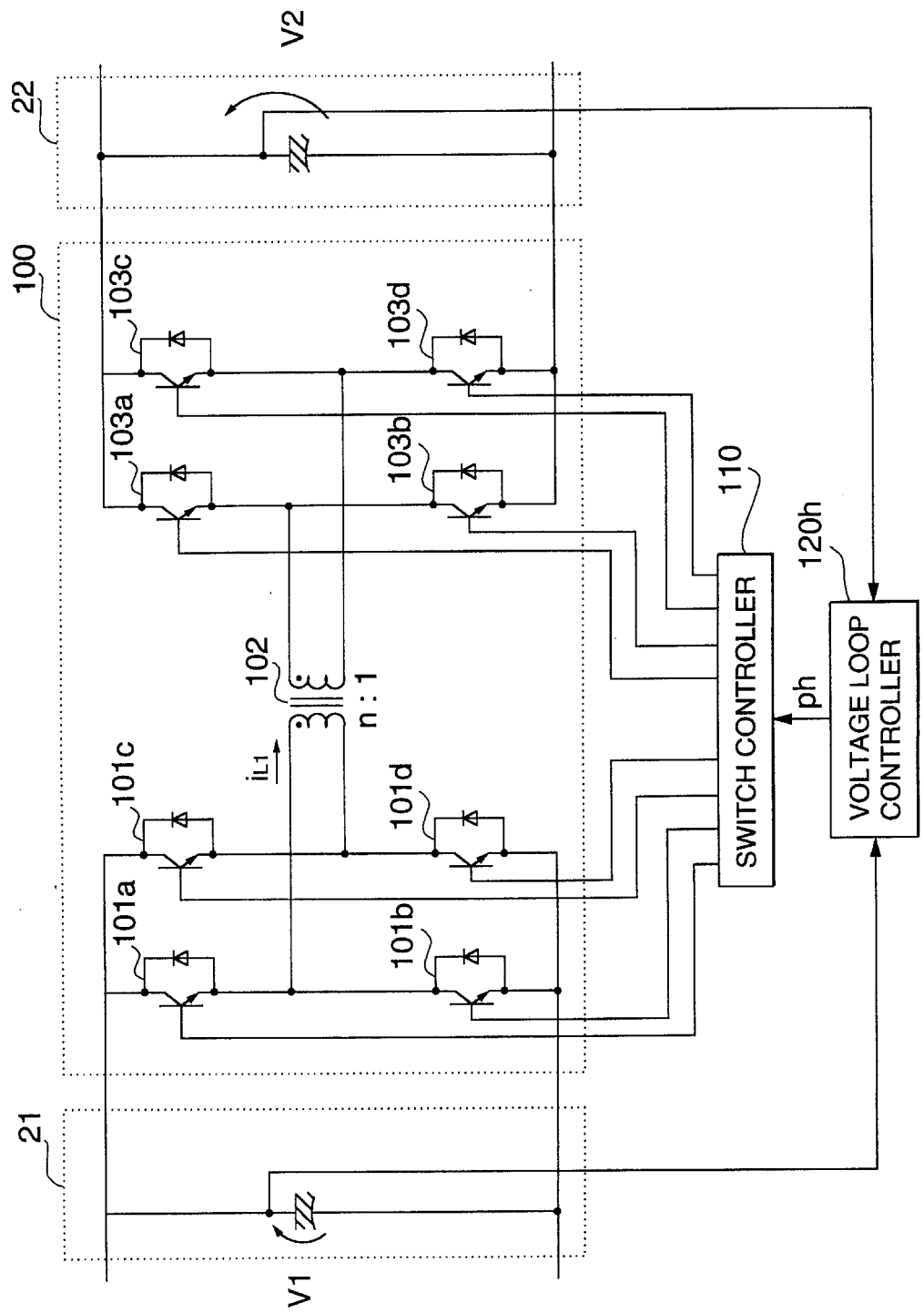
FIG. 22 is a block diagram showing an insulation type bidirectional DC voltage converter of the invention.
Figure 23:
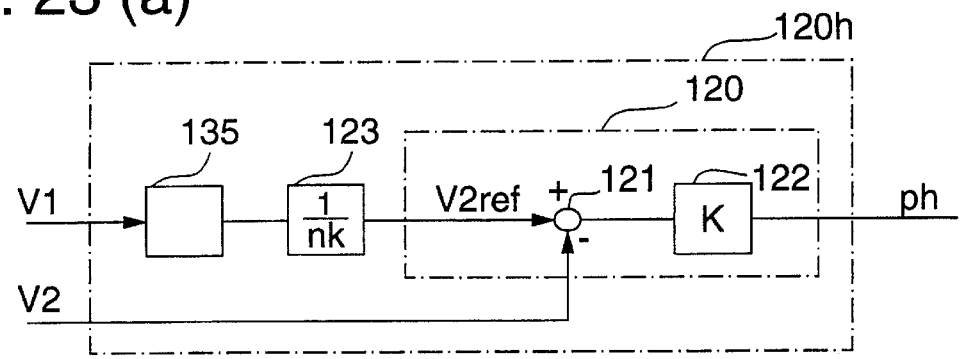
FIG. 23(a) is an internal block diagram and FIG. 23(b) is a flowchart of a voltage loop controller in FIG. 22.
Figure 23:
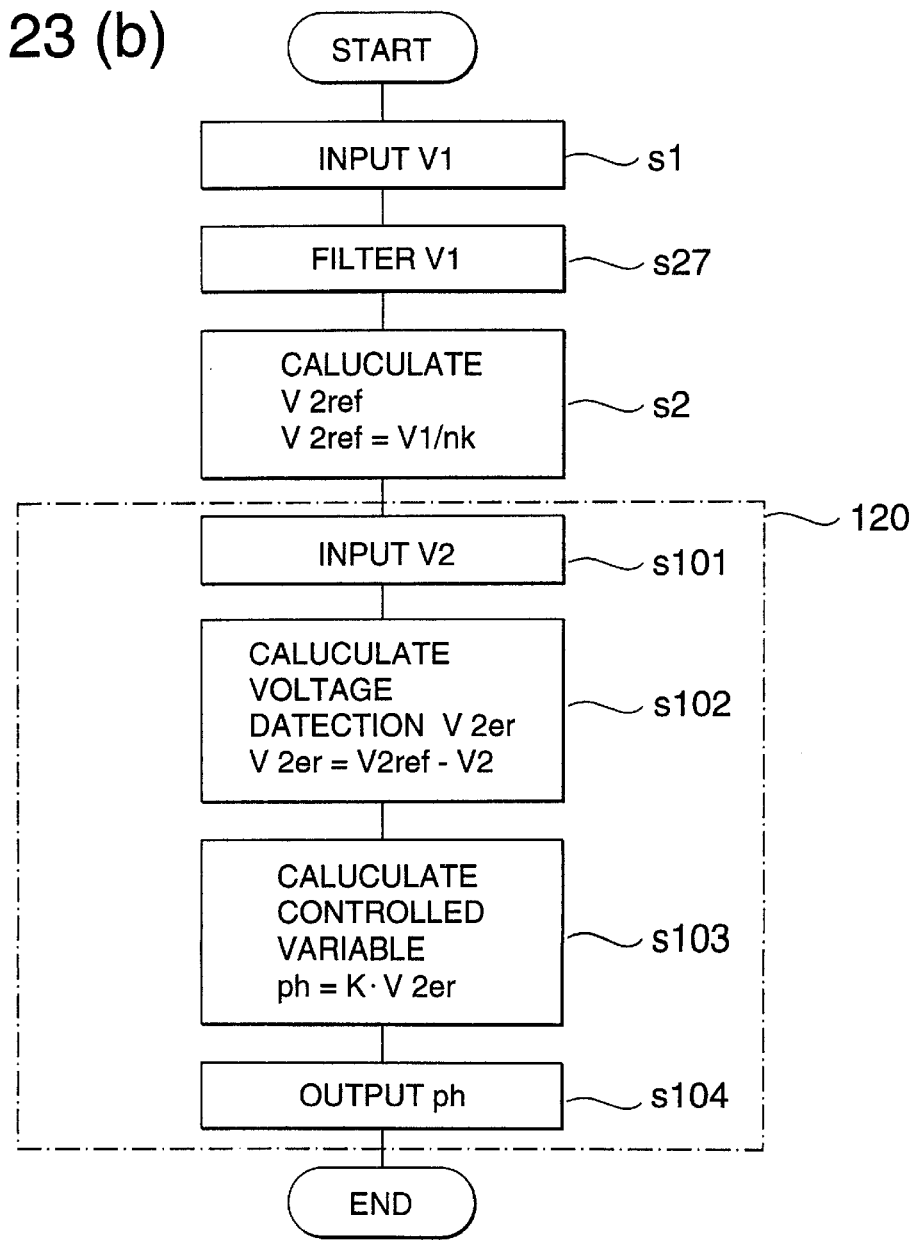

FIG. 22 is a block diagram of an insulation type bidirectional DC voltage converter of one embodiment of the invention. That is, the insulation type bidirectional DC voltage converter in FIG. 22 differs from the conventional DC voltage converter shown in FIG. 32 in a voltage loop controller 120$h$. FIG. 23($a$) is a block diagram showing an internal configuration example of the voltage loop controller 120$h$. This voltage loop controller 120$h$ differs from the voltage loop controller of embodiment 4 shown in FIG. 9($a$) in that it has a filter circuit 135 capable of attenuating a detected primary voltage V1ripple, whereby even if the primary voltage V1 contains a ripple, the gain can be raised for making a fast voltage loop response without causing the transformer current of the insulation type bidirectional DC voltage converter to vibrate.

FIG. 23($b$) is a flowchart representing the operation of the voltage loop controller 120$h$ in FIG. 23($a$). It is the same as the flowchart of FIG. 9($b$) in embodiment 4 except for step S27 at which a detected primary voltage ripple is attenuated. Here, if the primary side of the insulation type bidirectional DC voltage converter is a 3-phase full-wave rectifier and the power supply frequency is 60 Hz, the filter may be a filter capable of attenuating 360-Hz frequency component.

An experiment was carried out using a first order lag filter capable of attenuating 360 Hz as the filter circuit. In the experiment, even if the gain is raised to some degree, the transformer current does not vibrate and the good result is produced.

Embodiment 12:

A current rises in proportion to the sum of the primary voltage and the secondary voltage converted into the primary voltage (V1+n·V2) in a phase overlap section according to Expression (2) described in embodiment 2. When phases do not overlap, a current rises in proportion to the difference between the primary voltage and the secondary voltage converted into the primary voltage (V1−n·V2) as shown in Expression (3). Now, assuming that the difference between the primary voltage and the secondary voltage converted into the primary voltage is large, a current rises considerably rapidly not only in phase overlap sections, but also in sections in which no phases overlap; as a result, the peak current becomes large. This means that if the difference between the primary voltage and the secondary voltage converted into the primary voltage is large, inevitably the peak current becomes large.

Embodiment 12 of the invention provides an improved voltage loop control circuit and an improved switching element controller, wherein when the operation is performed with the maximum peak value set, the difference between the primary voltage and the secondary voltage converted into the primary voltage is always monitored, the maximum pulse width required for the current to become the setup maximum peak current is calculated from the voltage difference and leakage inductance, and the pulse width is always made to fall below the maximum pulse width.

From Expression (3), the time taken for primary current iL1 to become primary maximum current setup value Ipeak, Tmax, is $$\text{Tmax}=(\text{Ipeak}-\text{IL1x})\cdot\text{Lh}/|(\text{V1}-\text{n}\cdot\text{V2})| \quad (10)$$

Here, if the pulse width is narrowed, the phase overlap time is eliminated, thus the current caused by the phase overlap, IL1x, becomes zero. Therefore, Expression (10) changes to $$\text{Tmax}=(\text{Ipeak}\cdot\text{Lh}/|(\text{V1}-\text{n}\cdot\text{V2})| \quad (11)$$

When (V1→n·V2) is negative, Tmax becomes negative because Ipeak is positive. To avoid such a condition, the absolute value of (V1−n·V2) is adopted in Expressions (10) and (11).

In the normal phase difference control operation, assuming that the switching period is T, the pulse width becomes T/2 because DUTY is 50%. At the time, since $|(V1-n\cdot V2)|$ is small, Tmax becomes large and T/2 does not exceed Tmax. However, when the power is turned on or voltage drops, $|(V1-n\cdot V2)|$ becomes large, thus Tmax becomes small and T/2 exceeds Tmax. This means that a current of Ipeak or more flows. Then, when T/2 exceeds Tmax, the pulse width is limited by Tmax, thereby preventing a current of setup Ipeak or more from flowing.

Next, the operation will be discussed. Given here is an example as to how the pulse width is limited when $|(V1-n\cdot V2)|$ becomes large in the constant secondary voltage control.

Figure 24:
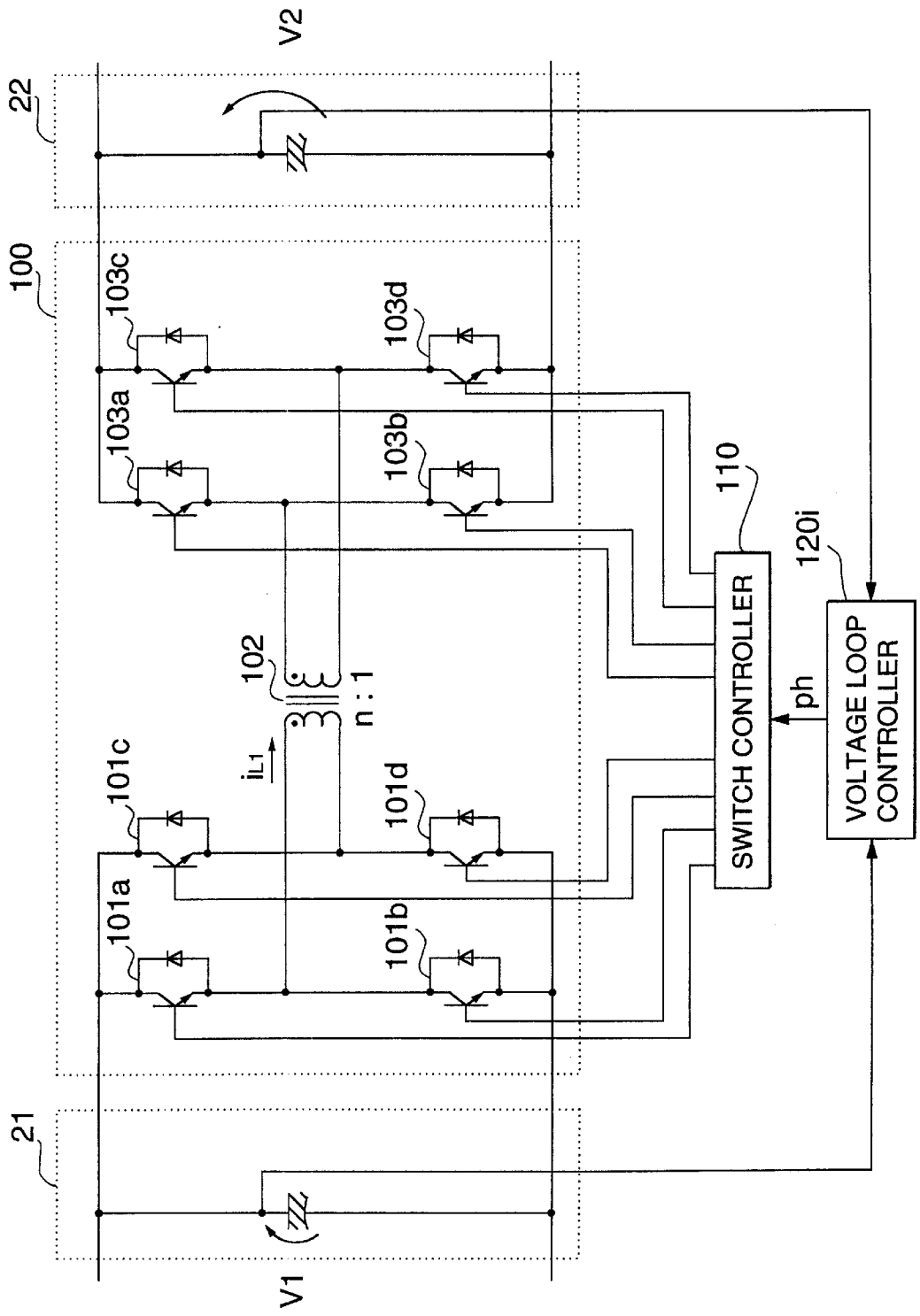
FIG. 24 is a block diagram showing an insulation type bidirectional DC voltage converter of the invention.

FIG. 24 is a block diagram of an insulation type bidirectional DC voltage converter of one embodiment of the invention. That is, the insulation type bidirectional DC voltage converter in FIG. 24 differs from the conventional DC voltage converter shown in FIG. 32 in a switching element controller 110$i$ and a voltage loop controller 120$i$.

Figure 25:
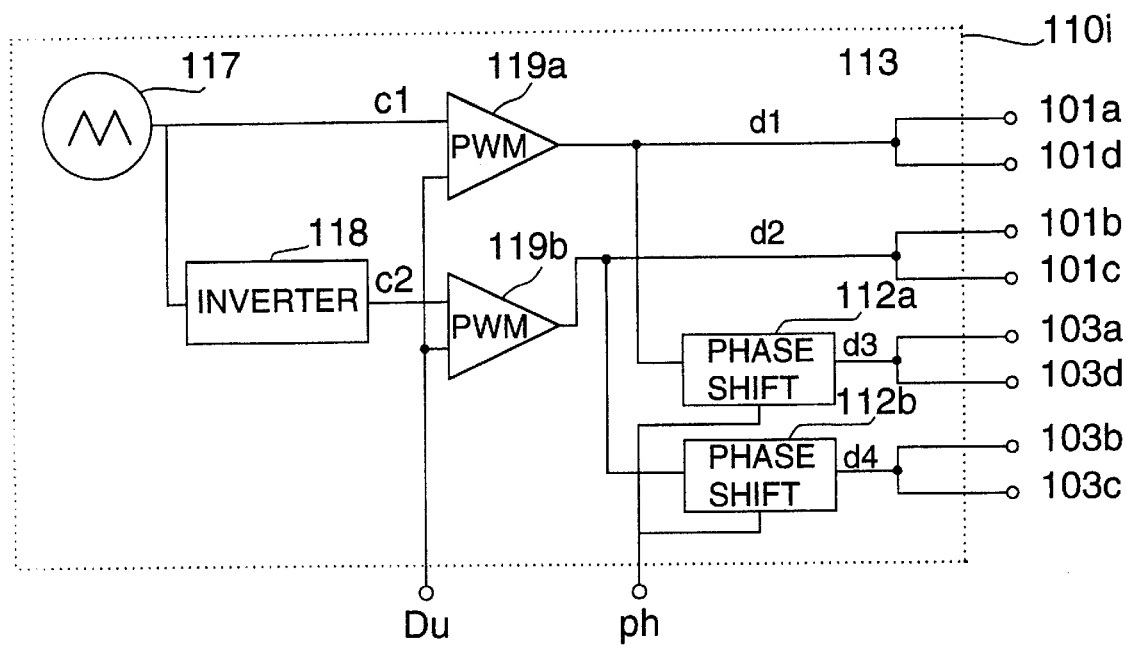
FIG. 25(a) is an internal block diagram and FIG. 25(b) is a flowchart of a switching element controller in FIG. 24.
Figure 25:
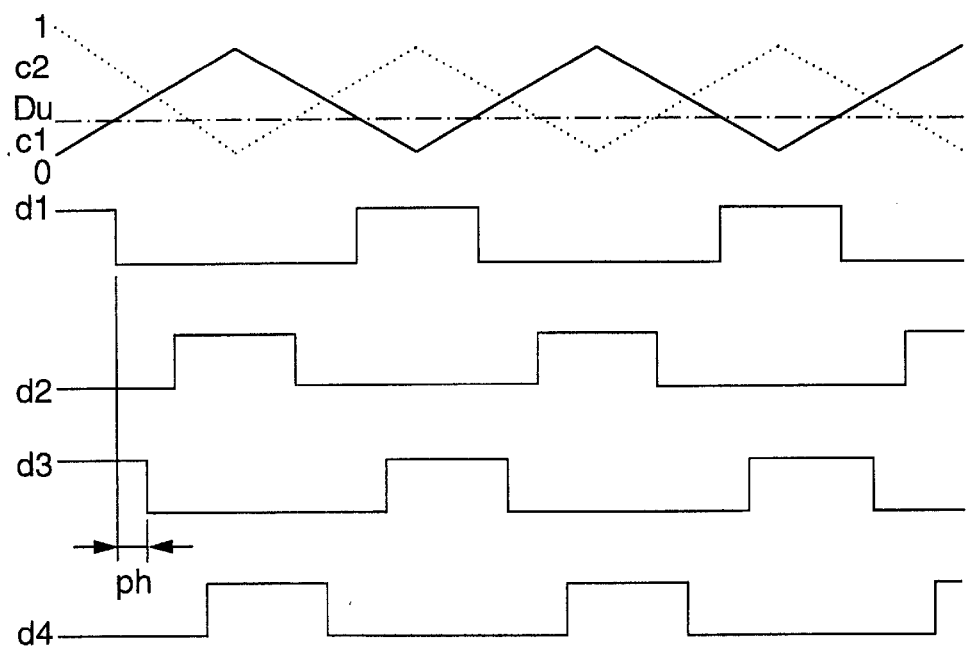

FIG. 25($a$) is a block diagram showing an internal configuration example of the switching element controller 110$i$. FIG. 25($b$) is a timing chart of the switching element controller. In FIG. 25($a$), numeral 117 is a triangular wave generator for outputting a triangular wave in the range of 0 to 1, numeral 118 is an inverter for inverting an output of the triangular wave generator 117, numerals 119$a$ and 119$b$ are PWM circuits, and numerals 112$a$ and 112$b$ are phase shift circuits. The switching element controller 110$i$ differs from the switching element controller 110 of the conventional example shown in FIG. 33 in that the pulse width can be limited in response to DU (duty) input. For example, when DU=0.5, the same signal as in the conventional example is output to the switching element. As shown in FIG. 25($b$), when DU is less than 0.5, the pulse width becomes small in response to the DU. The phase shift is the same as in the conventional example.

Figure 26:
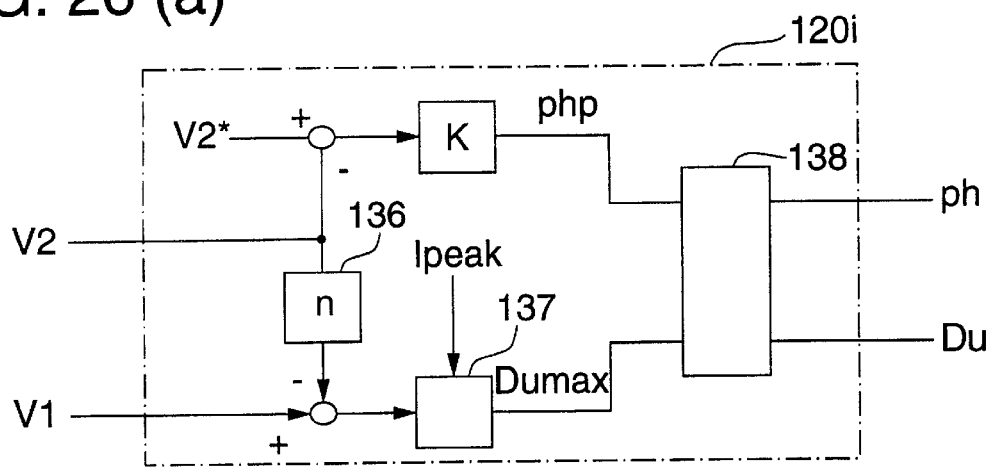
FIG. 26(a) is an internal block diagram and FIG. 26(b) is a flowchart of a voltage loop controller in FIG. 24.
Figure 26:
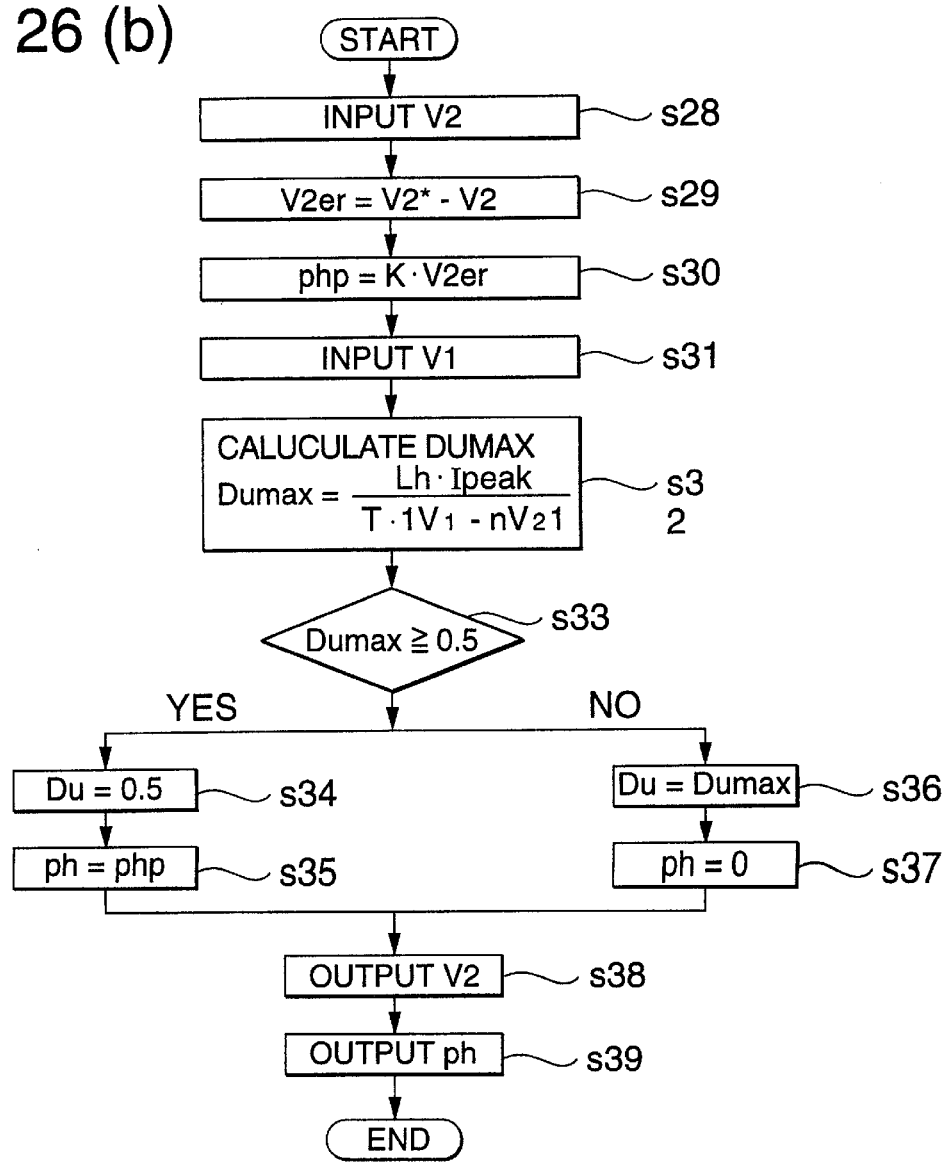

Next, FIG. 26($a$) is a block diagram showing an internal configuration example of the voltage loop controller 120$i$, wherein numeral 136 is a conversion-to-primary-voltage circuit for converting secondary voltage into primary voltage, numeral 137 is a maximum duty calculation circuit for inputting the difference between the primary voltage and the secondary voltage converted into the primary voltage and calculating the maximum duty for the current to become the setup maximum current Ipeak, and numeral 138 is a selector circuit for comparing an output of the maximum duty calculation circuit 137, DUmax, with 0.5 and if Dumax is 0.5 or more, for outputting DU=0.5; otherwise, for outputting DU=Dumax.

FIG. 26(*b*) is a flowchart representing the operation of the voltage loop controller 120*i* in FIG. 26(*a*). Secondary voltage V2 is input at step S28, deviation between second voltage target value V2 * and secondary voltage V2, V2er, is found at step S29, and phase difference ph is found at step S30. However, the phase difference ph is temporary. Steps 28 to 30 are the same as those in the conventional constant secondary voltage control. Next, primary voltage V1 is input at step S31 and maximum duty Dumax is calculated at step S32 by dividing Tmax found in Expression (11) by switching period T as in $$Dumax=Ipeak\cdot Lh/(T\cdot|(V1-n\cdot V2)|) \quad (12)$$

Next, Dumax is compared with 0.5 at step S33. If Dumax is equal to or greater than 0.5, DU is set to 0.5 at step S34 and ph is set to php at step S35. The route of steps 34 and 35 is the same as in the conventional constant secondary voltage control. In contrast, if Dumax is less than 0.5, DU is set to Dumax at step S36 and ph is set to 0 at step S37. When the difference between the primary voltage and the secondary voltage converted into the primary voltage is large, the route of steps S36 and S37 is taken for limiting the pulse width so as not to increase the peak current. On either route, DU and ph are determined, then DU is output at step S38 and ph is output at step S39.

Thus, only when the difference between the primary voltage and the secondary voltage converted into the primary voltage is large, the pulse width is limited in response to the difference, thereby preventing the peak current from rising when the voltage difference becomes large.

Figure 27:
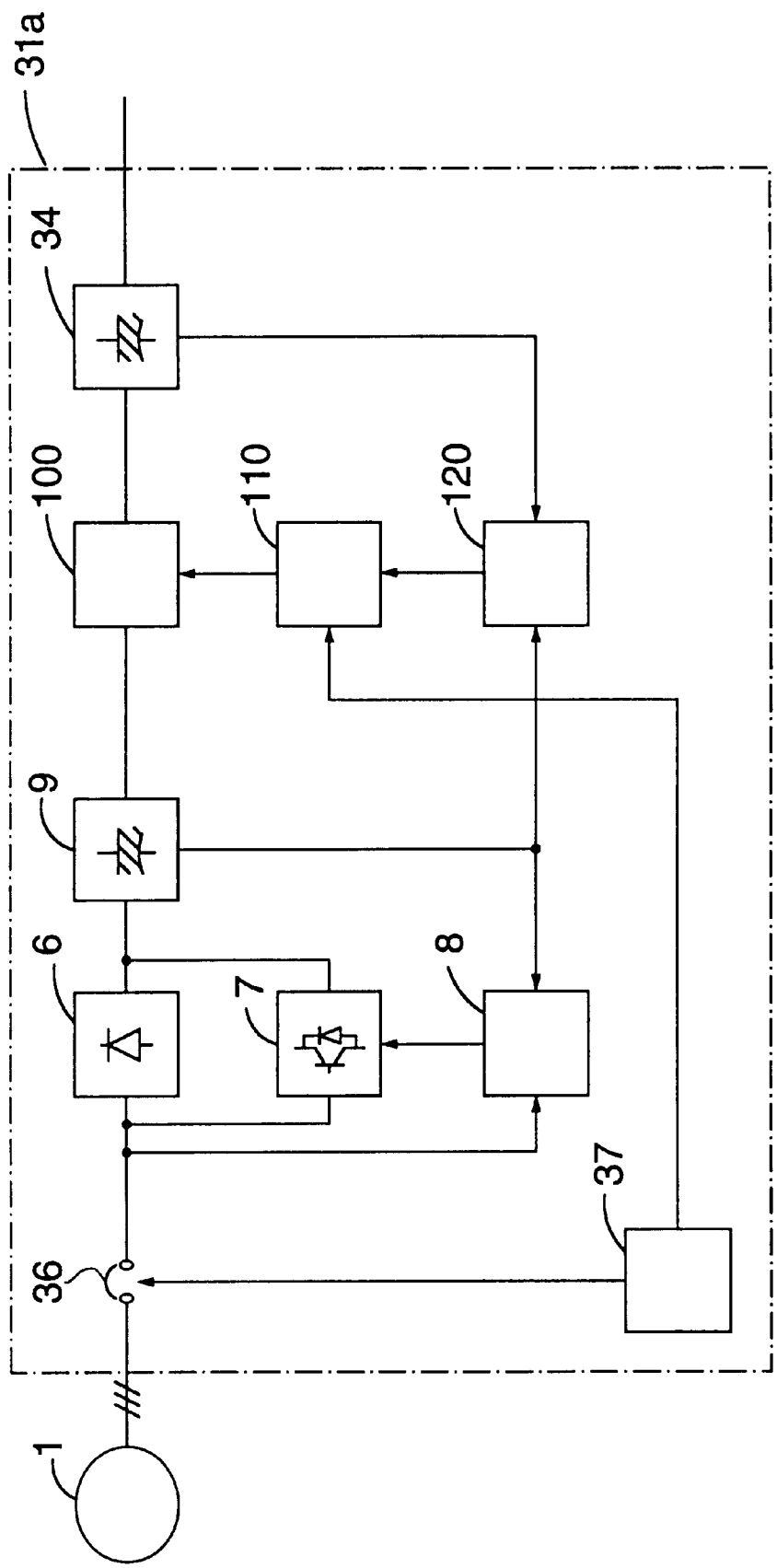
FIG. 27 is a block diagram showing a converter section with an insulation type bidirectional DC voltage conversion function of the invention.

Embodiment 13:

FIG. 27 is a block diagram of a converter section with an insulation type bidirectional DC voltage conversion function of one embodiment of the invention; it is a block diagram showing an improvement in embodiment 13 corresponding to the converter section 31 with an insulation type bidirectional DC voltage conversion function of embodiment 1 shown in FIG. 1. The insulation type bidirectional DC voltage converter 100 shown in FIG. 32 is used as insulation type bidirectional DC voltage converter 33. A shutdown circuit 36 for shutting down voltage of input power supply 1 and a start signal sequence controller 37 are added so as to control the operation sequence of the converter with an insulation type bidirectional DC voltage conversion function.

Next, the operation will be discussed. When an AC is input, immediately a rectifier 6 starts the operation for charging a smoothing circuit 9 with DC voltage. If the bidirectional DC voltage converter is operated after the smoothing circuit 9 is charged with sufficient DC voltage, the difference between the primary voltage V1 and the voltage value of converting the secondary voltage V2 into the primary voltage in the bidirectional DC voltage converter is large and if the on time t is small, the primary current iL1 becomes large, as shown in Expression (3). Then, the start signal sequence controller 37 in FIG. 27 is provided for starting the bidirectional DC voltage converter 100 before the shutdown circuit 36 is forced into conduction when the power is turned on, then forcing the shutdown circuit 36 into conduction, whereby the rectifier 6 and the bidirectional DC voltage converter 100 operate at the same time, enabling the power to be turned on while the difference between the primary voltage V1and the voltage value of converting the secondary voltage V2 into the primary voltage remains small. That is, an increase in the current peak can be suppressed when the power is turned on.

The invention produces the following effects:

According to the invention, the motor operation controller in the invention, which comprises a bidirectional DC voltage converter, can convert a converter section output voltage into a DC voltage in a given range for different power supply voltages and can make bidirectional voltage conversion. Thus, the inverter circuit configuration, motors, wiring, etc., can be made common regardless of power supply voltages.

Also, machines using the motors can be configured regardless of the power supply voltages and the types of components such as power operation controllers and motors can be reduced drastically. Thus, machine development, productivity, inventory management, and maintenance management are improved drastically. Since the input power supply and motors are insulated from each other by the internal transformer, there is little danger of an electric shock accident.

The motor operation controller is divided into two blocks of the converter section for making bidirectional voltage conversion to a. DC voltage in a given range for different power supply voltages and the inverter section, which are contained in separate cases. Thus, motor operation controller inverter sections, motors, wiring, etc., can be made common regardless of the power supply voltages; the configurations of machines using the motors can be made common and the types of components can be reduced. Further, since a common inverter section having a number of cables to motors and interfaces with external controllers may be used regardless of the power supply voltages and only the converter section may be replaced according to the power supply voltage, machine development, productivity, inventory management, and maintenance management are furthermore improved drastically.

The insulation type bidirectional DC voltage converter according to the invention drives the primary switching elements and secondary single-side arm switching elements of the internal transformer and controls transfer power in response to the phase difference. Thus, the current waveform ratio is improved and the maximum current value can be reduced by half for providing an efficient insulation type bidirectional DC voltage converter. By improving phase difference control, transfer power controllability can be improved and smoothing circuit ripples can be reduced, accomplishing miniaturization and long life of circuitry.

Since the secondary voltage is controlled in proportion to a change in the primary voltage in the control method of the insulation type bidirectional DC voltage converter, the maximum current can be suppressed even if the primary voltage changes. Thus, a proper switching element current capacity can be selected and an efficient insulation type bidirectional DC voltage converter can be provided.

Since the insulation type bidirectional DC voltage converter is controlled so as to hold constant the difference between the secondary voltage into which the primary voltage is converted and the secondary voltage, the maximum current can be suppressed for a change in the primary voltage or an inverter section output change. Thus, a proper switching element current capacity can be selected and an efficient insulation type bidirectional DC voltage converter can be provided.

Since the insulation type bidirectional DC voltage converter is controlled by selecting the constant secondary 5 voltage control, constant difference control between secondary voltage into which primary voltage is converted and secondary voltage, or constant primary-secondary voltage ratio control in response to the operation state of the bidirectional DC voltage converter in the inverter section, the maximum current can be suppressed in response to a condition. Thus, a proper switching element current capacity can be selected and an efficient insulation type bidirectional DC voltage converter can be provided. Also, an insulation type bidirectional DC voltage converter with the secondary voltage constant in the practical use range can be provided.

Since the insulation type bidirectional DC voltage converter is controlled so that the secondary voltage is held constant when output power is light or so that the ratio between the primary and secondary voltages or the difference between the secondary voltage into which the primary voltage is converted and the secondary voltage is held constant when output power is heavy, the maximum current can be suppressed for a primary voltage change or inverter section output change. Thus, a proper switching element current capacity can be selected and an efficient insulation type bidirectional DC voltage converter can be provided. Also, an insulation type bidirectional DC voltage converter with the secondary voltage constant in the practical use range can be provided.

Since the insulation type bidirectional DC voltage converter is controlled so that when the primary voltage of the bidirectional DC voltage converter is higher than a setup value, the secondary voltage is held constant or so that when the primary voltage is lower than the setup value, the ratio between the primary and secondary voltages or the difference between the secondary voltage into which the primary voltage is converted and the secondary voltage is held constant, the maximum current can be suppressed even if the primary voltage decreases when the power is turned on or is abnormal. Thus, a proper switching element current capacity can be selected and an efficient insulation type bidirectional DC voltage converter can be provided. Also, an insulation type bidirectional DC voltage converter with the secondary voltage constant in the practical use range can be provided.

The insulation type bidirectional DC voltage converter is controlled so as to suppress the gain when the constant primary-secondary voltage ratio control or the constant difference control between the secondary voltage into which the primary voltage is converted and the secondary voltage is performed or so as to raise the gain properly when the constant secondary voltage control is performed. Thus, when the constant primary-secondary voltage ratio control or the constant difference control between the secondary voltage into which the primary voltage is converted and the secondary voltage is performed, a ripple of the primary voltage can be prevented from causing the current to vibrate. Therefore, a proper switching element current capacity can be selected and an efficient insulation type bidirectional DC voltage converter can be provided. Also, an insulation type bidirectional DC voltage converter for enabling the secondary voltage to be held constant in the practical use range can be provided.

When one of the constant primary-secondary voltage ratio control, constant difference control between the secondary voltage into which the primary voltage is converted and the secondary voltage, and constant secondary voltage control is selected for use, the maximum value of the command change slope is defined so that the command value of the secondary voltage does not rapidly change at the time. Thus, excessive current occurring due to a rapid change in the command can be suppressed. Therefore, a proper switching element current capacity can be selected and an efficient insulation type bidirectional DC voltage converter can be provided.

In the control method of the insulation type bidirectional DC voltage converter, when the constant primary-secondary voltage ratio control or the constant difference control between the secondary voltage into which the primary voltage is converted and the secondary voltage is performed, a detected primary voltage ripple is attenuated by means of the filter. Thus, current vibration can be suppressed. Therefore, a proper switching element current capacity can be selected and an efficient insulation type bidirectional DC voltage converter with a fast voltage loop response can be provided.

The maximum pulse width required for the current to become the setup maximum peak current is calculated from the difference between the primary voltage and the primary voltage into which the secondary voltage is converted in the insulation type bidirectional DC voltage converter, and the upper limit of the pulse width is restricted. Thus, the maximum current can be suppressed when the power is turned on or voltage drops. Therefore, a proper switching element current capacity can be selected and an efficient insulation type bidirectional DC voltage converter can be provided.

In the motor operation controller of the invention, the rectifier and the insulation type bidirectional DC voltage converter in the converter section are operated at the same time. Thus, when the power is turned on, primary and secondary voltage changes in the insulation type bidirectional DC voltage converter can be made at the same time and excessive current can be suppressed. Therefore, a proper switching element current capacity can be selected and an efficient insulation type bidirectional DC voltage converter can be provided.

Although the application describes the invention in accordance with certain specific embodiments, the invention is not limited thereto. Applicant hereby incorporates by reference all of the teachings contained in the foreign priority documents whose benefit is claimed herein.

What is claimed is:

1. A motor operation controller comprising:
    a converter section having a rectifier for converting a first AC voltage of a power supply into a first DC voltage during a power mode,
    an insulation type bidirectional DC voltage converter for converting said first DC voltage into a second DC voltage during the power mode, and
    an inverter section for converting said second DC voltage into a second AC voltage and supplying said second AC voltage to a motor during the power mode.

2. A motor operation controller comprising:
    a converter section having a rectifier for converting a first AC voltage of a power supply into a first DC voltage during a power mode,
    a bidirectional DC voltage converter section for converting said first DC voltage into a second DC voltage during the power mode, and
    an inverter section for converting said second DC voltage into a second AC voltage and supplying said second AC voltage to a motor during the power mode, wherein said converter section is built into a first case and said inverter section is built into a separate second case.

3. A motor operation controller comprising:
    a converter having a rectifier for converting a first AC voltage of a power supply into a first DC voltage,
    an insulation type bidirectional DC voltage converter for converting said first DC voltage into a second DC voltage during a power mode, an inverter section for converting said second DC voltage into a second AC voltage and supplying said second AC voltage to a motor during the power mode, and means operative when power is turned on, for operating said rectifier and said insulation type bidirectional DC voltage converter at the same time.

4. The motor operation controller set forth in claim 1, wherein said inverter section converts said second AC voltage, which is output by the motor in a regeneration mode, into said second DC voltage during the regeneration mode, said insulation type bidirectional DC voltage converter converts said second DC voltage into said first DC voltage during the regeneration mode, and said converter section comprises a power supply inverter circuit for converting said first DC voltage into said first AC voltage of a power supply voltage during the regeneration mode.

5. The motor operation controller set forth in claim 2, wherein said inverter section converts said second AC voltage, which is output by the motor in a regeneration mode, into said second DC voltage during the regeneration mode, said insulation type bidirectional DC voltage converter converts said second DC voltage into said first DC voltage during the regeneration mode, and said converter section comprises a power supply inverter circuit for converting said first DC voltage into said first AC voltage of a power supply voltage during the regeneration mode.

6. The motor operation controller set forth in claim 3, wherein said inverter section converts said second AC voltage, which is output by the motor in a regeneration mode, into said second DC voltage during the regeneration mode, said insulation type bidirectional DC voltage converter converts said second DC voltage into said first DC voltage during the regeneration mode, and said converter section comprises a power supply inverter circuit for converting said first DC voltage into said first AC voltage of a power supply voltage during the regeneration mode.

* * * * *